United States Patent
Sato et al.

(10) Patent No.: US 8,795,858 B2
(45) Date of Patent: *Aug. 5, 2014

(54) MAGNETIC RECORDING MEDIUM AND METHOD OF MANUFACTURING THE SAME

(75) Inventors: Masahide Sato, Minami-ashigara (JP); Katsumi Araki, Minami-ashigara (JP); Kazufumi Omura, Minami-ashigara (JP); Tomohiro Ichikawa, Minami-ashigara (JP); Shinji Tsujimoto, Minami-ashigara (JP); Tadahiro Ooishi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 442 days.

This patent is subject to a terminal disclaimer.

(21) Appl. No.: 13/051,765

(22) Filed: Mar. 18, 2011

(65) Prior Publication Data
US 2011/0229741 A1   Sep. 22, 2011

(30) Foreign Application Priority Data

Mar. 19, 2010 (JP) ................................. 2010-063524
Mar. 18, 2011 (JP) ................................. 2011-059997

(51) Int. Cl.
*G11B 5/716* (2006.01)

(52) U.S. Cl.
USPC ..................................................... 428/840.5

(58) Field of Classification Search
None
See application file for complete search history.

(56) References Cited

U.S. PATENT DOCUMENTS

| | | | |
|---|---|---|---|
| 6,127,039 A | 10/2000 | Saitoh et al. | |
| 6,139,946 A * | 10/2000 | Bailey et al. | 428/323 |
| 6,254,964 B1 | 7/2001 | Saito et al. | |
| 7,737,304 B2 | 6/2010 | Omura et al. | |
| 7,737,305 B2 | 6/2010 | Omura et al. | |
| 2001/0038928 A1 | 11/2001 | Nakamigawa et al. | |
| 2009/0087687 A1 | 4/2009 | Omura et al. | |
| 2009/0258254 A1* | 10/2009 | Omura et al. | 428/840 |

FOREIGN PATENT DOCUMENTS

| | | |
|---|---|---|
| JP | 62-275318 A | 11/1987 |
| JP | 01-232530 A | 9/1989 |
| JP | 02-087318 A | 3/1990 |
| JP | 05-325170 A | 12/1993 |
| JP | 11-259849 A | 9/1999 |
| JP | 2002-025035 A | 1/2002 |
| JP | 3698540 B2 | 9/2005 |
| JP | 2009-096798 A | 5/2009 |
| WO | 98/35345 A1 | 8/1998 |

OTHER PUBLICATIONS

Office Action dated Feb. 25, 2014, in Japanese Application No. 2011-059997.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium comprising a nonmagnetic layer containing a nonmagnetic powder and a binder and a magnetic layer containing a ferromagnetic powder and a binder in this order on a nonmagnetic support, wherein the binder of the magnetic layer is a mixture of a vinyl chloride copolymer, polyurethane resin, and polyisocyanate, the polyurethane resin having a glass transition temperature ranging from 90 to 130° C. and a storage elastic modulus at 80° C. ranging from 2.5 to 5.0 GPa, the nonmagnetic layer is a radiation-cured layer formed by curing with radiation a radiation-curable composition comprising a nonmagnetic powder and a binder component, the binder component comprising a radiation-curable vinyl chloride copolymer and a radiation-curable polyurethane resin, and the radiation-curable vinyl chloride copolymer and radiation-curable polyurethane resin both have glass transition temperatures ranging from 30 to 100° C.

8 Claims, No Drawings

MAGNETIC RECORDING MEDIUM AND METHOD OF MANUFACTURING THE SAME

CROSS-REFERENCE TO RELATED APPLICATIONS

This application claims the benefit of priority under 35 USC 119 to Japanese Patent Application No. 2010-63524 filed on Mar. 19, 2010 and Japanese Patent Application No. 2011-59997 filed on Mar. 18, 2011, which are expressly incorporated herein by reference in their entirety.

BACKGROUND OF THE INVENTION

1. Field of the Invention

The present invention relates to a magnetic recording medium and to a method of manufacturing the same. More particularly, the present invention relates to a high-density recording magnetic recording medium with good electromagnetic characteristics, and to a method of manufacturing the same.

2. Discussion of the Background

In recent years, as microcomputers, personal computers, and office computers such as work stations have become increasingly widespread, considerable research has been conducted into external storage media in the form of magnetic tapes for recording computer data (known as "backup tapes").

Products in the form of data backup tapes with high recording capacity have been developed in response to an increase in the diversity and quantity of information being recorded. To achieve tapes of high recording capacity, the spacing between the magnetic layer and the magnetic head should be reduced. For example, when large protrusions and indentations are present on the surface of the magnetic layer, output drops due to spacing loss, resulting in compromised electromagnetic characteristics such as heightened dropout, an increased error rate, and a drop in the S/N. Accordingly, the magnetic recording layer surface of a data backup tape of high recording capacity is required to be extremely smooth to achieve good electromagnetic characteristics. For example, as described in Japanese Patent No. 3,698,540 or English language family member U.S. Pat. No. 6,127,039, which are expressly incorporated herein by reference in their entirety, the use of a nonmagnetic layer in the form of a radiation-cured layer positioned beneath the magnetic layer is a known means of increasing the surface smoothness of the magnetic layer.

As described above, enhancing a surface smoothness of the magnetic layer is an effective means for improving electromagnetic characteristics. However, on the other hand, the smoother the magnetic layer surface is, the greater the coefficient of friction between the magnetic layer surface and a head becomes. This may cause generation of shavings from the magnetic layer surface during repeated running (pieces of damaged coating). The pieces of damaged coating may cause decreased output because these pieces adhere to the head. As a result, it becomes difficult to maintain good electromagnetic characteristics for an extended period.

SUMMARY OF THE INVENTION

An aspect of the present invention provides for a magnetic recording medium that affords good electromagnetic characteristics for an extended period.

The present inventors conducted extensive research into achieving the above magnetic recording medium. As a result, they discovered that the use of polyurethane resin with a high glass transition temperature and a high storage elastic modulus in the high-temperature range as a binder component in the magnetic layer was a countermeasure to pieces of damaged coating above. This point will be elaborated on below. The use of polyurethane resin with a high glass transition temperature (high Tg) as a binder component in the magnetic layer to increase coating strength and improve running durability has been proposed, for example, in Japanese Unexamined Patent Publication (KOKAI) No. 2004-319001, which is expressly incorporated herein by reference in its entirety. However, based on their research, the present inventors determined that the use of a polyurethane resin with a high Tg alone was not adequate as a countermeasure to pieces of damaged coating above. Accordingly, the present inventors meticulously evaluated the thermal properties of polyurethane resin. They discovered the phenomenon that the storage elastic modulus F in the high temperature range switches places with Tg, and reached the conclusion that it was impossible to adequately inhibit shavings on the surface of the magnetic layer with just a polyurethane resin of high Tg and low storage elastic modulus in the high temperature range. The relation between surface shavings, Tg, and the storage elastic modulus can be described as follows. At temperatures at and above the Tg, the storage elastic modulus of a polymer drops considerably, so the strength decreases. The polyurethane employed in magnetic recording media is often comprised of a multi-component system in which multiple monomers are generally employed in combination to achieve various ends, such as the Tg and solubility. When a monomer of high Tg is employed with a monomer of low Tg, the monomer of high Tg has the effect of raising the Tg, but the monomer of low Tg has the effect of causing the storage elastic modulus to drop to a temperature lower than the Tg. Thus, polymers exhibiting roughly identical Tg values do not have identical storage elastic ratios in the high temperature range. Accordingly, it is necessary to specify the storage elastic modulus in the high temperature range in addition to the Tg.

However, on the other hand, magnetic layers formed using binders with high storage elastic moduli at high temperatures and high glass transition temperatures had poor deformation properties at high temperatures. Thus, it was impossible to achieve adequate surface smoothness despite achieving high durability, and it was also determined to be difficult to achieve good electromagnetic characteristics.

Accordingly, the present inventors conducted further research into finding a means of improving surface smoothness in a magnetic layer containing a binder with a high glass transition temperature and a high storage elastic modulus at high temperature. As a result, they discovered that by forming a nonmagnetic layer of a radiation-curable resin of low Tg beneath the magnetic layer, it was possible to increase the surface smoothness of the magnetic layer. The present inventors attributed this to the following reasons.

The magnetic recording media used in high-density recording normally comprise a nonmagnetic layer beneath the magnetic layer. The flexibility of the nonmagnetic layer in the calendering temperature range can be ensured by constituting the nonmagnetic layer of a low-Tg binder, thereby enhancing calendering moldability, and as a result, smoothening the high-Tg magnetic layer. Further, in a magnetic recording medium having a magnetic layer and a nonmagnetic layer, the generation of interface variation due to mixing of the two layers at the interface causes a drop in the surface smoothness of the magnetic layer. This mixing at the interface is caused by the binder of the nonmagnetic layer dissolving into the solvent of the magnetic layer coating liquid in the course of coating the magnetic layer coating liquid on the nonmagnetic layer in a manufacturing method based on a sequential multilayer coating system, for example. As set forth above, constituting the nonmagnetic layer of a low-Tg binder can enhance calendering moldability. In general, however, there is less interaction between low-Tg binders than high-Tg binders, and low-Tg binders have the physical property of tending to dissolve in solvents, thus tending to produce mixing at the interface. If a radiation-cured layer is employed as the nonmagnetic layer, it is possible to inhibit mixing at the interface of the nonmagnetic layer and magnetic layer. Thus, in a magnetic recording medium comprising a nonmagnetic layer comprised of a low-Tg binder, it is possible to prevent a drop in the surface smoothness due to interface variation.

The present invention was devised based on the above discoveries.

An aspect of the present invention relates to a magnetic recording medium comprising a nonmagnetic layer containing a nonmagnetic powder and a binder and a magnetic layer containing a ferromagnetic powder and a binder in this order on a nonmagnetic support, wherein the binder of the magnetic layer is a mixture of a vinyl chloride copolymer, polyurethane resin, and polyisocyanate, the polyurethane resin having a glass transition temperature ranging from 90 to 130° C. and a storage elastic modulus at 80° C. ranging from 2.5 to 5.0 GPa, the nonmagnetic layer is a radiation-cured layer formed by curing with radiation a radiation-curable composition comprising a nonmagnetic powder and a binder component, the binder component comprising a radiation-curable vinyl chloride copolymer and a radiation-curable polyurethane resin, and the radiation-curable vinyl chloride copolymer and radiation-curable polyurethane resin both have glass transition temperatures ranging from 30 to 100° C.

The above radiation-curable vinyl chloride copolymer may comprise a structural unit denoted by general formula (1):

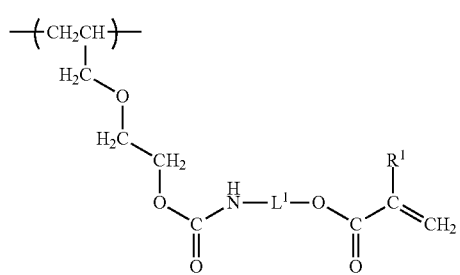

(1)

wherein, in general formula (1), $R^1$ denotes a hydrogen atom or a methyl group, and $L^1$ denotes a divalent linking group denoted by formula (2), formula (3), or general formula (4):

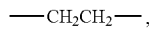

(2)

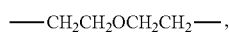

(3)

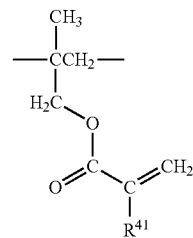

(4)

wherein, in general formula (4), $R^{41}$ denotes a hydrogen atom or a methyl group.

The above radiation-curable polyurethane resin may be a radiation-curable polyurethane resin obtained from starting materials containing a sulfonic acid group containing- or sulfonate group-containing polyol compound denoted by general formula (2):

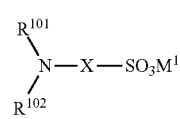

(2)

wherein, in general formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation.

The above polyurethane resin comprised in the binder of the magnetic layer may be a polyester polyurethane resin.

The above binder of the magnetic layer may comprise 10 to 100 weight parts of the polyisocyanate per 100 weight parts of the vinyl chloride copolymer.

The magnetic layer may further comprise a dispersing agent selected from the group consisting of aromatic compounds and carboxyl group-containing compounds.

The ferromagnetic powder may have an average particle size of equal to or smaller than 40 nm, and the dispersing agent may be a cinnamic acid.

The magnetic layer may comprise 1.5 to 10 weight parts of the dispersing agent per 100 weight parts of the ferromagnetic powder.

A further aspect of the present invention relates to a method of manufacturing a magnetic recording medium, wherein the magnetic recording medium is the above magnetic recording medium, and the method comprises:

coating and radiation curing a radiation-curable composition to form a nonmagnetic layer in the form of a radiation-cured layer, wherein the radiation-curable composition comprises a nonmagnetic powder and a binder component, the binder component comprises a radiation-curable vinyl chloride copolymer and a radiation-curable polyurethane resin, and the radiation-curable vinyl chloride copolymer and radiation-curable polyurethane resin both have glass transition temperatures ranging from 30 to 100° C., forming a magnetic layer with a binder over the radiation-cured layer that has been formed, wherein the binder is a mixture of a vinyl chloride copolymer, polyurethane resin, and polyisocyanate, the polyurethane resin has a glass transition temperature ranging from 90 to 130° C. and a storage elastic modulus at 80° C. ranging from 2.5 to 5.0 GPa, after which conducting calendering at a temperature of equal to or greater than a glass transition temperature of the radiation-cured layer.

The present invention can provide a magnetic recording medium for high-density recording, that is capable of exhibiting good electromagnetic characteristics for an extended period.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The present invention relates to a magnetic recording medium comprising a nonmagnetic layer containing a nonmagnetic powder and a binder and a magnetic layer containing a ferromagnetic powder and a binder in this order on a nonmagnetic support. In the magnetic recording medium of the present invention:

(1) The binder of the magnetic layer is a mixture of a vinyl chloride copolymer, polyurethane resin, and polyisocyanate, and the polyurethane resin has a glass transition temperature ranging from 90 to 130° C. and a storage elastic modulus at 80° C. ranging from 2.5 to 5.0 GPa.

(2) The nonmagnetic layer is a radiation-cured layer formed by curing with radiation a radiation-curable composition comprising a nonmagnetic powder and a binder component, and the binder component comprises a radiation-curable vinyl chloride copolymer and a radiation-curable polyurethane resin.

(3) The radiation-curable vinyl chloride copolymer and radiation-curable polyurethane resin both have glass transition temperatures ranging from 30 to 100° C.

As set forth above, the magnetic recording medium of the present invention satisfies (1) to (3) above, thereby making it possible to achieve good electromagnetic characteristics for an extended period.

The magnetic recording medium of the present invention will be described in greater detail below.

Magnetic Layer (i) Binder

In the magnetic recording medium of the present invention, the binder in the magnetic layer is a mixture of a vinyl chloride copolymer, polyurethane resin, and polyisocyanate. This is because it is difficult to obtain the required flexibility in the magnetic recording medium with a vinyl chloride copolymer alone, and because it is difficult to achieve good dispersion of ultrafine particulate magnetic powder for high-density recording with polyurethane resin alone. In the magnetic recording medium of the present invention, the polyurethane resin used to impart suitable flexibility to the magnetic layer has a glass transition temperature falling within a range of 90 to 130° C. and a storage elastic modulus at 80° C. (also referred to simply as the "storage elastic modulus" hereinafter) falling within a range of 2.5 to 5.0 GPa. When the polyurethane resin has a glass transition temperature of equal to or higher than 90° C. and a storage elastic modulus at 80° C. of equal to or higher than 2.5 GPa, it is possible to markedly inhibit the generation of head grime due to shavings from the magnetic layer surface (pieces of damaged coating) during running. Additionally, when the glass transition temperature of the polyurethane resin exceeds 130° C. and the storage elastic modulus at 80° C. exceeds 5.0 GPa, the polymer becomes excessively rigid, making it difficult to ensure solvent solubility. From the perspective of both inhibiting head grime and achieving solvent solubility, the storage elastic modulus at 80° C. of the polyurethane resin desirably falls within a range of 2.5 to 3.0 GPa. Both the glass transition temperature and storage elastic modulus in the present invention are values obtained by dynamic viscoelasticity measurement. Reference can be made to the description given in Examples further below for the specific measurement method.

As is set forth further below, the nonmagnetic layer is a radiation-cured layer in the present invention, but the magnetic layer can be formed by either thermosetting or radiation curing. Thermosetting is desirable in that the storage elastic modulus and Tg of the coating (magnetic layer) are further enhanced by the urethane bonds that are formed. That is, in the magnetic layer, the vinyl chloride copolymer, polyurethane resin, and polyisocyanate can react with each other to form a reaction product in the mixture.

The polyurethane resin having a glass transition temperature and storage elastic modulus falling within the above-stated ranges can be synthesized by known methods or obtained as a commercial product. Generally, polyurethane resins that do not contain polyether components, such as polyester polyurethane resins, have high glass transition temperatures and high storage elastic moduli at high temperatures, and are thus desirable as the polyurethane resin employed in the magnetic layer in the present invention. Reference can be made to paragraphs [0004] to [0019] in Japanese Patent No. 3085408 and paragraphs [0012] to [0025] in Japanese Unexamined Patent Publication (KOKAI) No. 2005-293769, as well as Examples in both, for example, for such polyurethane resins. The contents of the above publications are expressly incorporated herein by reference in their entirety.

The binder constituting the magnetic layer of the magnetic recording medium of the present invention is a mixture of polyurethane resin having the above thermal characteristics, vinyl chloride copolymer, and polyisocyanate. From the perspectives of inhibiting surface shavings and achieving dispersion, the blending ratio of the polyurethane resin and vinyl chloride copolymer desirably falls within a range of polyurethane resin:vinyl chloride resin=20:80 to 60:40 (weight ratio).

The vinyl chloride copolymer that is employed in combination with the polyurethane resin is desirably one that maintains good coating (magnetic layer) characteristics imparted by the polyurethane resin. From this perspective, examples of desirable vinyl chloride copolymers are those comprising intramolecular sulfonic acid (salt) groups, hydroxyl groups, and epoxy groups, such as are described in Japanese Examined Patent Publication (KOKOKU) Heisei No. 1-26627. Vinyl chloride copolymers having intramolecular sulfonic acid (salt) groups are desirable to further enhance dispersion of the ultrafine microparticulate magnetic powder.

The number average molecular weight (styrene-converted value measured by GPC) of the above-described polyurethane resin and vinyl chloride resin is, for example, 1,000 to 200,000, desirably 10,000 to 100,000. To achieve better dispersion and durability, one or more polar group selected from the group consisting of —COOM, —SO$_3$M, —OSO$_3$M, —P=O(OM)$_2$, —O—P=O(OM)$_2$ (wherein M denotes a hydrogen atom, or an alkali metal base), OH, NR$_2$, N$^+$R$_3$ (wherein R denotes a hydrocarbon group), epoxy group, SH, and CN can be incorporated as needed by copolymerization or addition reaction into the polyurethane resin and/or vinyl chloride resin. The quantity of such a polar group is, for example, $10^{-1}$ to $10^{-8}$ mol/g, desirably $10^{-2}$ to $10^{-6}$ mol/g.

Normally, a component called a curing agent (or crosslinking agent) that is capable of forming a crosslinked structure with the binder resin is included among the magnetic layer components to increase coating strength. In the present invention, the term "binder" includes such curing agents. In the present invention, a polyisocyanate is employed as the curing agent in the magnetic layer. The use of a polyisocyanate along with a polyurethane resin and a vinyl chloride copolymer can improve the thermal characteristics of the magnetic layer and inhibit the generation of surface shavings. From the perspectives of controlling the storage elastic modulus at 80° C. and the glass transition temperature of the magnetic layer, the quantity of polyisocyanate employed desirably falls within a range of 10 to 100 weight parts and preferably falls within a range of 10 to 60 weight parts per 100 weight parts of vinyl chloride copolymer. The quantity of binder (including the curing agent) in the magnetic layer is desirably 10 to 25 weight parts per 100 weight parts of ferromagnetic powder. From the perspective of both inhibiting shaving of the magnetic layer surface during running and achieving calendering moldability, the glass transition temperature and storage elastic modulus at 80° C. of the binder (mixture of binder components) employed to form the magnetic layer in the present invention are desirably such that the glass transition temperature falls within a range of 80 to 130° C. and the storage elastic modulus at 80° C. falls within a range of 1.5 to 3.0 GPa.

Isocyanates such as trilene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; products of these isocyanates and polyalcohols; and polyisocyanates produced by condensing isocyanates can be employed as the polyisocyanate. A single curing agent or a combination of two or more curing agents utilizing differences in curing reactivity can be employed. Of these, trifunctional and greater polyisocyanates are preferred because they are capable of three-dimensional crosslinking. The polyisocyanates employed in the present invention are all available as commercial products.

(i) Ferromagnetic Powder

In the magnetic recording medium of the present invention, the magnetic layer desirably contains a ferromagnetic powder of equal to or smaller than 40 nm in average particle size to achieve high density recording. The average particle size is desirably equal to or greater than 10 nm from the perspective of achieving stable magnetization without thermal fluctuation. The average particle size preferably falls within a range of 10 to 35 nm from the perspectives of achieving both stable magnetization and high density recording.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2)

above, the average powder size refers to the average plate diameter, with the arithmetic average of (maximum major diameter/thickness or height) being referred to as the average plate ratio. For definition (3), the average powder size refers to the average diameter (also called the average particle diameter).

Acicular ferromagnetic powder, platelike ferrmagnetic powder, spherical ferromagnetic powder, or elliptical ferromagnetic powder can be employed as the ferromagnetic powder. From the perspective of high-density recording, the BET specific surface area ($S_{BET}$) of the acicular ferromagnetic powder is desirably equal to or greater than 40 m$^2$/g but equal to or lower than 80 m$^2$/g, preferably equal to or greater than 50 m$^2$/g but equal to or lower than 70 m$^2$/g. The BET specific surface area ($S_{BET}$) of the platelike ferrmagnetic powder is desirably equal to or greater than 10 m$^2$/g but equal to or lower than 200 m$^2$/g. The BET specific surface area ($S_{BET}$) of the spherical or elliptical ferromagnetic powder is desirably equal to or greater than 30 m$^2$/g but equal to or lower than 100 m$^2$/g, preferably equal to or greater than 50 m$^2$/g but equal to or lower than 70 m$^2$/g.

Reference can be made to [0097] to [0110] of Japanese Unexamined Patent Publication (KOKAI) No. 2009-96798, which is expressly incorporated herein by reference in its entirety, for the details of the above-described magnetic powders.

(iii) Dispersing Agent

When the ferromagnetic powder in the magnetic layer is a microparticulate magnetic powder, especially, an ultrafine microparticulate magnetic powder equal to or smaller than 40 nm in an average particle size, a dispersing agent is desirably employed to further increase the surface smoothness of the magnetic powder by improving the ultrafine microparticulate magnetic powder. In the present invention, the "dispersing agent" means a compound having an effect of improving the dispersibility of the ferromagnetic powder in the magnetic layer relative to the case where the compound is not included. Dispersing agents suitable for use are aromatic compounds and carboxyl group-containing compounds. They are desirably phosphorous aromatic compounds, for example, phenylphosphonic acid described in Japanese Unexamined Patent Publication (KOKAI) No. 2007-257713; and carboxyl group-containing aromatic compounds, for example, benzoic acid described in Japanese Unexamined Patent Publication (KOKAI) Heisei No. 63-42025 as well as cinnamic acid and derivatives thereof described in Japanese Unexamined Patent Publication (KOKAI) Heisei No. 1-232530. The contents of the above publications are expressly incorporated herein by reference in their entirety. Among them, phenylphosphonic acid and cinnamic acid are desirably employed because they can exhibit good effect for improving dispersibility. However, phenylphosphonic acid and other phosphorous compounds may decompose to generate the adhering material to the head. Therefore, cinnamic acid, that has a dispersion-enhancing effect equivalent to those of phosphorus compounds but does not generate material adhering to the head, is particularly preferred. Both cis and trans forms of cinnamic acid exist. Both cis-cinnamic acid and trans-cinnamic acid can be employed in the present invention, but trans-cinnamic acid is desirable in terms of availability. From the perspective of enhancing dispersion, the magnetic recording medium of the present invention desirably contains equal to or more than 1.5 weight part of the dispersing agent per 100 weight parts of ferromagnetic powder in the magnetic layer. From the perspective of high density recording, it is desirable to increase the fill rate of the ferromagnetic powder. Thus, the quantity of additives that are added is desirable reduced within their effective ranges. From these perspectives, the content of the dispersing agent in the magnetic layer is desirably equal to or less than 10 weight parts per 100 weight parts of ferromagnetic powder. From the perspective of achieving both a high fill rate and dispersion of the ferromagnetic powder, the content of the dispersing agent in the magnetic layer is preferably 3 to 10 weight parts per 100 weight parts of ferromagnetic powder.

When preparing the magnetic layer coating liquid, the dispersing agent can be simultaneously mixed with other magnetic layer components such as the ferromagnetic powder and binder, or can be added in two or more separate steps. For example, methods such as simultaneously adding the dispersing agent, the ferromagnetic powder, and the binder; and premixing and dispersing the dispersing agent and the ferromagnetic powder, and then mixing in the binder, can be adopted. Any method can be employed in the present invention.

(iv) Additives

Additives other than the above dispersing agent may be added to the magnetic layer as needed. Examples of such additives are: abrasives, lubricants, dispersing adjuvants, antifungal agents, antistatic agents, oxidation inhibitors, and solvents. Reference can be made to [0111] to [0115] of Japanese Unexamined Patent Publication (KOKAI) No. 2009-96798 for the details, such as specific examples, of the additives.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 100 to 500 m$^2$/g (more preferably 150 to 400 m$^2$/g), the DBP oil absorption capacity is 20 to 400 ml/100 g (more preferably 30 to 200 ml/100 g), the particle diameter is 5 to 80 nm (more preferably 10 to 50 nm, and further preferably, 10 to 40 nm), the pH is 2 to 10, the moisture content is 0.1 to 10 percent, and the tap density is 0.1 to 1 g/ml. For example, the *Carbon Black Handbook* compiled by the Carbon Black Association, which is expressly incorporated herein by reference in its entirety, may be consulted for types of carbon black suitable for use in the magnetic layer. These carbon blacks are commercially available.

The type and weight of the additives that are employed in the present invention can be separately determined as needed for the magnetic layer and the nonmagnetic layer. All or some portion of the additives employed in the present invention can be added during any step during the manufacturing of the magnetic layer and nonmagnetic layer coating liquids. For example, there will be cases where they are admixed to the ferromagnetic powder prior to the kneading step; cases where they are added during the step of kneading the ferromagnetic powder, binder, and solvent; cases where they are added during the dispersing step; cases where they are added after dispersion; and cases where they are added immediately prior to coating.

Nonmagnetic Powder

The magnetic recording medium of the present invention has a nonmagnetic layer in the form of a radiation-cured layer that is obtained by radiation curing a radiation-curable composition containing a nonmagnetic powder and a binder component. For example, the magnetic recording medium of the present invention can be obtained by forming a nonmagnetic layer (radiation-cured layer) by coating and radiation curing a nonmagnetic layer coating liquid (radiation-curable composition) in a manner yielding a prescribed film thickness on the surface of a nonmagnetic support while the nonmagnetic support is running, and then forming a magnetic layer by coating a magnetic layer coating liquid in a manner yielding a prescribed film thickness thereover. Generally, when sequentially multilayer coating the lower nonmagnetic layer coating liquid and the upper magnetic layer coating liquid, a portion of the nonmagnetic layer will sometimes dissolve in the solvent contained in the magnetic layer coating liquid. Here, when the nonmagnetic layer is a radiation-cured layer formed out of a radiation-curable composition, exposure to radiation causes the binder component in the nonmagnetic layer to polymerize, crosslink, and increase in molecular weight, thereby inhibiting or reducing dissolution in the solvent contained in the magnetic layer coating liquid. Thus, it is possible to increase the surface smoothness of the magnetic layer positioned as the upper layer.

In the present invention, as the binder component contained in the radiation-curable composition, the radiation-curable polyurethane resin and radiation-curable vinyl chloride copolymer both having glass transition temperatures falling within a range of 30 to 100° C. are employed. A glass transition temperature of equal to or lower than 100° C. can increase the flexibility of the lower layer, increase the cushioning property of the lower layer, and thus enhance calendering moldability. In the magnetic recording medium of the present invention, the magnetic layer is imparted with the above structure to inhibit shaving of the magnetic layer surface during running as set forth above, thereby reducing the calendering moldability of the magnetic layer itself. Accordingly, in the present invention, the decrease in calendering moldability of the magnetic layer can be compensated for by imparting flexibility to the nonmagnetic layer, that is, by employing binder components with glass transition temperatures of equal to or lower than 100° C. However, the flexibility of the nonmagnetic layer becomes excessive and thus the running stability decreases at a glass transition temperature of less than 30° C., so a lower limit of 30° C. is established. From the perspective of achieving both running stability and calendering moldability, a glass transition temperature of 55 to 100° C. is desirable.

From the perspective of achieving both running stability and calendering moldability, the glass transition temperature of the nonmagnetic layer formed of the above binder components is desirably equal to or higher than 30° C. but equal to or less than 85° C., preferably falling within a range of 60 to 85° C., and more preferably, falling within a range of 65 to 85° C.

The radiation-curable vinyl chloride copolymer and radiation-curable polyurethane resin that are employed as binder components in the nonmagnetic layer are not specifically limited other than that they have glass transition temperatures falling within the above-stated ranges. For example, the radiation-curable vinyl chloride copolymer and polyurethane resin described in Japanese Unexamined Patent Publication (KOKAI) No. 2004-352804, which is expressly incorporated herein by reference in its entirety, can be employed. Reference can be made to the description in paragraphs [0012] to [0019] and Examples therein for the particulars.

Of these, the radiation-curable vinyl chloride copolymer containing the structural unit denoted by general formula (1) below (referred to as "copolymer A" hereinafter) is an example of a radiation-curable vinyl chloride copolymer, and the radiation-curable polyurethane resin obtained employing a starting material in the form of the sulfonic acid (salt) group containing polyol compound denoted by general formula (2) below (referred to as "polyurethane resin B" hereinafter) is an example of a radiation-curable polyurethane resin, that are desirable as binder components in the nonmagnetic layer in the present invention.

Copolymer A and polyurethane resin B will be described below.

(i) Copolymer A

Copolymer A comprises the structural unit denoted by general formula (1) below:

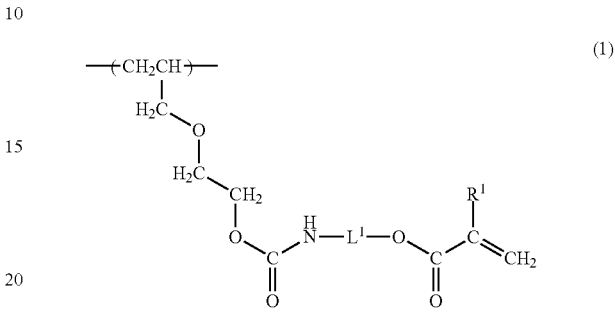

In general formula (1), $R^1$ denotes a hydrogen atom or a methyl group, and $L^1$ denotes a divalent linking group denoted by formula (2), formula (3), or general formula (4):

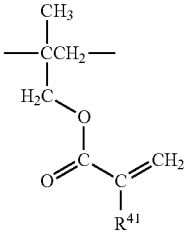

In general formula (4), $R^{41}$ denotes a hydrogen atom or a methyl group.

The radiation-curable vinyl chloride copolymer having the structural unit denoted by general formula (1) can exhibit good curability when exposed to radiation, permitting the prevention of decrease of the magnetic layer surface smoothness due to dissolving the nonmagnetic layer into the magnetic layer coating liquid. The high curability is attributed to the fact that the radiation-curable functional groups incorporated are highly reactive and the structure has adequate flexibility. That is, the present inventors presume that in the structure denoted by general formula (1), the fact that the (meth)acryloyloxy group enclosed in the round frame was a particularly highly reactive group among various radiation-curable functional groups, and the fact that the portion linking it to the main chain enclosed in the square frame had adequate flexibility to allow the formation of a crosslinked structure are why Copolymer A could exhibit good curability when exposed to radiation. In contrast, it is thought that, even though resins in which highly reactive radiation-curable functional groups have been incorporated have structures that are rigid, the radiation-curable functional groups are unable to adequately approach each other, making it difficult for a crosslinked structure to form.

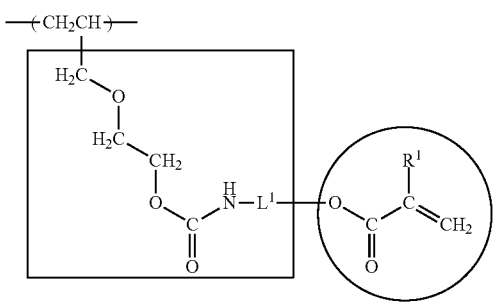

(1)

(Details of formula (1) will be described further below.)

Copolymer A is a vinyl chloride copolymer comprising a radiation-curable functional group that can undergo a curing (crosslinking) reaction when exposed to radiation. At least one of the radiation-curable functional groups is a (meth) acryloyloxy group comprised in the structural unit denoted by general formula (1). As stated above, it is presumed that in Copolymer A, a highly reactive (meth)acryloyloxy group is bonded to the main chain through a linking portion of suitable flexibility, thereby exhibiting high curability when exposed to radiation.

In the present invention, the term "(meth)acryloyloxy group" is to be construed as including both methacryloyloxy and acryloyloxy groups, and the term "(meth)acrylate is to be construed as including both methacrylate and acrylate.

Copolymer A can also comprise a group other than a (meth) acryloyloxy group as a radiation-curable functional group. Examples of such radiation-curable functional groups that are desirable in terms of reactivity are radical polymerizable carbon-carbon double-bond groups, with acrylic double-bond groups being preferred. In this context, the term "acrylic double-bond groups" refers to residues of acrylic acids, acrylic acid esters, amide acrylates, methacrylic acids, methacrylic acid esters, and amide methacrylates.

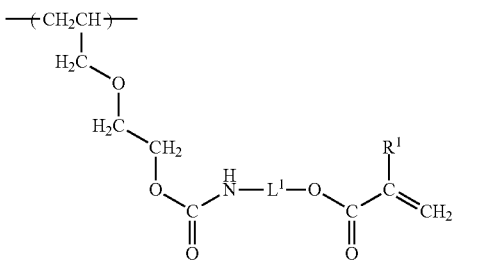

(1)

General formula (1) will be described in greater detail below.

In general formula (1), $R^1$ denotes a hydrogen atom or a methyl group. A high degree of curability can be achieved regardless of whether $R^1$ denotes a hydrogen atom or a methyl group. From the perspective of availability, $R^1$ desirably denotes a methyl group.

In general formula (1), $L^1$ denotes a divalent linking group denoted by formula (2), formula (3), or general formula (4), below. In general formula (4), $R^{41}$ denotes a hydrogen atom or a methyl group. From the perspective of availability, $R^{41}$ desirably denotes a hydrogen atom. Although varying with the system being employed, from the perspective of curability, the divalent linking groups denoted by formula (3) and general formula (4) are generally desirable. From the perspective of cost, the divalent linking groups denoted by formulas (2) and (3) are desirable.

$$—CH_2CH_2—, \qquad (2)$$

$$—CH_2CH_2OCH_2CH_2—, \qquad (3)$$

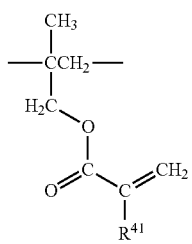

(4)

From the perspective of further increasing curability during exposure to radiation, the structural unit denoted by general formula (1) desirably constitutes equal to or more than one mole percent of all polymerizing units (100 mole percent) in Copolymer A. The upper limit of the content of the structural unit denoted by general formula (1) in Copolymer A is not specifically limited. However, by way of example, an adequate effect can be achieved at about equal to or less than 5 mole percent. In Copolymer A, the structural unit denoted by general formula (1) desirably constitutes equal to or more than 1 mole percent and equal to or less than 50 mole percent of all polymerizing units (100 percent). Incorporating the structural unit denoted by general formula (1) within the above range in Copolymer A makes it possible to achieve even higher curability.

Since Copolymer A is a vinyl chloride copolymer, a vinyl chloride-derived structural unit (the following structural unit) is contained along with the structural unit denoted by general formula (1).

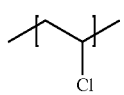

The content of the above structural unit derived from vinyl chloride in Copolymer A is not specifically limited. However, it desirably constitutes about 50 to 99 mole percent of all polymerizing units (100 mole percent).

Copolymer A can contain the structural unit denoted by general formula (5) below. The incorporation of the structural unit denoted by general formula (5) below can effectively enhance curability. Since the synthesis reaction of a copolymer containing the structural unit denoted by general formula (5) is uncomplicated, this structural unit is desirable in terms of synthesis suitability.

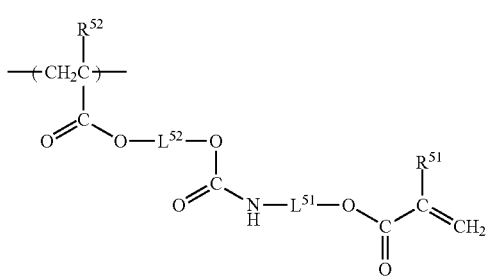

(5)

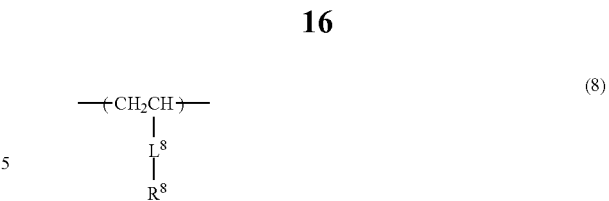

(8)

General formula (5) will be described below.

In general formula (5), each of $R^{51}$ and $R^{52}$ independently denotes a hydrogen atom or a methyl group. High curability can be achieved regardless of whether $R^{51}$ and $R^{52}$ denote hydrogen atoms or methyl groups. From the perspective of availability, $R^{51}$ and $R^{52}$ desirably denote methyl groups. In general formula (5), $L^{51}$ denotes the divalent linking group denoted by formula (2), formula (3), or general formula (4) described above.

In general formula (5), $L^{52}$ denotes a divalent linking group. The divalent linking group denoted by $L^{52}$ is desirably an alkyleneoxy group or alkylene group with 1 to 25 carbon atoms, preferably an alkyleneoxy group or alkylene group with 1 to 20 carbon atoms, and more preferably, a methylene group, ethylene group, propylene group, butylene group, ethyleneoxy group, diethyleneoxy group, or triethyleneoxy group. These groups may comprise substituents. In such cases, the number of carbon atoms refers to the number of carbon atoms of the moiety excluding substituents.

Desirable substituents that can be incorporated into $L^{52}$ are alkyl groups having 1 to 20 carbon atoms. Among these, alkyl groups with 1 to 15 carbon atoms are desirable, alkyl groups with 1 to 10 carbon atoms are preferred, and alkyl groups with 1 to 7 carbon atoms are of greater preference. Taking into account starting materials, suitability to synthesis, and the like, specific examples of optimal substituents are methyl groups, ethyl groups, branched or linear propyl groups, branched or linear butyl groups, branched or linear pentyl groups, and branched or linear hexyl groups.

In Copolymer A, it is possible to incorporate, for example, the structural unit denoted by general formula (5) in a proportion of equal to or more than 1 mole percent and equal to or less than 45 mole percent of all polymerizing units (100 mole percent). Incorporation of the structural unit denoted by general formula (5) within the above-stated range in Copolymer A can further enhance curability.

Copolymer A can comprise a cyclic ether structure. The incorporation of a cyclic ether structure can effectively enhance stability during copolymer synthesis and curability under a variety of conditions. A cyclic ether structure is also effective as a functional group for introducing a polar group into the copolymer. The cyclic ether structure is desirably an oxirane ring, oxetane ring, tetrahydrofuran ring, tetrahydropyran ring, or crown ether; preferably an oxirane ring, oxetane ring, tetrahydrofuran ring, or tetrahydropyran ring; and more preferably, an oxirane ring, oxetane ring, or tetrahydrofuran ring. The cyclic ether structure can be contained, for example, on a side chain portion of the copolymer. An example of a desirable embodiment is the incorporation of a cyclic ether structure into the structural unit denoted by general formula (8) below.

In general formula (8), for example, $L^8$ denotes a divalent linking group, such as an oxyalkylene group in the form of $-CH_2OCH_2-$. $R^8$ denotes a cyclic ether structure, the details of which are as set forth above.

From the perspective of enhancing curability, Copolymer A desirably comprises from 1 to 100 cyclic ether structures per molecule. The content of the structural unit denoted by general formula (8) above is, for example, desirably equal to or more than 1 mole percent and equal to or less than 45 mole percent of all polymerizing units (100 mole percent).

Polar groups are widely incorporated into magnetic recording medium binders to increase the dispersion of magnetic powder, nonmagnetic powder, and the like. Accordingly, from the perspective of suitability as a magnetic recording medium binder, the presence of a polar group in Copolymer A is desirable to enhance dispersibility. Examples of the polar group are hydroxyalkyl groups, carboxylic acid (salt) groups, sulfonic acid (salt) groups, sulfuric acid (salt) groups, and phosphoric acid (salt) groups. In the present invention, the term "sulfonic acid (salt) group" refers to substituents in which a in general formula (A) below denotes 0, including the sulfonic acid group ($-SO_3H$) and sulfonate groups such as $-SO_3Na$, $-SO_3Li$, and $-SO_3K$. Further, the term "sulfuric acid (salt) group" refers to substituents in which a in general formula (A) denotes 1, including the sulfuric acid group and sulfate groups in the same manner as above. The same applies to carboxylic acid (salt) groups, phosphoric acid (salt) groups, and the like.

(A)

In general formula (A), M denotes a hydrogen atom or a cation; the symbol "*" denotes a bond position; and a denotes 0 or 1. When a=0 as set forth above, the substituent denoted by general formula (A) is a sulfonic acid (salt) group. When a=1, the substituent denoted by general formula (A) is a sulfuric acid (salt) group.

The cation may be an inorganic cation or an organic cation. The cation electrically neutralizes the $-(O)_aSO_3^-$ in general formula (A); it is not limited to a monovalent cation, and may be a divalent or greater cation. The cation denoted by M is desirably a monovalent cation. When a cation of n-valence is employed, it means (1/n) mole of cations relative to the substituent denoted by general formula (A).

The inorganic cations are not specifically limited. Alkali metal ions and alkaline earth metal ions are desirable, alkali metal ions are preferred, and $Li^+$, $Na^+$, and $K^+$ are of greater preference.

Examples of organic ions are ammonium ions, quaternary ammonium ions, and pyridinium ions.

M desirably denotes a hydrogen atom, alkali metal ion, quaternary ammonium ion, or pyridinium ion; preferably denotes a hydrogen atom, $Li^+$, $Na^+$, $K^+$, tetraalkylammonium ion, or pyridinium ion; and more preferably denotes $K^+$, a tetraalkylammonium ion, or a pyridinium ion.

An example of an embodiment of Copolymer A containing a sulfuric acid (salt) group is one that comprises the structural unit denoted by general formula (6) below in which a sulfuric acid (salt) group has been substituted for the structural unit denoted by general formula (1).

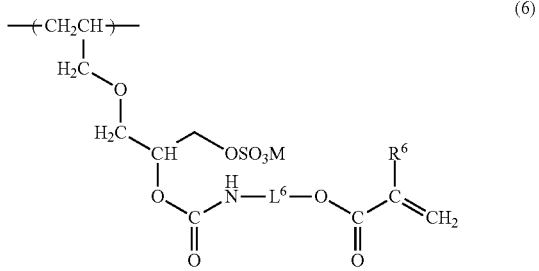

(6)

In general formula (6), M denotes a hydrogen atom or a cation. The details are as set forth for M in general formula (A).

In general formula (6), $R^6$ denotes a hydrogen atom or a methyl group; $L^6$ denotes the divalent linking group denoted by formula (2), formula (3), or general formula (4) described above. The details regarding $R^6$ and $L^6$ in general formula (6) are as set forth for $R^1$ and $L^1$ in general formula (1).

In Copolymer A, for example, a sulfonic acid (salt) group can be incorporated in the structural unit denoted by general formula (7).

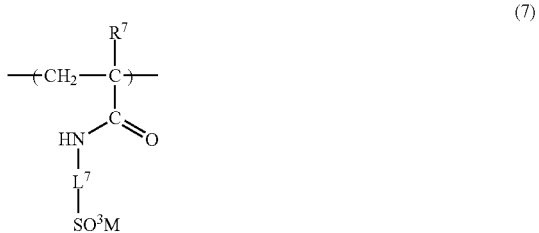

(7)

In general formula (7), $R^7$ denotes a hydrogen atom or a methyl group, and $L^7$ denotes a divalent linking group, desirably an optionally branched alkylene group having 1 to 7 carbon atoms. The alkylene group may comprise a substituent. The details of the substituent are as set forth for the substituents contained in $L^2$.

In general formula (7), M denotes a hydrogen atom or a cation. The details are as set forth for M in general formula (A).

However, Copolymer A is not limited to those comprising structural unit (6) or (7). It can comprise a polar group such as a sulfonic acid (salt) group or sulfuric acid (salt) group at any position. A description of the quantity of polar groups contained in Copolymer A will be given further below.

The method of synthesizing Copolymer A will be described next.

Copolymer A is a vinyl chloride copolymer containing a structural unit denoted by general formula (1) derived from the vinyl monomer. Thus, it is synthesized by copolymerizing at least a vinyl chloride monomer and vinyl monomer for introducing the structural unit denoted by general formula (1). In the copolymerization reaction, for example, other monomers, such as monomers for introducing the structural units denoted by general formulas (5) to (8) can be copolymerized. Examples of specific embodiments of the synthesis reaction are:

(A-1) the method of conducting a copolymerization reaction employed a monomer having a radiation-curable functional group as a starting material monomer;

(A-2) the method of copolymerizing the starting material monomers of the vinyl chloride copolymer in the presence of a compound containing a radiation-curable functional group; and (A-3) the method of incorporating a radiation-curable functional group onto the side chain of a vinyl chloride copolymer by means of a polymer reaction.

These embodiments can be combined as needed to obtain Copolymer A.

The following monomers are examples of starting material monomers that can be employed in each of the above embodiments: vinyl chloride, vinylidene chloride, optionally substituted (meth)acrylic acid, optionally substituted alkyl(meth)acrylates, optionally substituted aryl(meth)acrylates, optionally substituted (meth)acrylamides, (meth)acryloyl morpholines, aromatic hydrocarbon rings comprising vinyl groups (various styrenes), heteroaromatic rings comprising vinyl groups (vinylcarbazoles), maleic anhydride, derivatives thereof, fatty acid vinyl esters (various acetoxyethylenes), various benzoyloxyethylenes, optionally substituted alkyl allyl ethers, (meth)acrylonitrile, (meth)crotonnitrile, ethylene, butadiene, itaconic acid esters, crotonic acid esters, and vinyl pyrrolidones. In the above, the term (meth)acrylic acid includes both acrylic acid and methacrylic acid. The same applies to all terms containing "(meth)."

The following monomers are examples of monomers that are desirable in terms of ease of the synthesis reaction: vinyl chloride, vinylidene chloride, optionally substituted (meth)acrylic acid, optionally substituted (cyclo)alkyl(meth)acrylates having 1 to 25 carbon atoms, optionally substituted aryl(meth)acrylates having 1 to 25 carbon atoms, (meth)acrylamide, optionally substituted secondary or tertiary (cyclo)alkyl(meth)acrylamides having 1 to 25 carbon atoms, optionally substituted secondary or tertiary aryl(meth)acrylamides having 1 to 25 carbon atoms, optionally substituted (meth)acryloylmorpholines having 1 to 25 carbon atoms, substituted or unsubstituted aromatic hydrocarbon rings having 1 to 25 carbon atoms and comprising vinyl groups, substituted or unsubstituted heteroaromatic rings having 1 to 25 carbon atoms and comprising vinyl groups, maleic anhydride, substituted or unsubstituted partially esterified maleic acid having 1 to 25 carbon atoms, substituted or unsubstituted partially amidated maleic acid having 1 to 25 carbon atoms, itaconic acid, optionally substituted itaconic acid (cyclo) alkyl esters having 1 to 25 carbon atoms, optionally substituted itaconic acid aryl esters having 1 to 25 carbon atoms, crotonic acid, optionally substituted crotonic acid (cyclo) alkyl esters having 1 to 25 carbon atoms, optionally substituted crotonic acid aryl esters having 1 to 25 carbon atoms, optionally substituted acetoxyethylenes having 1 to 25 carbon atoms, optionally substituted benzoyloxyethylenes having 1 to 25 carbon atoms, optionally substituted alkyl allyl ethers, (meth)acrylonitrile, (meth)crotonnitrile, ethylene, butadiene, and vinylpyrrolidone.

Of these, the following monomers are examples of desirable monomers: vinyl chloride, vinylidene chloride, (meth)acrylic acid, optionally substituted (cyclo)alkyl (meth)acrylates having 1 to 20 carbon atoms, optionally substituted aryl(meth)acrylates having 1 to 20 carbon atoms, (meth)acrylamides, optionally substituted secondary and tertiary (cyclo) alkyl(meth)acrylamides having 1 to 20 carbon atoms, optionally substituted secondary and tertiary aryl(meth)acrylamides having 1 to 20 carbon atoms, optionally substituted (meth)acryloylmorpholines having 1 to 20 carbon atoms, substituted or unsubstituted aromatic hydrocarbon rings comprising vinyl groups and having 1 to 20 carbon atoms, substituted or unsubstituted heteroaromatic rings comprising vinyl groups and having 1 to 20 carbon atoms, maleic anhydride, substituted or unsubstituted partially esterified maleic acid having 1 to 20 carbon atoms, substituted or unsubstituted partially amidated maleic acid having 1 to 20 carbon atoms, itaconic acid, optionally substituted itaconic acid (cyclo)alkyl esters having 1 to 20 carbon atoms, optionally substituted itaconic acid aryl esters having 1 to 20 carbon atoms, crotonic acid, optionally substituted crotonic acid (cyclo)alkyl esters having 1 to 20 carbon atoms, optionally substituted crotonic acid aryl esters having 1 to 20 carbon atoms, optionally substituted acetoxyethylenes having 1 to 20 carbon atoms, optionally substituted benzoyloxyethylenes having 1 to 20 carbon atoms, optionally substituted alkyl allyl ethers having 1 to 20 carbon atoms, optionally substituted (meth)acrylonitriles having 1 to 20 carbon atoms, (meth) crotonnitrile, ethylene butadiene, and vinylpyrrolidone.

Of these, the following monomers are examples of preferred monomers: (meth)acrylic acid, optionally substituted methyl(meth)acrylates, ethyl(meth)acrylates, linear and branched propyl(meth)acrylates, linear and branched butyl (meth)acrylates, linear and branched pentyl(meth)acrylates, normal hexyl(meth)acrylate, cyclohexyl(meth)acrylate, normal heptyl(meth)acrylate, 2-ethyl hexyl(meth)acrylate, normal octyl(meth)acrylate, normal decyl(meth)acrylates, normal dodecyl(meth)acrylates, optionally substituted adamantyl (meth)acrylate, isobornyl(meth)acrylate, norbornane methyl(meth)acrylate, norbornene methyl (meth)acrylate, optionally substituted benzyl(meth)acrylate, naphthyl methyl(meth)acrylate, anthracene methyl(meth)acrylate, phenyl ethyl(meth)acrylate, optionally substituted phenyl (meth)acrylate, naphthyl(meth)acrylate, (meth)acrylamide, optionally substituted (di)methyl (meth)acrylamide, (di)ethyl (meth)acrylamide, linear and branched (di)propyl(meth) acrylamides, linear and branched (di)butyl(meth)acrylamides, linear and branched (di)pentyl (meth)acrylamide, (di) normal hexyl(meth)acrylamide, (di) cyclohexyl(meth)acrylamide, (di-) 2-ethylhexyl(meth)acrylamide, optionally substituted adamantyl(meth)acrylamide, noradamantyl(meth) acrylamide, optionally substituted benzyl(meth)acrylamide, naphthyl ethyl (meth)acrylamide, phenyl ethyl(meth)acrylamide, optionally substituted (di) phenyl (meth)acrylamide, naphthyl(meth)acrylamide, (meth)acryloyl morpholine, piperidyl acrylamide, pyrrolidyl acrylamide, (α-methyl-)styrene, styrene sulfonic acid (salt), chloromethyl styrene, vinylpyridine, vinylimidazole, vinyltriazole, maleic anhydride, itaconic acid, crotonic acid, optionally substituted methyl crotonate, ethyl crotonate, linear and branched propyl crotonate, linear and branched butyl crotonate, linear and branched pentyl crotonate, normal hexyl crotonate, cyclohexyl crotonate, normal heptyl crotonate, 2-ethylhexyl crotonate, normal octyl crotonate, normal decyl crotonate, normal dodecyl crotonate, optionally substituted adamantyl crotonate, isobornyl crotonate, norbornene methyl crotonate, norbornene methyl crotonate, optionally substituted benzyl crotonate, naphthyl methyl crotonate, anthracene methyl crotonate, phenyl ethyl crotonate, optionally substituted phenyl crotonate, naphthyl crotonate, optionally substituted acetoxyethylene, optionally substituted benzoyloxyethylene, 2-hydroxyethyl allyl ether, 2-hydroxypropyl allyl ether, 3-hydroxypropyl allyl ether, optionally substituted vinylcarbazole, vinylpyrrolidone, (meth)acrylonitrile, ethylene, butadiene, and (meth)crotonnitrile.

Use of the following monomers is desirable from perspectives relating to suitability to use in magnetic recording media, such as solubility in solvents and coating suitability: methyl (meth)acrylate, ethyl(meth)acrylate, normal propyl (meth)acrylate, isopropyl(meth)acrylate, normal butyl(meth) acrylate, isobutyl(meth)acrylate, sec-butyl(meth)acrylate, normal pentyl (meth)acrylate, isopentyl(meth)acrylate, vinyl acetate, vinyl alcohol, 2-hydroxyethyl (meth)acrylate, polyethylene glycol (meth)acrylate, 2-hydroxypropyl(meth)acrylate, 3-hydroxypropyl(meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl(meth)acrylate, allyl glycidyl ether, phosphoethyl (meth)acrylate, sulfoethyl(meth)acrylate, p-styrene sulfonic acid, 2-acrylamide-2-methylpropanesulfonic acid, and metal salts such as Na salts and K salts, ammonium salts, and pyridine salts thereof.

Examples of copolymerizing monomers that can be employed are the above monomers into which radiation-curable functional groups have been incorporated. The details of the radiation-curable functional groups are as set forth above.

Other hydrophilic monomers may be suitably employed as the above copolymerizing monomers. Monomers comprising phosphoric acid, phosphoric acid esters, quaternary ammonium salt, ethyleneoxy chains, propyleneoxy chains, sulfonic acid, sulfuric acid groups, carboxylic acid groups, salts thereof (such as metal salts), morpholinoethyl groups, and the like can be employed.

Examples of substituents that can be present in the above-described monomer are those comprising partial structures in the form of alkyl groups, alkoxy groups, aryl groups, aryloxy groups, acyl groups, acyloxy groups, alkoxycarbonyl groups, aryloxycarbonyl groups, arylcarbonyl groups, amino groups dialkylamino groups, alkylamino groups, halogen atoms, hydroxyl groups, carboxyl groups, cyano groups, furyl groups, furfuryl groups, oxetane rings, oxirane rings, furan rings, tetrahydrofuran rings, tetrahydrofuryl rings, alkylthio groups, trimethylsilyl groups, trifluoromethyl groups, carboxyl groups, thienyl groups, morpholino groups, morpholinocarbonyl groups, —$OSO_3H$ groups, —$SO_3H$ groups, phosphoric acid, phosphonic acid, phosphinic acid, and the like.

The following are desirable as the above substituents: substituents having partial structures in the form of alkyl groups having 1 to 20 carbon atoms, alkoxy groups having 1 to 20 carbon atoms, aralkyl groups having 1 to 20 carbon atoms, aryl groups having 1 to 20 carbon atoms, aryloxy groups having 1 to 20 carbon atoms, acyloxy groups having 1 to 20 carbon atoms, acyl groups having 1 to 20 carbon atoms, alkoxycarbonyl groups having 1 to 20 carbon atoms, aryloxycarbonyl groups having 1 to 20 carbon atoms, arylcarbonyl groups having 1 to 20 carbon atoms, amino groups, dialkylamino groups having 1 to 20 carbon atoms, alkylamino groups having 1 to 20 carbon atoms, halogen atoms, hydroxyl groups, carboxyl groups, cyano groups, furyl groups, furfuryl groups, oxetane rings, oxirane rings, furan rings, tetrahydrofuran rings, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —$OSO_3H$ groups, —$SO_3H$ groups, phosphoric acid, phosphonic acid, and phosphinic acid; halogen atoms; and the like.

Of these, the following are preferred as the above substituents: substituents having partial structures in the form of alkyl groups having 1 to 15 carbon atoms, alkoxy groups having 1 to 15 carbon atoms, aralkyl groups having 1 to 15 carbon atoms, aryl groups having 1 to 15 carbon atoms, aryloxy groups having 1 to 15 carbon atoms, acyloxy groups having 1 to 15 carbon atoms, acyl groups having 1 to 15 carbon atoms, alkoxycarbonyl groups having 1 to 15 carbon atoms, aryloxycarbonyl groups having 1 to 15 carbon atoms, arylcarbonyl groups having 1 to 15 carbon atoms, amino groups, dialkylamino groups having 1 to 15 carbon atoms, alkylamino groups having 1 to 15 carbon atoms, halogen atoms, hydroxyl groups, carboxyl groups, cyano groups, furyl groups, furfuryl groups, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —$OSO_3H$ groups, —$SO_3H$ groups, phosphoric acid, phosphonic acid, and phosphinic acid; halogen atoms; and the like.

The following are particularly preferred as the above substituents: substituents having partial structures in the form of methyl groups, ethyl groups, linear or branched propyl groups, linear or branched butyl groups, linear or branched pentyl groups, normal hexyl groups, cyclohexyl groups, normal heptyl groups, 2-ethylhexyl groups, normal octyl groups, normal decyl groups, normal dodecyl groups, methyloxy groups, ethyloxy groups, linear or branched propyloxy groups, linear or branched butyloxy groups, linear or branched pentyloxy groups, normal hexyloxy groups, cyclohexyloxy groups, normal heptyloxy groups, 2-ethylhexyloxy group, normal octyloxy groups, normal decyloxy groups, normal dodecyloxy groups, benzyl groups, phenethyl groups, naphthylmethyl groups, napthylethyl groups, phenyl groups, naphthyl groups, phenyloxy groups, naphthyloxy groups, methylcarbonyloxy groups, ethylcarbonyloxy groups, linear or branched propylcarbonyloxy groups, linear or branched butylcarbonyloxy groups, linear or branched pentylcarbonyloxy groups, normal hexylcarbonyloxy groups, cyclohexylcarbonyloxy groups, normal heptylcarbonyloxy groups, 2-ethylhexylcarbonyloxy groups, normal octylcarbonyloxy groups, normal decylcarbonyloxy groups, normal dodecylcarbonyloxy groups, methylcarbonyl groups (acetyl groups), ethylcarbonyl groups, linear or branched propylcarbonyl groups, linear or branched butylcarbonyl groups, linear or branched pentylcarbonyl groups, normal hexylcarbonyl groups, cyclohexylcarbonyl groups, normal heptylcarbonyl groups, 2-ethylhexylcarbonyl groups, normal octylcarbonyl groups, normal decylcarbonyl groups, normal dodecylcarbonyl groups, methyloxycarbonyl groups, ethyloxycarbonyl groups, linear or branched propyloxycarbonyl groups, linear or branched butyloxycarbonyl groups, linear or branched pentyloxycarbonyl groups, normal hexyloxycarbonyl groups, cyclohexyloxycarbonyl groups, normal heptyloxycarbonyl groups, 2-ethylhexyloxycarbonyl groups, normal octyloxycarbonyl groups, normal decyloxycarbonyl groups, normal dodecyloxycarbonyl groups, benzoyl groups, naphthylcarbonyl groups, (di)methylamino groups, (di)ethylamino groups, linear or branched (di)propylamino groups, linear or branched (di)butylamino groups, linear or branched (di)pentylamino groups, (di)normal hexylamino groups, (di)cyclohexylamino groups, (di)normal heptylamino groups, (di)-2-ethylhexylamino groups, fluorine atoms, chlorine atoms, bromine atoms, hydroxyl groups, carboxyl groups, cyano groups, furyl groups, furfuryl groups, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —$OSO_3H$ groups, —$SO_3H$ groups, phosphoric acid, phosphonic acid, and phosphinic acid. Fluorine atoms, chlorine atoms, bromine atoms, and the like are preferred. These substituents may be further substituted with the above substituents.

The type and number of starting material monomers are not specifically limited other than that at least two monomers be employed in the form of vinyl chloride and a vinyl-based monomer for introducing the structural unit denoted by general formula (1). In addition to these two monomers, for example, 1 to 12 monomers may be employed, 1 to 10 monomers are desirably employed in combination, and 1 to 8 monomers are preferably employed in combination. In the blending of starting material monomers, it suffices to determine the composition of the copolymer desired. The content of the vinyl chloride monomer in the starting material monomers is desirably equal to or more than 60 weight percent and equal to or less than 95 weight percent in that good mechanical strength can be achieved, good solvent solubility can be attained, and a suitable solution viscosity can be achieved, resulting in good dispersion.

In embodiments (A-2) and (A-3) above, examples of the radiation-curable functional group-containing compound that is used to introduce a radiation-curable functional group are: (meth)acrylic acid, glycidyl(meth)acrylate, hydroxyalkyl(meth)acrylate, 2-isocyanatoethyl (meth)acrylate, 2-methacryloyloxyethyl isocyanate, 2-(2-isocyanate ethyloxy)ethyl methacrylate, 2-acryloyloxyethyl isocyanate, 1,1-bis(acryloyloxymethyl)ethyl isocyanate, and other compounds containing carbon-carbon double bond groups.

Taking into account ease of synthesis, cost, and availability of starting materials, the method of synthesizing Copolymer A is desirably embodiment (A-3), in which a polymer reaction is used to incorporate a radiation-curable functional group. The vinyl chloride copolymer employed in this embodiment is not specifically limited. A vinyl chloride copolymer comprising an active hydrogen group such as a hydroxyl group or a primary or secondary amine within the molecule is desirable in that a radiation-curable functional group can be readily introduced into the side chain by reaction with an isocyanate compound comprising a radiation-curable functional group. Such a vinyl chloride copolymer can be synthesized by known methods employing, for example, the above monomers that are capable of the copolymerization.

As set forth above, Copolymer A can comprise a polar group such as a sulfonic acid (salt) group. A single polar group, or two or more polar groups, can be incorporated. The incorporation of multiple polar groups is sometimes desirable in that, compared to when only a single polar group is incorporated, solubility in solvents such as cyclohexanone that are employed in the field of magnetic recording media is sometimes enhanced. The polar group can be introduced into Copolymer A by a known method such as copolymerization or an addition reaction. Further, a sulfonic acid (salt) group-containing vinyl chloride copolymer can be converted to another sulfonate group-containing vinyl chloride copolymer by salt exchange. Further, a known method can be employed to remove the salt and obtain sulfonic acid group-containing vinyl chloride copolymer.

The synthesis reaction and reactions incorporating the radiation-curable functional group or polar group to obtain Copolymer A can be conducted by dissolving the starting material compounds in a solvent (reaction solvent), and heating, pressurizing, substituting nitrogen, and the like as needed. Commonly employed reaction conditions can be employed as the conditions for the above reaction, such as the reaction temperature and duration of the reaction.

A known reaction catalyst can be employed in the above reaction. Examples are amine catalysts, organic tin catalysts, and organic bismuth catalysts. Examples of amine catalysts are: diethylene triamine, N-methyl morpholine, tetramethyl hexamethylene diamine, dimethyl formamide, dimethyl acetamide, and N-methylpyrrolidone. Examples of organic tin catalysts are dibutyltin dilaurate, dioctyltin dilaurate, dibutyltin didecanate, and dioctyltin didecanate. An example of an organic bismuth catalyst is bismuth tris(2-ethylhexanoate). An organic tin catalyst or an organic bismuth catalyst is desirably employed as the catalyst in the present invention.

The quantity of catalyst added is, for example, 0.00001 to 5 weight parts, desirably 0.0001 to 1 weight part, and preferably, 0.00001 to 0.1 weight part, relative to the total weight of the starting material compounds employed in the reaction.

A known solvent that is commonly employed in the above reactions can be selected as the reaction solvent. Examples are ketone solvents such as acetone, methyl ethyl ketone, and cyclohexanone; ester solvents such as methyl acetate, ethyl acetate, and ethyl lactate; ether solvents such as dioxane and tetrahydrofuran; aromatic solvents such as toluene and xylene; amide solvents such as N,N-dimethyl formamide, N,N-dimethyl acetamide, and N-methyl pyrrolidone; sulfoxide solvents such as dimethyl sulfoxide; methylene chloride; chloroform; and cyclohexane.

Following the synthesis reaction, purification and the like can be conducted by a known method as needed to obtain Copolymer A. The fact that the targeted copolymer has been obtained can be confirmed by a known identification method such as NMR. The use of methyl ethyl ketone, cyclohexanone, or a mixed solvent thereof, which are widely used in coating liquids for forming magnetic recording media, as the reaction solvent for the synthesis reaction makes it possible to employ the reaction solution following synthesis as is, or after adding an optional additive, as the coating liquid for forming a magnetic recording medium.

The various physical properties of Copolymer A will be described next.

(a) Average Molecular Weight, Molecular Weight Distribution

Copolymer A desirably has a weight average molecular weight of equal to or greater than 10,000 and equal to or less than 500,000 (in the present invention, "equal to or greater than 10,000 and equal to or less than 500,000" is also denoted as "10,000 to 500,000"; identical below), preferably 10,000 to 400,000, and more preferably, 10,000 to 300,000. A weight average molecular weight of equal to or greater than 10,000 is desirable in that the storage property of a coating layer formed using Copolymer A as binder will be good. A weight average molecular weight of equal to or less than 500,000 is desirable in that good dispersion can be achieved.

The molecular weight distribution (weight average molecular weight Mw/number average molecular weight Mn) of Copolymer A is desirably 1.00 to 5.50, preferably 1.01 to 5.40. A molecular weight distribution of equal to or lower than 5.50 is desirable in that the composition distribution can be narrow and good dispersion can be achieved. The weight average molecular weight and molecular weight distribution (Mw/Mn) normally change little or not at all before and after the reaction introducing a radiation-curable functional group and/or a polar group into the vinyl chloride copolymer.

(b) Glass Transition Temperature

As set forth above, the glass transition temperature (Tg) of Copolymer A is 30° C. to 100° C., desirably 55° C. to 100° C.

(c) Polar Group Content

As set forth above, Copolymer A desirably comprises a polar group.

The content of the polar group in the radiation-curable vinyl chloride copolymer is desirably 1.0 to 3,500 mmol/kg, preferably 1.0 to 3,000 mmol/kg, and more preferably, 1.0 to 2,500 mmol.

A polar group content of equal to or higher than 1.0 mmol/kg is desirable in that adequate strength of adsorption to powder such as ferromagnetic powder and nonmagnetic powder can be achieved and good dispersion can be attained. A polar group content of equal to or lower than 3,500 mmol/kg is desirable in that good dissolution in solvent can be achieved. As set forth above, a polar group in the form of the sulfonic acid (salt) group or sulfuric acid (salt) group denoted by general formula (A) is desirable. The content of polar groups selected from the group consisting of sulfonic acid (salt) groups and sulfuric acid (salt) groups is desirably equal to or greater than 10 mmol/kg and equal to or less than 2,000 mmol/kg from the perspective of achieving both dispersion and solvent solubility.

(d) Hydroxyl Group Content

Copolymer A desirably contains hydroxyl (OH) groups. The number of hydroxyl groups contained is desirably 1 to 100,000, preferably 1 to 10,000, per molecule. When the number of hydroxyl groups falls within this range, solubility in solvent can increase and good dispersion can be achieved.

(e) Radiation-Curable Functional Group Content

Copolymer A contains a (meth)acryloyloxy group in the form of the radiation-curable functional group in the functional unit denoted by general formula (1), and can contain various other radiation-curable functional groups. The details of these radiation-curable functional groups are as set forth above. The content of the radiation-curable functional group in Copolymer A is desirably 1.0 to 4,000 mmol/kg, preferably 1.0 to 3,000 mmol/kg, and more preferably, 1.0 to 2,000 mmol/kg. A radiation-curable functional group content of equal to or higher than 1.0 mmol/kg is desirable in that a coating of high strength can be formed by radiation-curing. A radiation-curable functional group content of equal to or lower than 4,000 mmol/kg is desirable in that good calendering moldability can be achieved even when calendering is conducted after radiation-curing, and thus a magnetic recording medium with good electromagnetic characteristics can be achieved.

Specific examples of Copolymer A are given below. However, the present invention is not limited to the specific examples below. The numbers positioned to the right of the various structural units below denotes mole ratios of the various structural units to all polymerizing units in the copolymer.

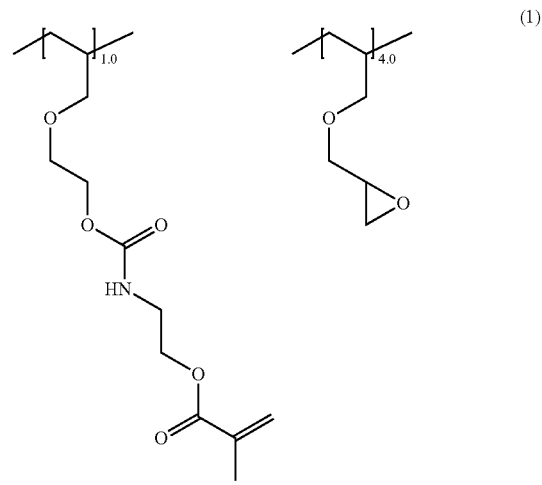

25
-continued
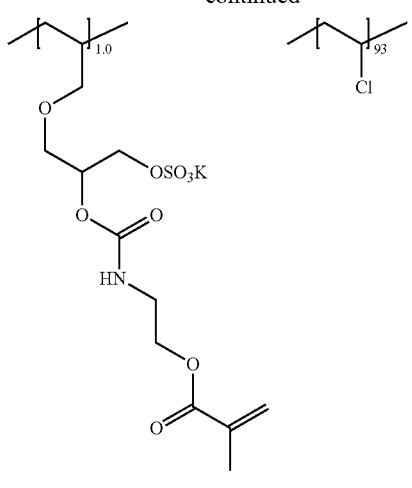
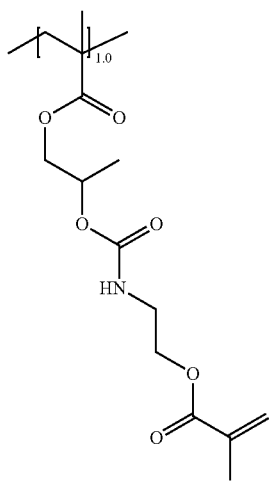
(mol %)
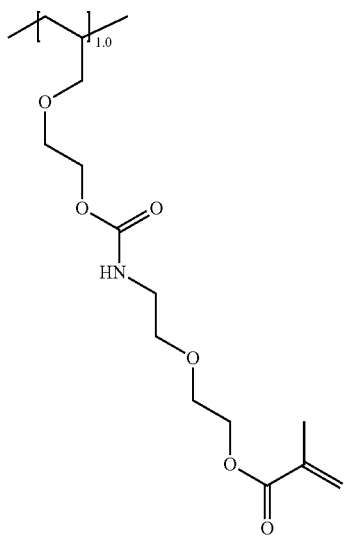
26
-continued
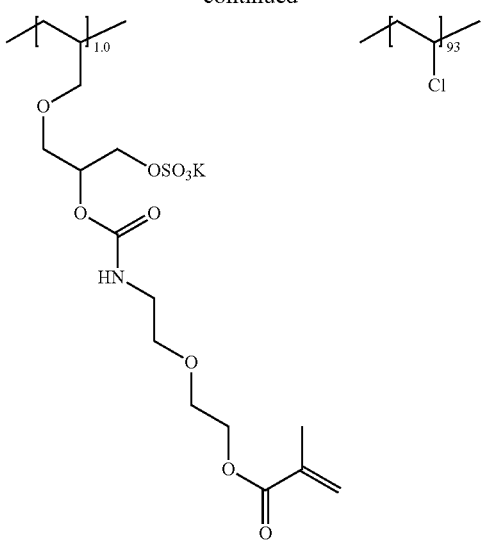
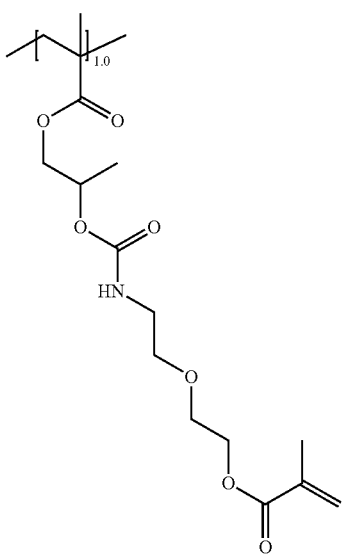
(mol %)
(2)
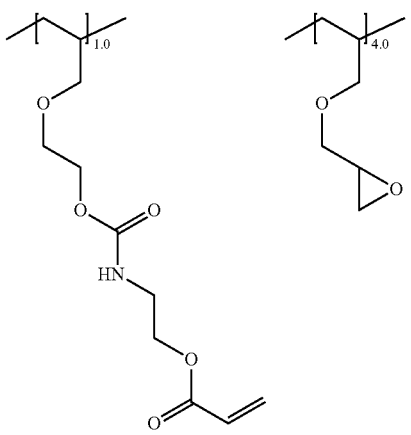
(3)

27
-continued
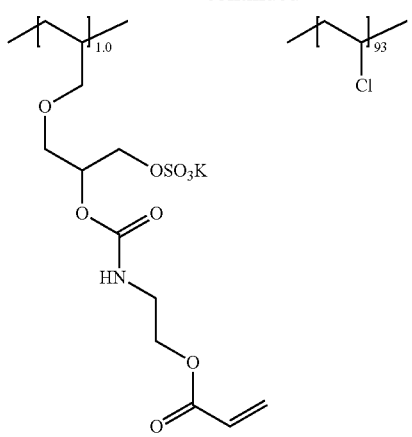
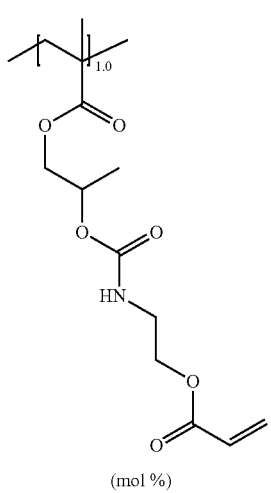
(mol %)
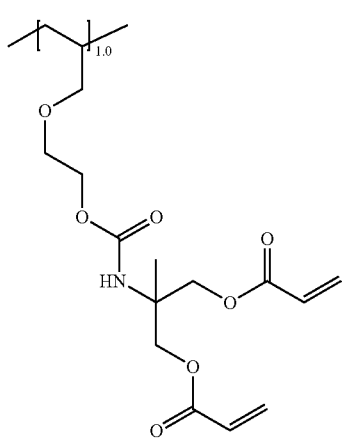
(4)
28
-continued
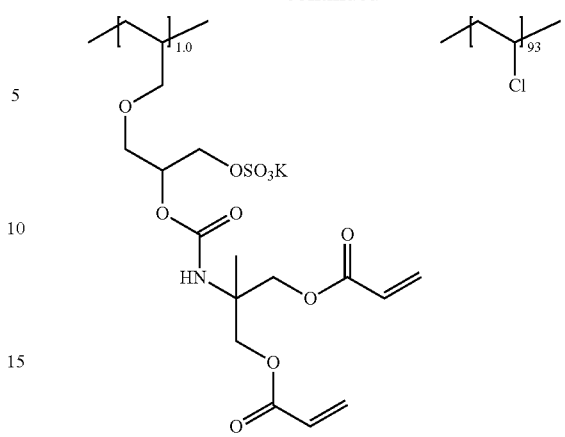
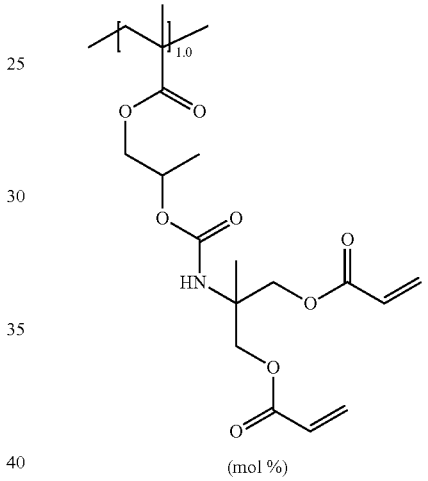
(mol %)
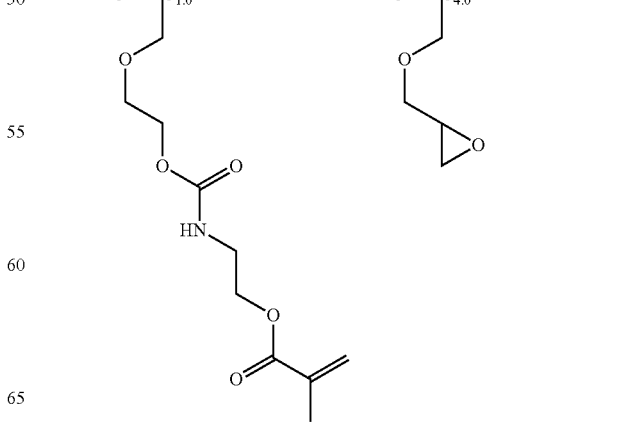
(5)

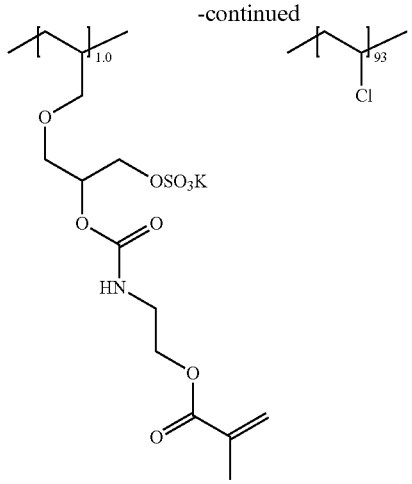
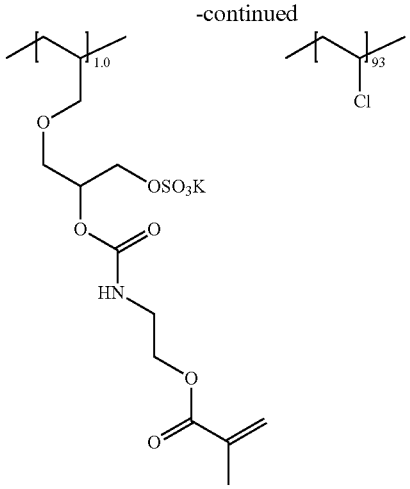
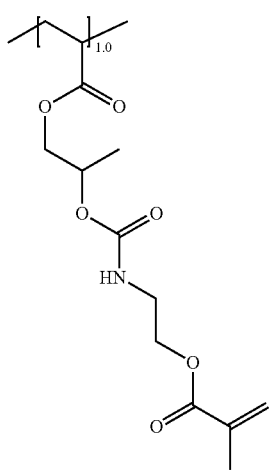
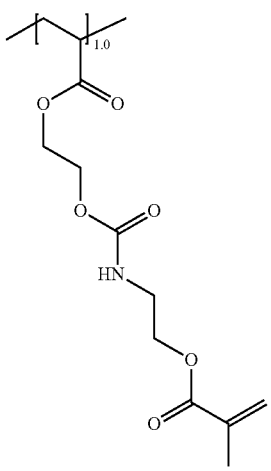
(mol %)
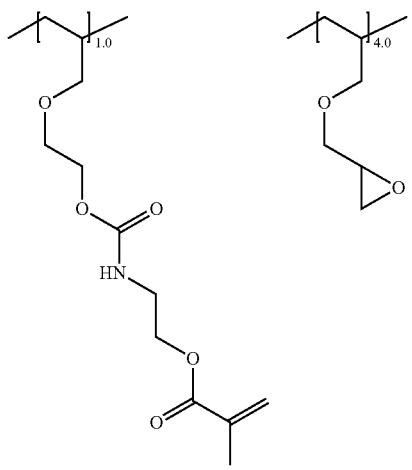
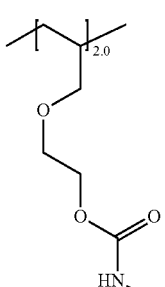
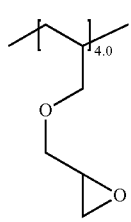
(6)
(7)

31
-continued
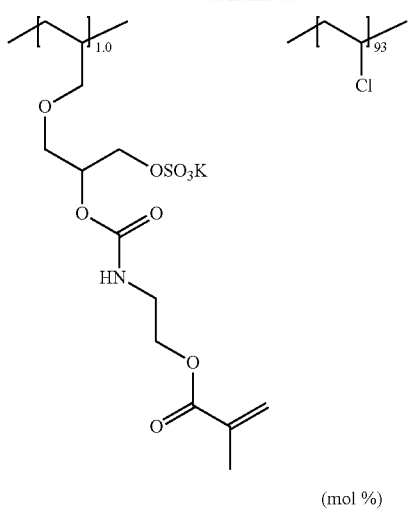
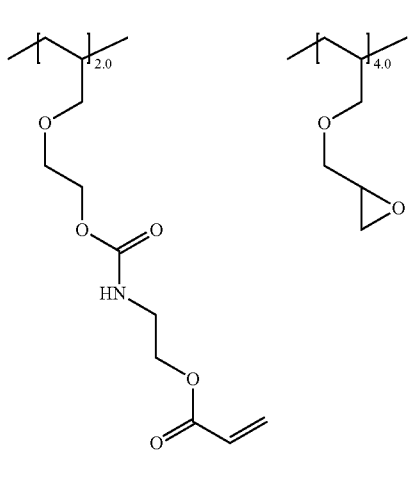
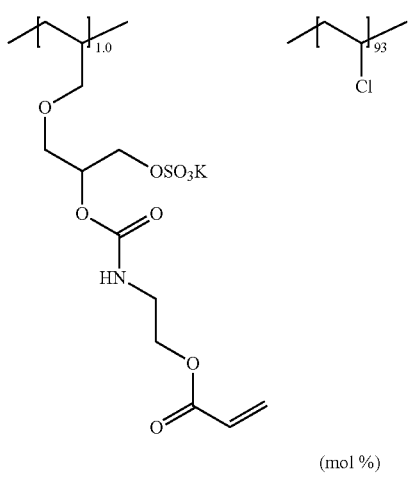
32
-continued
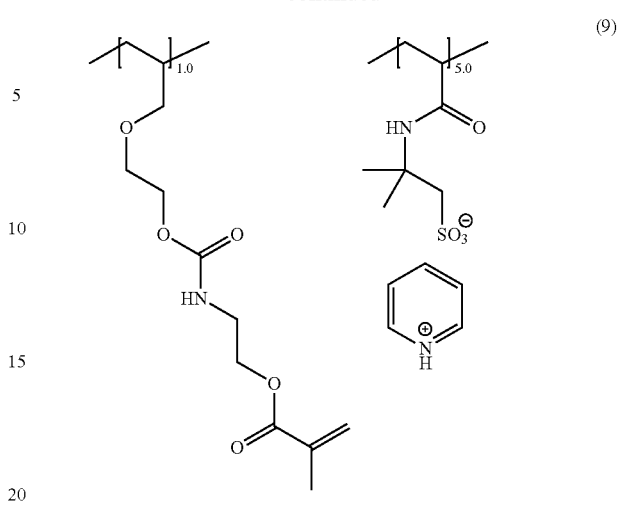
(9)
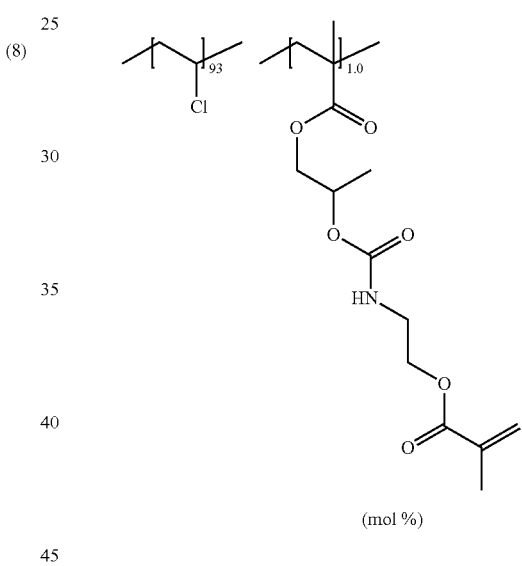
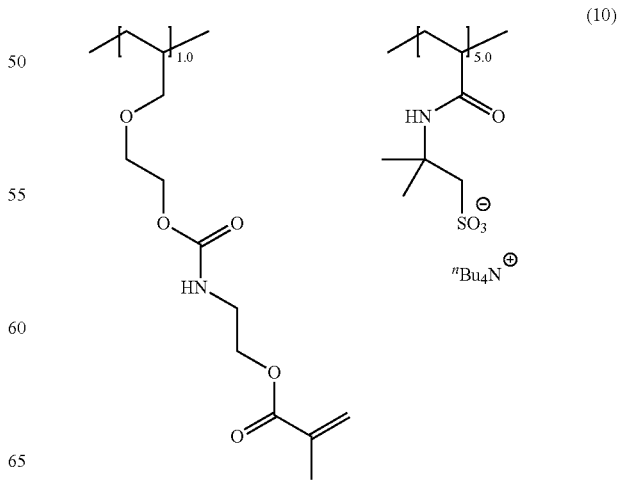
(10)

-continued

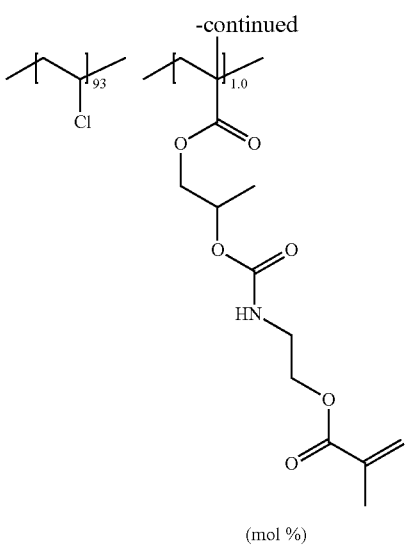

(mol %)

Polyurethane Resin B

Polyurethane resin B has been obtained from starting materials containing a sulfonic acid (salt) group containing-polyol compound denoted by general formula (2) below.

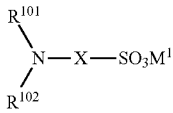

(2)

In general formula (2), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation.

Normally, the polyurethane synthesis reaction is conducted in an organic solvent. However, sulfonic acid (salt) group-containing polyol compounds generally have poor solubility in organic solvents, and thus have poor reactivity. Therefore, it was difficult to synthesize polyurethane resin in which the desired quantity of sulfonic acid (salt) group is incorporated. By contrast, with the above sulfonic acid (salt) group containing-polyol compound having good solubility in organic solvents, polyurethane resin in which the desired quantity of sulfonic acid (salt) group is incorporated can be readily obtained. Thus, it is presumed that, with Polyurethane resin B, the dispersibility of powder components in the nonmagnetic layer can be improved, permitting improvement of the surface smoothness of the nonmagnetic layer, and thus the surface smoothness of the magnetic layer positioned thereover.

The details of Polyurethane resin B will be described below.

In general formula (2), X denotes a divalent linking group. From the perspective of solubility in organic solvents, the divalent linking group denoted by X desirably contains 2 to 20 carbon atoms, and preferably a divalent hydrocarbon group; an alkylene group, arylene group, or a combination of two or more of these groups is preferred; an alkylene group or an arylene group is of greater preference; an ethylene group or a phenylene group is of still greater preference; and an ethylene group is optimal.

Examples of the phenylene group are o-phenylene, m-phenylene, and p-phenylene groups. An o-phenylene or m-phenylene group is desirable, and an m-phenylene group is preferred.

The above alkylene group desirably comprises equal to or more than 2 but equal to or less than 20, preferably equal to or more than 2 but equal to or less than 4, and more preferably 2, carbon atoms. The alkylene group may be a linear alkylene group or branched alkylene group; a linear alkylene group is desirable.

The above arylene group desirably comprises equal to or more than 6 but equal to or less than 20, preferably equal to or more than 6 but equal to or less than 10, and more preferably 6, carbon atoms.

The above alkylene group and arylene group may comprise the following substituent, but are desirable comprised of just carbon atoms and hydrogen atoms.

Examples of substituents that are optionally present on the alkylene group are: aryl groups, halogen atoms (fluorine, chlorine, bromine, and iodine atoms), alkoxy groups, aryloxy groups, and alkyl groups.

Examples of substituents that are optionally present on the arylene group are: alkyl groups, halogen atoms (fluorine, chlorine, bromine, and iodine atoms), alkoxy groups, aryloxy groups, and aryl groups.

In general formula (2), each of $R^{101}$ and $R^{102}$ independently denotes an alkyl group comprising at least one hydroxyl group and equal to or more than two carbon atoms or an aralkyl group comprising at least one hydroxyl group and equal to or more than eight carbon atoms. The alkyl group and aralkyl group may have substituents other than hydroxyl groups.

In addition to hydroxyl groups, the above alkyl group and aralkyl group may comprise substituents in the form of alkoxy groups, aryloxy groups, halogen atoms (fluorine, chlorine, bromine, and iodine atoms), sulfonyl groups, and silyl groups, for example. Of these, alkoxy groups and aryloxy groups are desirable; alkoxy groups having 1 to 20 carbon atoms and aryloxy groups having 6 to 20 carbon atoms are preferred; and phenoxy groups and alkoxy groups having 1 to 4 carbon atoms are of greater preference.

These alkyl groups and aralkyl groups may be linear or branched.

One or more hydroxyl groups are contained, 1 or 2 are desirable, and 1 is preferred, in each of $R^{101}$ and $R^{102}$. That is, the sulfonic acid (salt) group-containing polyol denoted by general formula (2) is preferably a sulfonic acid (salt) group-containing diol compound.

From the perspective of solubility in organic solvents, availability of starting materials, cost and the like, the alkyl group in $R^{101}$ and $R^{102}$ comprises equal to or more than 2, desirably 2 to 22, preferably 3 to 22, more preferably 4 to 22, and still more preferably 4 to 8 carbon atoms.

From the perspective of solubility in organic solvents, availability of starting materials, cost and the like, the aralkyl group in $R^{101}$ and $R^{102}$ comprises equal to or more than 8, desirably 8 to 22, preferably 8 to 12, and more preferably, 8 carbon atoms.

In the aralkyl group contained in $R^{101}$ and $R^{102}$, saturated hydrocarbon chains are desirably present at the α-position and β-position of the nitrogen atom. In that case, a hydroxyl group may be present at the β-position of a nitrogen atom.

In $R^{101}$ and $R^{102}$, a hydroxyl group is desirably not present at the α-position of a nitrogen atom, one hydroxyl group is desirably present at the least the β-position of a nitrogen atom, and a single hydroxyl group is preferably present at the β-position of a nitrogen atom. The presence of a hydroxyl group at the β-position of a nitrogen atom can facilitate synthesis and enhance solubility in organic solvents.

Each of $R^{101}$ and $R^{102}$ independently preferably denotes an alkyl group comprising at least one hydroxyl group and 2 to 22 carbon atoms, an aralkyl group comprising at least one hydroxyl group and 8 to 22 carbon atoms, an alkoxyalkyl group comprising at least one hydroxyl group and 3 to 22 carbon atoms, or an aryloxyalkyl group comprising at least one hydroxyl group and 9 to 22 carbon atoms. An alkyl group comprising at least one hydroxyl group and 2 to 20 carbon atoms, an aralkyl group comprising at least one hydroxyl group and 8 to 20 carbon atoms, an alkoxyalkyl group comprising at least one hydroxyl group and 3 to 20 carbon atoms, or an aryloxyalkyl group comprising at least one hydroxyl group and 9 to 20 carbon atoms is preferred.

Specific examples of alkyl groups comprising at least one hydroxyl group and equal to or more than two carbon atoms are: 2-hydroxyethyl groups, 2-hydroxypropyl groups, 2-hydroxybutyl groups, 2-hydroxypentyl groups, 2-hydroxyhexyl groups, 2-hydroxyoctyl groups, 2-hydroxy-3-methoxypropyl groups, 2-hydroxy-3-ethoxypropyl groups, 2-hydroxy-3-butoxypropyl groups, 2-hydroxy-3-phenoxypropyl groups, 2-hydroxy-3-methoxybutyl groups, 2-hydroxy-3-methoxy-3-methylbutyl groups, 2,3-dihydroxypropyl groups, 3-hydroxypropyl groups, 3-hydroxybutyl groups, 4-hydroxybutyl groups, 1-methyl-2-hydroxyethyl groups, 1-ethyl-2-hydroxyethyl groups, 1-propyl-2-hydroxyethyl groups, 1-butyl-2-hydroxyethyl groups, 1-hexyl-2-hydroxyethyl groups, 1-methoxymethyl-2-hydroxyethyl groups, 1-ethoxymethyl-2-hydroxyethyl groups, 1-butoxymethyl-2-hydroxyethyl groups, 1-phenoxymethyl-2-hydroxyethyl groups, 1-(1-methoxyethyl)-2-hydroxyethyl groups, 1-(1-methoxy-1-methylethyl)-2-hydroxyethyl groups, and 1,3-dihydroxy-2-propyl groups. Of these, 2-hydroxybutyl groups, 2-hydroxy-3-methoxypropyl groups, 2-hydroxy-3-butoxypropyl groups, 2-hydroxy-3-phenoxypropyl groups, 1-methyl-2-hydroxyethyl groups, 1-methoxymethyl-2-hydroxyethyl groups, 1-butoxymethyl-2-hydroxyethyl groups, and 1-phenoxyethyl-2-hydroxyethyl groups are desirable examples.

Specific examples of aralkyl groups comprising at least one hydroxyl group and equal to or more than eight carbon atoms are: 2-hydroxy-2-phenylethyl groups, 2-hydroxy-2-phenylpropyl groups, 2-hydroxy-3-phenylpropyl groups, 2-hydroxy-2-phenylbutyl groups, 2-hydroxy-4-phenylbutyl groups, 2-hydroxy-5-phenylpentyl groups, 2-hydroxy-2-(4-methoxyphenyl)ethyl groups, 2-hydroxy-2-(4-phenoxyphenyl)ethyl groups, 2-hydroxy-2-(3-methoxyphenyl)ethyl groups, 2-hydroxy-2-(4-chlorophenyl)ethyl groups, 2-hydroxy-2-(4-hydroxyphenyl)ethyl groups, 2-hydroxy-3-(4-methoxyphenyl)propyl groups, 2-hydroxy-3-(4-chlorophenyl)propyl groups, 1-phenyl-2-hydroxyethyl groups, 1-methyl-1-phenyl-2-hydroxyethyl groups, 1-benzyl-2-hydroxyethyl groups, 1-ethyl-1-phenyl-2-hydroxyethyl groups, 1-phenethyl-2-hydroxyethyl groups, 1-phenylpropyl-2-hydroxyethyl groups, 1-(4-methoxyphenyl)-2-hydroxyethyl groups, 1-(4-phenoxyphenyl)-2-hydroxyethyl groups, 1-(3-methoxyphenyl)-2-hydroxyethyl groups, 1-(4-chlorophenyl)-2-hydroxyethyl groups, 1-(4-hydroxyphenyl)-2-hydroxyethyl groups, and 1-(4-methoxyphenyl)-3-hydroxy-2-propyl groups. Of these, 2-hydroxy-2-phenylethyl groups and 1-phenyl-2-hydroxyphenyl groups are desirable examples.

In general formula (2), $M^1$ denotes a hydrogen atom or a cation.

The cation may be an inorganic cation or an organic cation. The cation electrically neutralizes the —$SO_3^-$ in general formula (2). It is not limited to a monovalent cation, and can be a divalent or greater cation. A monovalent cation is desirable. When the valence of the cation denoted by $M^1$ is given by n, $M^1$ denotes (1/n) moles of the cation relative to the compound denoted by general formula (2).

The inorganic cation is not specifically limited; desirable examples are alkali metal ions and alkaline earth metal ions. Alkali metal ions are preferred examples, and $Li^+$, $Na^+$, $K^+$, $R^+$, and $Cs^+$ are examples of greater preference.

Examples of organic cations are ammonium ions, quaternary ammonium ions, and pyridinium ions.

The above $M^1$ is desirably a hydrogen atom or an alkali metal ion, preferably a hydrogen atom, $Li^+$, $Na^+$, or $K^+$, and further preferably, $K^+$.

The compound denoted by general formula (2) may comprise one or more aromatic ring within the molecule to enhance solubility in organic solvents.

In general formula (2), $R^{101}$ and $R^{102}$ may be identical or different, but are desirably identical to facilitate synthesis.

In formula (2), each of $R^{101}$ and $R^{102}$ desirably denotes a group with equal to or more than five carbon atoms. In general formula (2), each of $R^{101}$ and $R^{102}$ is desirably a group comprising an aromatic ring and/or an ether bond.

Reference can be made to Japanese Unexamined Patent Publication (KOKAI) No. 2009-96798, which is expressly incorporated herein by reference in its entirety, for the details of the above-described polyol compound denoted by general formula (2). In particular, reference can be made to [0028], [0029] [0045] and Examples of Japanese Unexamined Patent Publication (KOKAI) No. 2009-96798, for the synthesis method of the polyol compound denoted by general formula (2). In addition, examples of the polyol compound denoted by general formula (2) include the compounds denoted by general formulas (2) and (3) described in Japanese Unexamined Patent Publication (KOKAI) No. 2009-96798, and details thereof are described in [0030] to [0034] of Japanese Unexamined Patent Publication (KOKAI) No. 2009-96798. Specific examples of the polyol compound denoted by general formula (2) are the following Example compounds (S-1) to (S-70) described in Japanese Unexamined Patent Publication (KOKAI) No. 2009-96798 and the following Example compounds (S-71) to (S-74). In Example compounds below, "Ph" denotes a phenyl group and "Et" denotes an ethyl group.

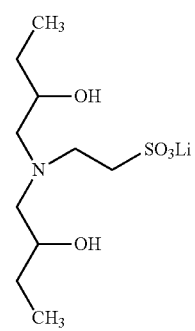

(S-1)

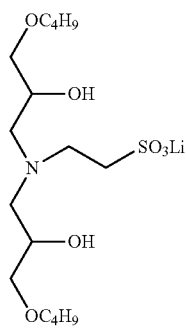 (S-2)
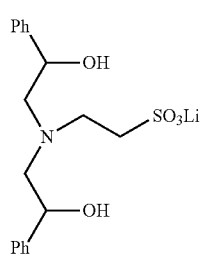 (S-3)
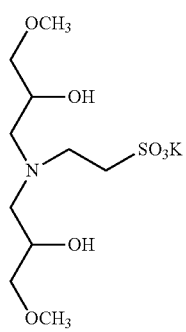 (S-4)
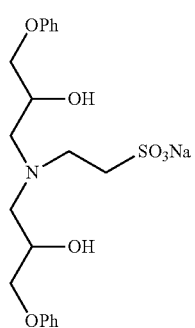 (S-5)
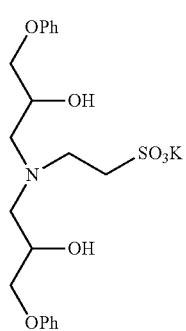 (S-6)
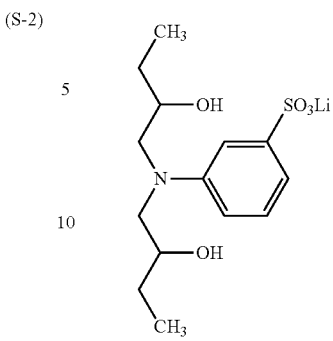 (S-7)
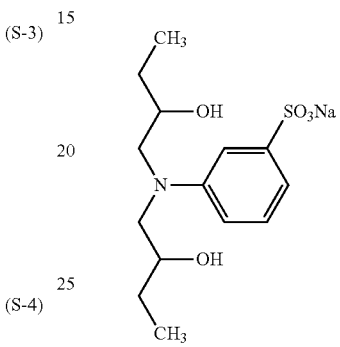 (S-8)
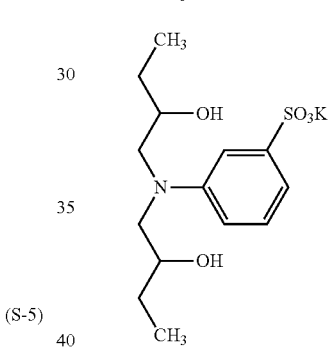 (S-9)
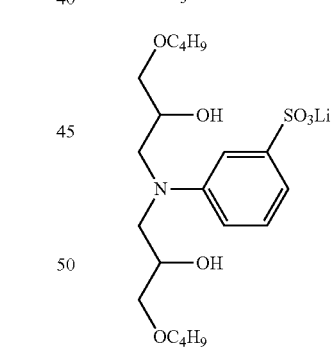 (S-10)
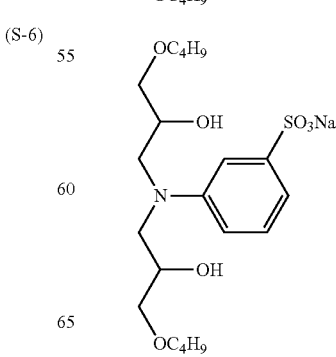 (S-11)

(S-12) 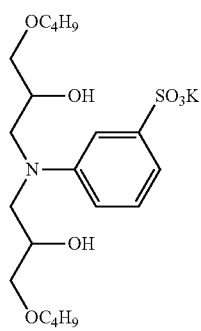
(S-13) 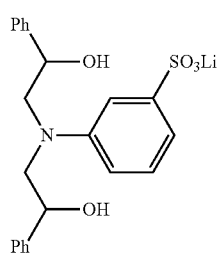
(S-14) 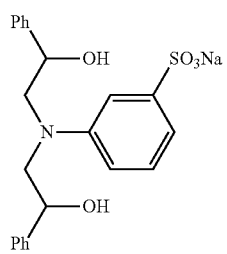
(S-15) 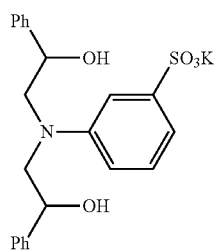
(S-16) 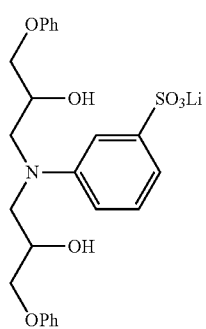
(S-17) 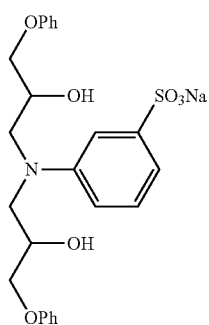
(S-18) 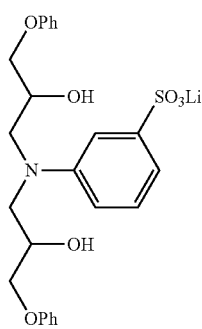
(S-19) 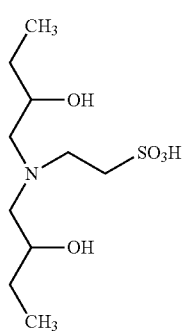
(S-20) 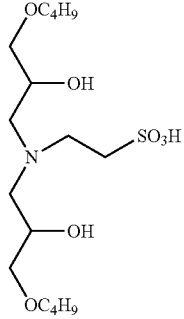
(S-21)

(S-22), (S-23), (S-24), (S-25), (S-26), (S-27), (S-28), (S-29), (S-30), (S-31)

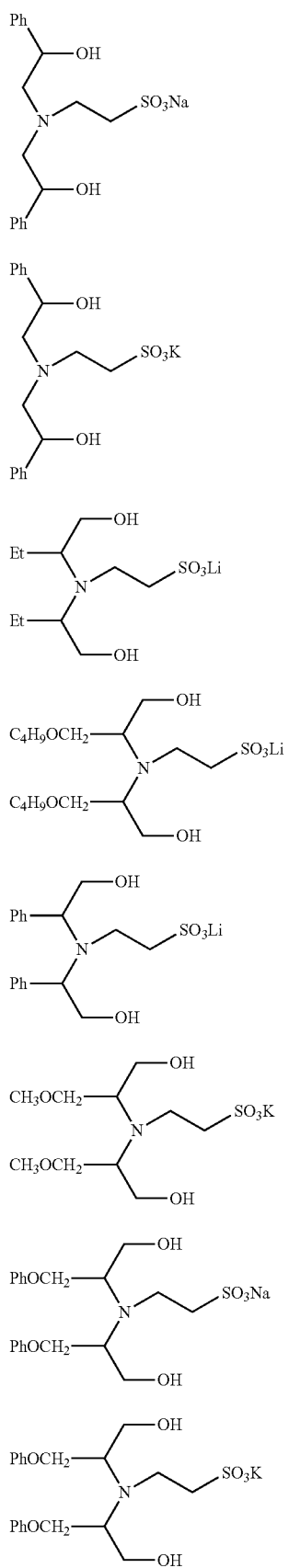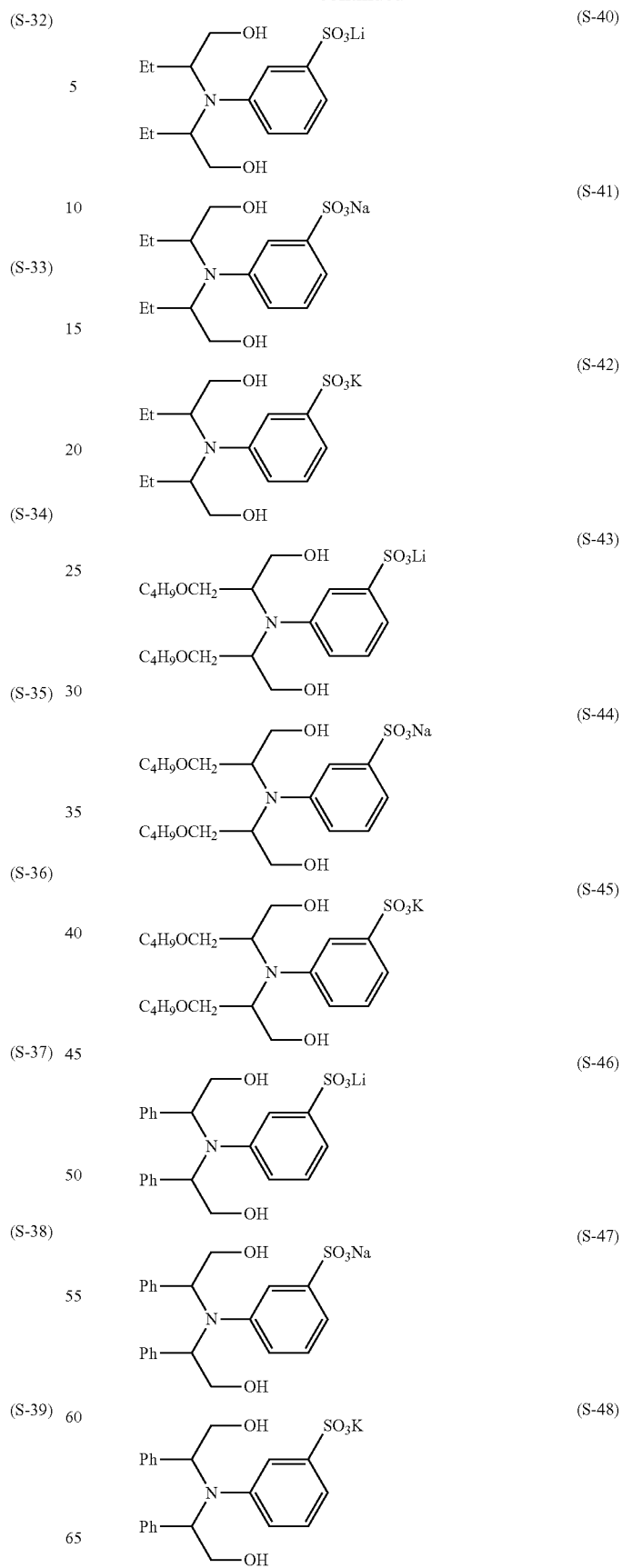

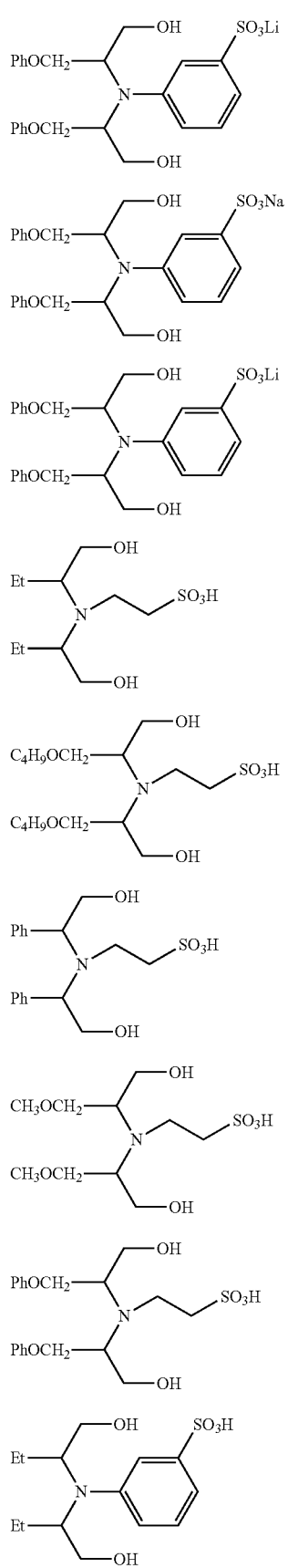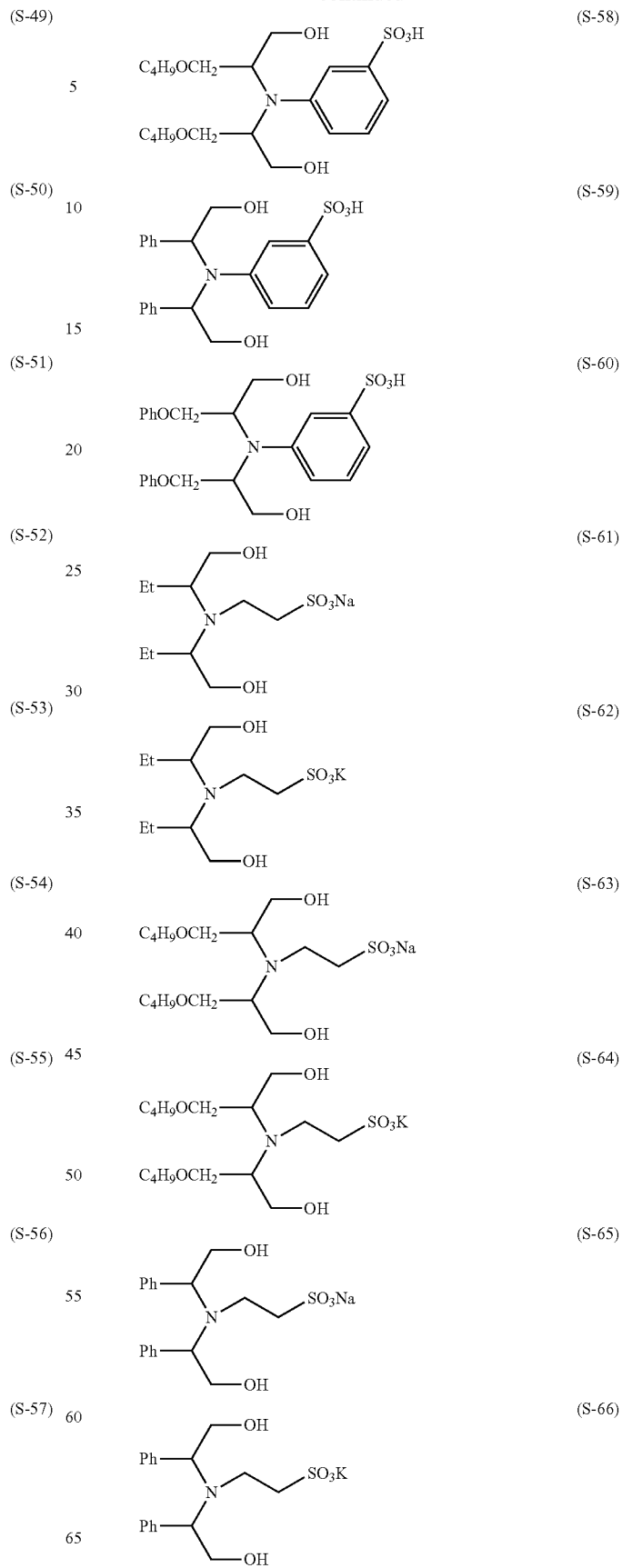

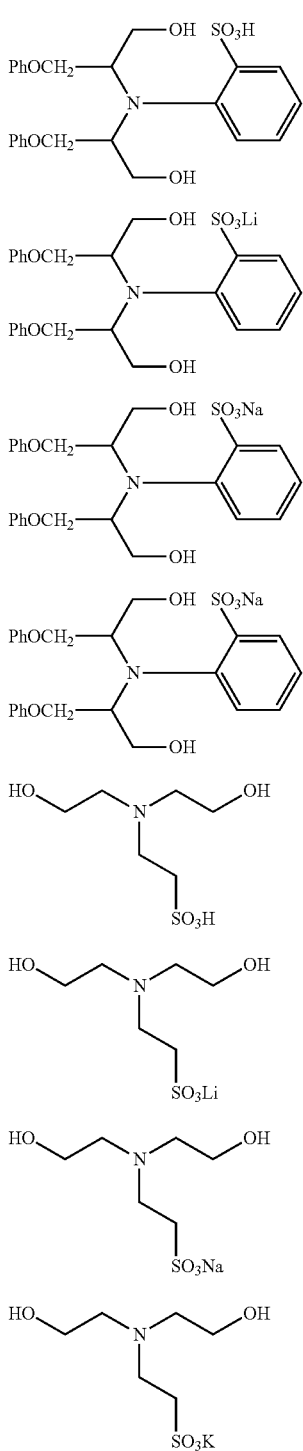

(S-67)
(S-68)
(S-69)
(S-70)
(S-71)
(S-72)
(S-73)
(S-74)

In addition to the polyol compound denoted by general formula (2), known polyol compounds that are commonly employed as chain-extending agents in polyurethane synthesis, such as polyester polyols, polyether polyols, polyether-ester polyols, polycarbonate polyols, polyolefin polyols, and dimer diols, can be employed the synthesis starting material of Polyurethane resin B. Reference can be made to [0056] to [0065] of Japanese Unexamined Patent Publication (KOKAI) No. 2009-96798, for polyol compounds that can be employed together. The fluorene-derived alcohol denoted by the following formula can also be employed.

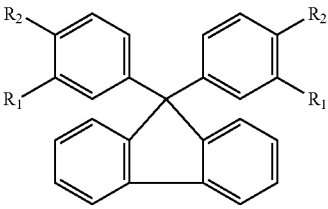

(In the formula, $R_1$ denotes H or $CH_3$, $R_2$ denotes OH or —$OCH_2CH_2OH$, and the two instances of $R_1$ and of $R_2$ may be identical or different.)

Polyurethane resin B can be obtained by subjecting an isocyanate compound and a polyol compound to a urethane-forming reaction. The starting materials can be dissolved in a solvent (polymerization solvent); and heating, pressurization, and nitrogen-backfilling can be conducted as needed to facilitate the urethane-forming reaction. The usual reaction conditions for conducting a urethane-forming reaction can be adopted for the reaction temperature, reaction time, and other reaction conditions of the urethane-forming reaction. Reference can be made to, for example, [0067], [0068] and Examples of Japanese Unexamined Patent Publication (KOKAI) No. 2009-96798, for the urethane-forming reaction.

The term "isocyanate compound" means a compound having an isocyanate group. The use of a bifunctional or greater polyfunctional isocyanate compound (referred to as a "polyisocyanate" hereinafter) is desirable. Polyisocyanates that can be employed as the synthesis starting material of Polyurethane resin B are not specifically limited; any known polyisocyanate can be employed. For example, diisocyanates such as trilene diisocyanate (TDI), diphenylmethane diisocyanate (MDI), p-phenylene diisocyanate, o-phenylene diisocyanate, m-phenylene diisocyanate, xylylene diisocyanate, hydrogenated xylylene diisocyanate, and isophorone diisocyanate can be employed. One isocyanate compound may be employ singly or two or more isocyanate compounds may be employed in combination.

Polyurethane resin B is a radiation-curable polyurethane resin and thus comprises radiation-curable functional groups. The radiation-curable functional group that is present in Polyurethane resin B can be any functional group that undergoes a curing reaction (crosslinking reaction) when irradiated with radiation; it is not specifically limited. From the perspective of reactivity, a group with a radical polymerizable carbon-carbon double bond is desirable and an acrylic double bond group is preferred. Of these, from the perspective of reactivity, a (meth)acryloyloxy group is desirable.

The radiation-curable functional group can be contained in either an isocyanate compound or a polyol compound, or in both. Taking into account the availability and cost of starting materials, the use of a polyol compound containing a radiation-curable functional group as a polyol compound is desirable.

Diols having at least one acrylic double bond per molecule, such as glycerin monoacrylate (also known as glycerol acrylate), glycerin monomethacrylate (also known as glycerol methacrylate) (such as Blemmer GLM, a trade name of NOF Corp.), and bisphenol A epoxyacrylate (such as Epoxyester 3000A, a trade name of Kyoeisha Chemical Co., Ltd.), are suitable as the polyol compound comprising a radiation-curable functional group. Among these diols, the compound indicated below (glycerin mono(meth)acrylate) is desirable from the perspective of curability. Below, R denotes a hydrogen atom or methyl group.

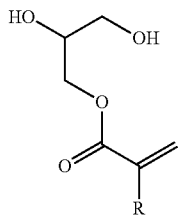

The various physical properties of Polyurethane resin B will be described next.

(a) Average Molecular Weight

The weight average molecular weight of Polyurethane resin B is desirably 10,000 to 500,000, preferably 10,000 to 400,000, and more preferably, 10,000 to 300,000. A weight average molecular weight of equal to or higher than 10,000 is desirable in that the resulting storage property of the coating layer formed using Polyurethane resin B as binder can be good. Further, a weight average molecular weight of equal to or lower than 500,000 is desirable in that good dispersibility can be achieved.

For example, the weight average molecular weight can be adjusted to within the desired range by microadjusting the mole ratio of glycol-derived OH groups to diisocyanate-derived NCO groups and through the use of reaction catalysts. The weight average molecular weight can be further adjusted by adjusting the solid component concentration during the reaction, the reaction temperature, the reaction solvent, the reaction time, and the like.

The molecular weight distribution (Mw/Mn) of Polyurethane resin B is desirably 1.00 to 5.50, preferably 1.01 to 5.40. A molecular weight distribution of equal to or lower than 5.50 is desirable in that the composition distribution is low and good dispersibility can be achieved.

(b) Urethane Group Concentration

The urethane group concentration of Polyurethane resin B is desirably 2.0 to 5.0 mmole/g, preferably 2.1 to 4.5 mmole/g.

A urethane group concentration of equal to or higher than 2.0 mmole/g is desirable in that the glass transition temperature (Tg) can be high, a coating with good durability can be formed, and dispersibility can be good. A urethane group concentration of equal to or lower than 5.0 mmole/g is desirable in that good solvent solubility can be achieved, the polyol content can be adjusted, and the molecular weight can be readily controlled.

(c) Glass Transition Temperature

As set forth above, the glass transition temperature (Tg) of Polyurethane resin B is 30° C. to 100° C., desirably 55° C. to 100° C.

(d) Polar Group Content

Polyurethane resin B contains a sulfonic acid (salt) group because it has been obtained with the starting materials containing a sulfonic acid (salt) group-containing polyol compound, as described above. In addition to the sulfonic acid (salt) group, Polyurethane resin B can contain other polar groups. Examples of other polar groups are hydroxyalkyl groups, carboxylic acid (salt) groups, sulfuric acid (salt) groups, and phosphoric acid (salt) groups, with —$OSO_3M'$, —$PO_3M'_2$, —COOM', and —OH being desirable. Of these, —$OSO_3M'$ is preferred. M' denotes a hydrogen atom or monovalent cation. Examples of monovalent cations are alkali metals and ammonium. The content of polar groups in Polyurethane resin B is desirably 1.0 to 3,500 mmole/kg, preferably 1.0 to 3,000 mmole/kg, more preferably 1.0 to 2,500 mmole/kg.

The concentration of polar groups is desirably equal to or higher than 1.0 mmole/kg in that adequate adsorbability to the nonmagnetic powder can be imparted and dispersibility can be good. The concentration of polar groups is desirably equal to or lower than 3,500 mmole/kg in that good solubility in solvent can be achieved.

(e) Hydroxyl Group Content

Hydroxyl groups (OH groups) can also be incorporated into Polyurethane resin B. The number of OH groups incorporated is desirably 1 to 100,000, preferably 1 to 10,000, per molecule. When the number of hydroxyl groups lies within this range, good dispersion can be achieved due to enhanced solubility in solvent.

(f) Radiation-Curable Functional Group Content

The details of the radiation-curable functional groups contained in Polyurethane resin B are as set forth above. The content thereof is desirably 1.0 to 4,000 mmole/kg, preferably 1.0 to 3,000 mmole/kg, and more preferably, 1.0 to 2,000 mmole/kg. A radiation-curable functional group content of equal to or higher than 1.0 mmole/kg is desirable in that a strong coating can be formed by radiation curing. A radiation-curable functional group content of equal to or lower than 4,000 mmole/kg is desirable in that good calendering moldability can be achieved even when calendering is conducted after radiation curing, and a magnetic recording medium with good electromagnetic characteristics can be obtained.

The nonmagnetic layer of the magnetic recording medium of the present invention is a radiation-cured layer that is obtained by radiation curing a radiation-curable composition containing a radiation-curable vinyl chloride copolymer and a radiation-curable polyurethane resin along with a nonmagnetic powder. The reason for employing a radiation-curable vinyl chloride copolymer in combination with a radiation-curable polyurethane resin is that it is difficult to achieve both the running stability and suitable flexibility required of a magnetic recording medium with the resin alone. The blending ratio of the radiation-curable vinyl chloride copolymer and the radiation-curable polyurethane resin in the radiation-curable composition is desirably 50 to 80 weight parts of polyurethane resin per 100 weight parts of vinyl chloride copolymer.

The solid component concentration of the radiation-curable composition is not specifically limited. From the perspective of facilitating handling, approximately 10 to 80 weight percent is desirable, and approximately 20 to 60 weight percent is preferred. Since the radiation-curable composition is employed to form the nonmagnetic layer, it contains at least a nonmagnetic powder in addition to the above binder components. The nonmagnetic powder can be either an organic or inorganic substance. Carbon black or the like can also be employed. Examples of inorganic substances are metals, metal oxides, metal carbonates, metal sulfates, metal nitrides, metal carbides, and metal sulfides. These nonmagnetic powders are available as commercial products and can be manufactured by known methods.

Examples of the nonmagnetic powder include titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, BaSO$_4$, silicon carbide, and titanium carbide. They may be employed singly or in combinations of two or more. α-iron oxide and titanium oxide are preferred.

The nonmagnetic powder may be acicular, spherical, polyhedral, or plate-shaped.

The crystallite size of the nonmagnetic powder preferably ranges from 4 nm to 1 μm, more preferably from 40 to 100 nm. The crystallite size within 4 nm to 1 μm can achieve good dispersibility and suitable surface roughness.

The average particle diameter of the nonmagnetic powder preferably ranges from 5 nm to 2 μm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Reference can be made to [0123] to [0132] of Japanese Unexamined Patent Publication (KOKAI) No. 2009-96798 for the nonmagnetic powder suitable for use in the magnetic tape of the present invention.

Carbon black may be combined with nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 kg/mm$^2$, desirably 30 to 50 kg/mm$^2$ to adjust head contact. It can be measured with a thin film hardness meter (HMA-400 made by NEC Corporation) using a diamond triangular needle with a tip radius of 0.1 micrometer and an edge angle of 80 degrees as indenter tip. The light transmittance is generally standardized to an infrared absorbance at a wavelength of about 900 nm equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is desirably 100 to 500 m$^2$/g, preferably 150 to 400 m$^2$/g. The DBP oil absorption capability is desirably 20 to 400 mL/100 g, preferably 30 to 200 mL/100 g. The particle diameter of the carbon black is preferably 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. For example, the *Carbon Black Handbook* compiled by the Carbon Black Association, which is expressly incorporated herein by reference in its entirety, may be consulted for types of carbon black suitable for use in the nonmagnetic layer. These carbon blacks are commercially available.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Lubricants, dispersing agent and other additives, solvents, dispersion methods, and the like suited to the magnetic layer may be adopted to the nonmagnetic layer. In particular, known techniques for the quantity and type of additives employed in the magnetic layer may be adopted thereto.

The radiation-curable composition can be prepared by mixing the various above components. An electron beam or UV radiation, for example, can be employed as the radiation used to induce the curing reaction. The use of an electron beam is desirable in that no polymerization initiator is required. A known method can be employed to irradiate the radiation. For example, reference can be made to paragraphs [0021] to [0023] in Japanese Unexamined Patent Publication (KOKAI) No. 2009-134838, which is expressly incorporated herein by reference in its entirety, for details. Known techniques such as those described in UV•EB Curing Techniques, published by the Sogo Gijutsu Center (K.K.), and *Applied Techniques of Low-Energy Electron Beam Irradiation*, (2000, published by CMC) can be employed for the radiation curing device and the radiation curing method. The contents of the above publications are expressly incorporated herein by reference in their entirety. Of these, from the perspective of obtaining adequate curability without decomposing the components of the radiation-curable layer and/or nonmagnetic support, the curing reaction is desirably conducted at a radiation irradiation level of equal to or higher than 5 kGy and equal to or lower than 100 kGy, preferably equal to or higher than 10 kGy and equal to or lower than 50 kGy.

In the course of producing a large quantity of a particulate magnetic recording medium, the coating liquid may be stored for an extended period of, for example, six months or longer. However, vinyl chloride binders are generally of low stability. In particular, the use of a radiation-curable vinyl chloride resin will sometimes sharply reduce the stability of the coating liquid. This is attributed to reaction of the radiation-curable functional groups during storage, thereby changing the molecular weight.

Additionally, the synthesis reaction of the radiation-curable resin is normally conducted in the presence of a polymerization-inhibiting agent to protect radiation-curable functional groups. Accordingly, to prevent the radiation-curable functional groups from reacting during extended storage, it is conceivable to increase the quantity of the polymerization-inhibiting agent. However, merely increasing the quantity of the polymerization-inhibiting agent may cause a drop in curability during irradiation with radiation and make it difficult to obtain a tough coating.

By contrast, it is revealed that when a radiation-curable vinyl chloride copolymer is stored in the presence of a benzoquinone compound, it is possible to maintain good long-term storage stability without losing curability. Accordingly, when the radiation-curable vinyl chloride copolymer that is employed to form the nonmagnetic layer in the present invention is used following long-term storage, it is desirably stored in a composition containing a benzoquinone compound.

The benzoquinone compound is a compound comprising a benzoquinone skeleton. The benzoquinone skeleton contained therein can be the o-benzoquinone skeleton or p-benzoquinone skeleton indicated below.

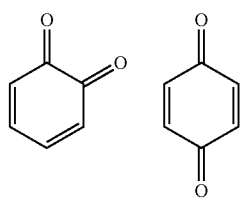

o-benzoquinone    p-benzoquinone

From the perspective of availability, the benzoquinone skeleton is desirably a compound comprising a p-benzoquinone skeleton. The benzoquinone skeleton in the benzoquinone compound may be substituted or unsubstituted. Examples of substituents (which may themselves be substituted) are alkyl groups, alkoxyl groups, hydroxyl groups, halogen atoms, aryl groups, cyano groups, nitro groups, and any of the substituents contained in Example compounds indicated below. Further, the benzoquinone compound employed may have one, two, or more benzoquinone skeletons. Example compounds given below are examples of desirable benzoquinone compounds.

(1)
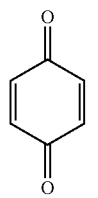

(2)
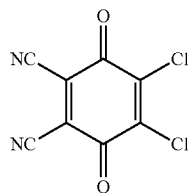

(3)
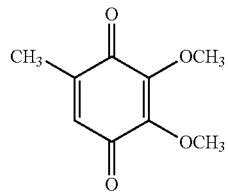

(4)
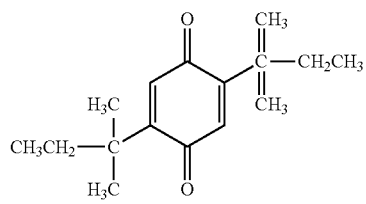

(5)
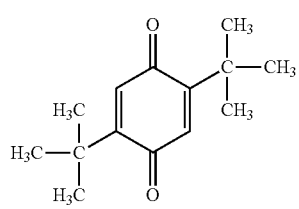

(6)
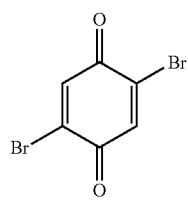

(7)
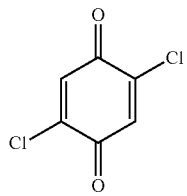

(8)
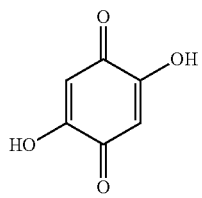

(9)
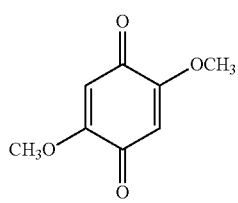

(10)
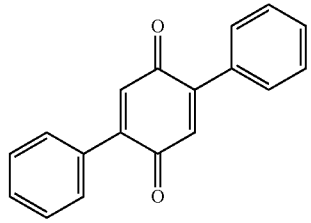

(11)
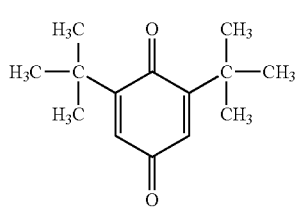

(12)
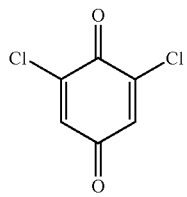

(13)
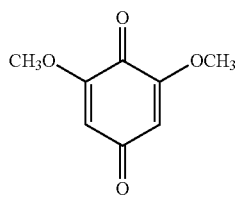

(14)
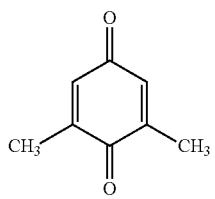
(15)
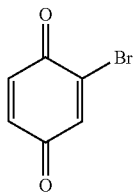
(16)
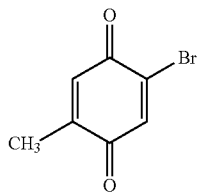
(17)
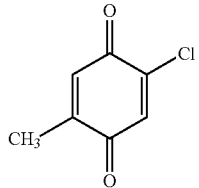
(18)
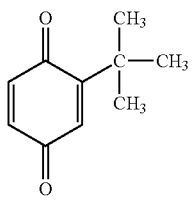
(19)
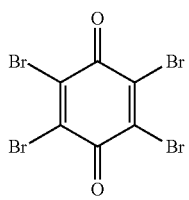
(20)
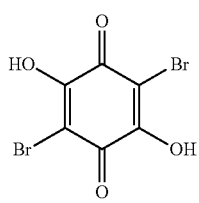
(21)
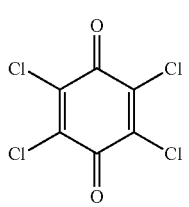
(22)
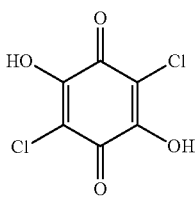
(23)
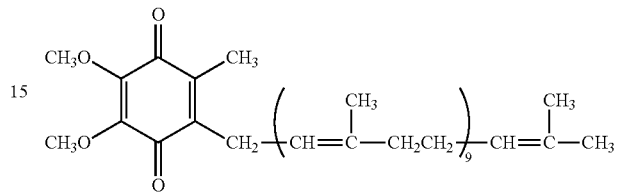
(24)
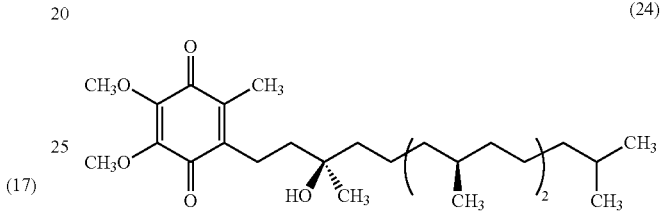
(25)
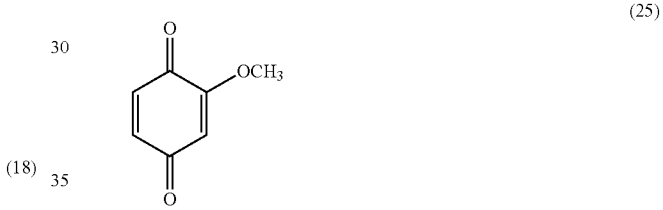
(26)
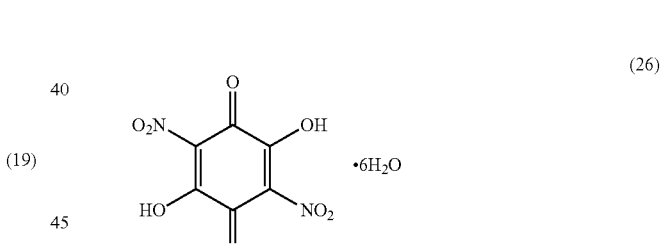
·6H$_2$O
(27)
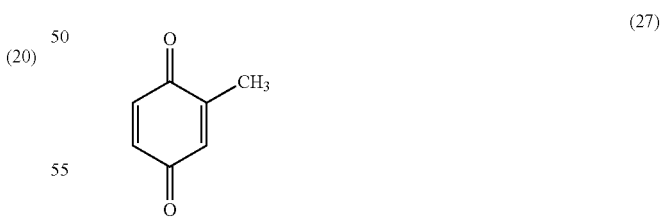
(28)
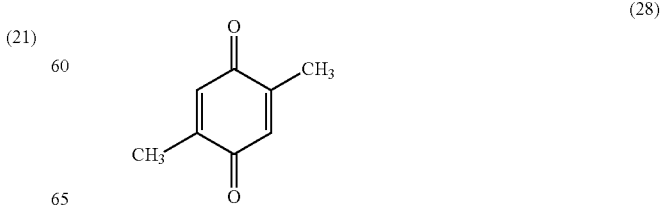

-continued

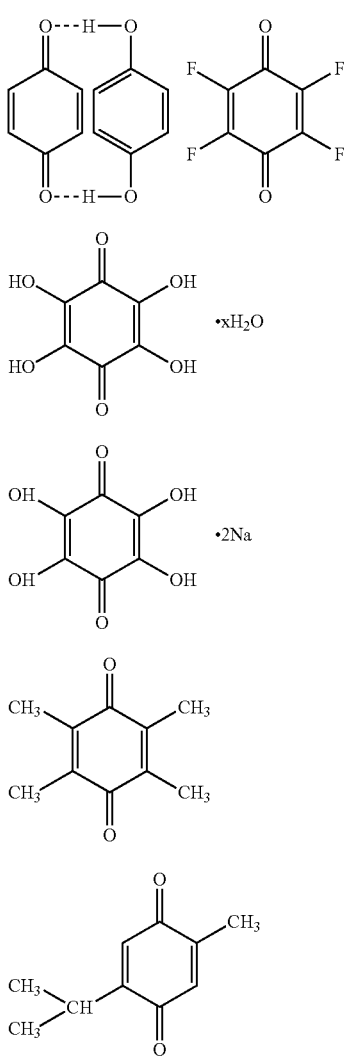

Of the above Example Compounds, Example Compounds (1) to (22) and (25) to (33) are desirable; (1) to (22), (25) to (28), (30), (32), and (33) are preferred; and compounds (1) to (22), (25) to (28), (30), and (32) are of greater preference.

The radiation-cuable vinyl chloride copolymer is desirably stored in the composition containing one or more benzoquinone compounds. In that case, from the perspective of achieving both stability and curability, the content of the benzoquinone compound (the combined quantities of multiple benzoquinone compounds when multiple such compounds are employed) is desirably equal to or higher than 1 ppm but equal to or lower than 500,000 ppm, preferably equal to or higher than 1 ppm but equal to or lower than 400,000 ppm, and more preferably, equal to or higher than 100 ppm but equal to or lower than 100,000 ppm, based on the copolymer (solid component).

The radiation-cuable vinyl chloride copolymer may be desirably stored in the composition containing at least one compound selected from the group consisting of phenol compounds, piperidine-1-oxyl compounds, nitro compounds, and phenothiazine compounds, in addition to the benzoquinone compound. By employing one or more of these compounds, desirably together with the benzoquinone compound, long-term storage stability of the copolymer can be maintained well without deterioration of curability.

The above compounds will be described in detail below.

The phenol compound is not specifically limited other than that it be a compound comprising a hydroxyphenyl group. The hydroxyphenyl group may comprise a substituent. Examples of the substituent are an alkyl group, alkoxy group, and hydroxyl group. The phenol compound may comprise multiple substituted or unsubstituted hydroxybenzene skeletons (polyphenol compounds). The polyphenol compound is not specifically limited. From the perspectives of availability and effect, bisphenol A, tradename Irgacure 1010 (made by Ciba Specialty Chemicals Corporation) or the like is desirable. Desirable examples of the phenol compound employed in combination are p-methoxyphenol, hydroquinone, polyphenol compounds, and 2,6-di-t-butyl-p-cresol. The phenol compound may be employed singly, or two or more such phenol compounds may be employed in combination.

The piperidine-1-oxyl compound referred to in the present invention means a compound having the piperidine-1-oxyl structure indicated below.

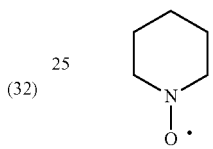

The piperidine-1-oxyl compound can be in the form of a compound comprising a substituted piperidine-1-oxyl skeleton, or an unsubstituted piperidine-1-oxyl compound. Examples of the substituents are alkyl groups, alkoxy groups, amino groups, carboxyl groups, cyano groups, hydroxyl groups, isothiocyanate groups, optionally substituted alkylcarbonylamino groups, arylcarbonyloxy groups, piperidyl ring carbon-containing carbonyl groups, and other substituents contained in Example compounds indicated below. A piperidine-1-oxyl group comprising one piperidine-1-oxyl skeleton or two or more such skeletons may be employed. Examples of desirable piperidine-1-oxyl compounds are Example compounds (1-a) to (1-l) below. Of these, Example compounds (1-f), (1-j), (1-l), (1-b), and (1-k) are desirable, and (1-f), (1-j), (1-l), and (1-b) are preferably, and (1-f), (1-j), and (1-l) are of greater preference.

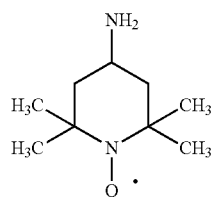
(1-a)

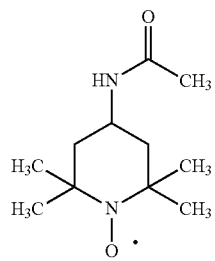
(1-b)

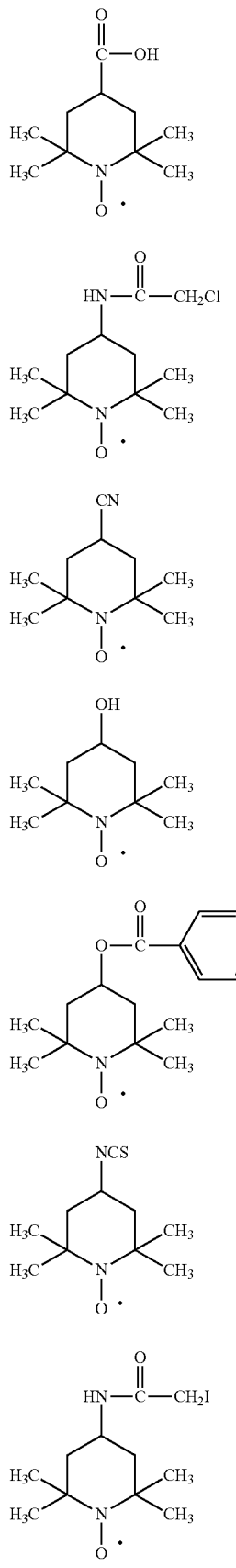

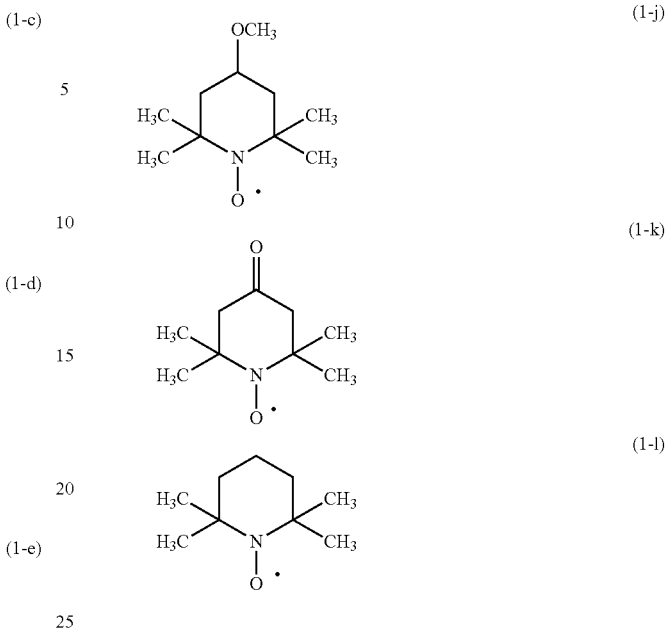

The nitro compound is not specifically limited other than that it be a compound comprising a nitro group denoted by R—$NO_2$. In this formula, the R moiety is, for example, an aryl group (desirably an aryl group having 6 to 10 carbon atoms, such as a phenyl group) or an alkyl group (desirably an alkyl group having 1 to 12 carbon atoms, such as a methyl group, ethyl group, propyl group, isopropyl group, linear or branched butyl group, linear or branched amyl group, linear or branched hexyl group, linear or branched heptyl group, linear or branched octyl group, linear or branched nonyl group, linear or branched decyl group, linear or branched undecyl group, or linear or branched dodecyl group, and optionally comprising a hetero atom). From the perspective of availability, nitrobenzene and nitromethane are preferred. The term "phenothiazine compound" means a compound having the phenothiazine skeleton indicated below

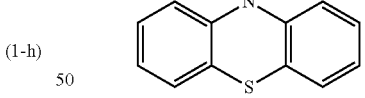

The phenothiazine skeleton contained in the phenothiazine compound may be substituted or unsubstituted. Examples of substituents are halogen atoms, optionally substituted amino groups, alkoxy groups, alkylthio groups, acyl groups, arylcarbonyl groups, trihalomethyl groups, and any of the other substituents contained in Example compounds indicated below.

A phenothiazine compound having one, two, or more phenothiazine skeletons may be employed. Example compounds (4-a) to (4-g) are examples of desirable phenothiazine compounds. Of these, Example compounds (4-b), (4-c), (4-d), (4-e), (4-f), and (4-g) are preferred, (4-b), (4-c), (4-d), (4-e), and (4-f) are of greater preference, and (4-c), (4-d), (4-e), and (4-f) are of even greater preference.

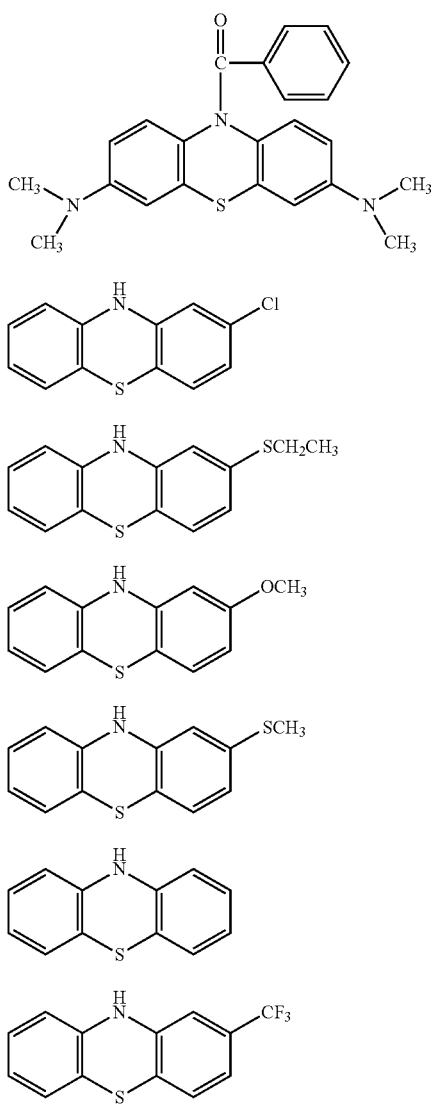

From the perspective of achieving both long-term storage stability and curability, the content of the phenol compounds, piperidine-1-oxyl compounds, nitro compounds, and phenothiazine compounds employed (the total quantity when multiple such compounds are employed in combination) is desirably equal to or higher than 1 ppm and equal to or lower than 500,000 ppm, preferably equal to or higher than 1 ppm and equal to or lower than 400,000 ppm, and more preferably, equal to or higher than 1 ppm and equal to or lower than 300,000 ppm, based on the copolymer (solid component).

As for the radiation-curable polyurethane resin, its long-term storage stability can be maintained well without deterioration of curability by employing two types of components, one of which is selected from phenol compounds and the other of which is selected from piperidine-1-oxyl compounds, nitro compounds, benzoquinone compounds, and phenothiazine compounds. In the following descriptions, the phenol compound is referred to as "Component C" and at least one selected from the group consisting of piperidine-1-oxyl compounds, nitro compounds, benzoquinone compounds, and phenothiazine compounds is referred to as "Component D". The details of Components C and D are as described above. From the perspective of achieving both long-term storage stability and curability, the content of component C (the combined content when multiple compounds are employed) is desirably equal to or higher than 1 ppm and equal to or lower than 500,000 ppm, preferably equal to or higher than 1 ppm and equal to or lower than 400,000 ppm, more preferably equal to or higher than 1 ppm and equal to or lower than 300,000 ppm, and still more preferably, equal to or higher than 500 ppm and equal to or lower than 100,000 ppm relative to the polyurethane resin (solid component). Additionally, from the perspective of achieving both long-term storage stability and curability, the content of component D (the combined content when multiple compounds are employed) is desirably equal to or higher than 1 ppm and equal to or lower than 500,000 ppm, preferably equal to or higher than 1 ppm and equal to or lower than 400,000 ppm, more preferably equal to or higher than 1 ppm and equal to or lower than 300,000 ppm, and still more preferably, equal to or higher than 1 ppm and equal to or lower than 500 ppm relative to the solid component of the polyurethane resin.

Benzoquinone compounds and the other compounds described above can be added simultaneously or sequentially to the radiation-curable composition, or to the composition comprising the starting materials of the copolymer or the polyurethane resin. Benzoquinone compounds and the other compounds described above are desirably present in a system containing radiation-curable functional group-containing components, such as the synthesis reaction of the copolymer or the polyurethane resin, the reaction for incorporation of radiation-curable functional groups, and the like. The components that are added during the reaction are thought to perform the role of inhibiting the radiation-curable functional groups from reacting during the reaction and of enhancing storage stability without loss of curability when irradiated with radiation.

The various compounds described above can be synthesized by known methods or the above-described methods. Some of them are available as commercial products.

Nonmagnetic Support

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The surface roughness of the nonmagnetic support employed in the present invention preferably ranges from 3 to 10 nm, as a center average roughness with a cutoff value of 0.25 mm.

Backcoat Layer

Generally, a magnetic tape used for computer data recording will be required to have better repeat running properties than a video tape or an audio tape. To maintain such a high degree of storage stability, a backcoat layer can be provided on the opposite surface of the nonmagnetic support from the surface on which the magnetic layer is provided. The backcoat layer coating liquid can be formed by dispersing particulate components such as an abrasive, an antistatic agent, and the like and binder in an organic solvent. Various inorganic pigments, carbon black, polymer particles and the like can be employed as the particulate components. Resins such as nitrocellulose, phenoxy resin, vinyl chloride resin, and polyurethane can be employed singly or in combination as the binder.

The magnetic recording medium of the present invention may have a smoothing layer, adhesive layer, and the like, in addition to the magnetic layer, nonmagnetic layer, and backcoat layer optionally formed. Known techniques regarding these layers can be applied.

Layer Structure

The thickness of the nonmagnetic support in the magnetic recording medium of the present invention is desirably 3 to 80 µm. The thickness of the backcoat layer is, for example, 0.1 to 1.0 µm, and desirably 0.2 to 0.6 µm.

The thickness of the magnetic layer is desirably optimized based on the saturation magnetization of the head employed, the length of the head gap, and the recording signal band, and is normally 0.01 to 0.10 µm, preferably 0.02 to 0.08 µm, and more preferably, 0.03 to 0.08 µm. The thickness variation in the magnetic layer is preferably within ±50 percent, more preferably within ±40 percent. At least one magnetic layer is sufficient. The magnetic layer may be divided into two or more layers having different magnetic characteristics, and a known configuration relating to multilayered magnetic layer may be applied.

The thickness of the nonmagnetic layer is desirably 0.2 to 3.0 µm, preferably 0.3 to 2.5 µm, and further preferably, 0.4 to 2.0 µm. The nonmagnetic layer is effective so long as it is substantially nonmagnetic. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

Manufacturing Method

The steps for manufacturing coating liquids for forming the various layers such as the magnetic layer, the nonmagnetic layer, and the backcoat layer desirably include at least a kneading step, dispersing step, and mixing steps provided as needed before and after these steps. Each of these steps may be divided into two or more stages. All of the starting materials such as the ferromagnetic powder, nonmagnetic powder, binder, carbon black, abrasives, antistatic agents, lubricants, dispersing agent, and other additives, solvents and the like that are employed in the present invention can be added at the beginning or part way through any of the steps. Individual starting materials can be divided into smaller quantities and added in two or more increments. To prepare coating liquids for forming the various layers, conventionally known manufacturing techniques may be utilized for some of the steps. A kneader having a strong kneading force, such as an open kneader, continuous kneader, pressure kneader, or extruder is preferably employed in the kneading step. When a kneader is employed, the binder (preferably equal to or higher than 30 weight percent of the entire quantity of binder) can be kneaded in a range of 15 to 500 parts per 100 parts of the ferromagnetic powder or nonmagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for various layers. Other than glass beads, dispersing media with a high specific gravity such as zirconia beads, titania beads, and steel beads are suitable for use. The particle diameter and fill ratio of these dispersing media can be optimized for use. A known dispersing device may be employed.

The magnetic recording medium of the present invention can be manufactured by, for example, forming a nonmagnetic layer (radiation-cured layer) by coating and radiation curing a nonmagnetic layer coating liquid to a prescribed film thickness on the surface of a nonmagnetic support while the nonmagnetic support is running, and then forming a magnetic layer thereover by coating a magnetic layer coating liquid to a prescribed film thickness. Here, multiple magnetic layer coating liquids can be sequentially or simultaneously applied in a multilayer coating.

Generally, in the case where a lower nonmagnetic layer coating liquid and an upper magnetic layer coating liquid are sequentially applied in a multilayer coating, a portion of the nonmagnetic layer sometimes dissolves in the solvent contained in the magnetic layer coating liquid. When the nonmagnetic layer is formed from a highly-curable radiation-curable composition as a radiation-cured layer, irradiation with radiation causes the binder component in the nonmagnetic layer to polymerize or crosslink, increasing the molecular weight. Thus, dissolution in the solvent contained in the magnetic layer coating liquid can be prevented or reduced. Further, the fact that mixing at the interface with the magnetic layer can be prevented because of the high curability of the nonmagnetic layer is advantageous in that it can inhibit a drop in the surface smoothness of the magnetic layer due to interface variation. From this perspective, it is advantageous to employ a nonmagnetic layer in the form of a radiation-cured layer. When doing so, the use of Copolymer A that is highly curable is effective.

The coating machine used to apply the magnetic layer coating liquid or nonmagnetic layer coating liquid can be an air doctor coater, blade coater, rod coater, extrusion coater, air knife coater, squeeze coater, dip coater, reverse roll coater, transfer roll coater, gravure coater, kiss coater, cast coater, spray coater, spin coater or the like. Reference can be made to the "Most Recent Coating Techniques" (May 31, 1983) released by the Sogo Gijutsu Center (Ltd.), which are expressly incorporated herein by reference in their entirety, for these coating machines. In the course of forming a radiation-cured layer, the coating layer that has been formed by applying the coating liquid is cured by irradiation with radiation. The details of processing by irradiation with radiation are as set forth above. After the coating step, the medium can be subjected various types of post-processing such as orienting and the surface smoothing (calendering) of the magnetic layer, and thermoprocessing to reduce thermal contraction.

Reference can be made to paragraphs [0146] to [0148] of Japanese Unexamined Patent Publication (KOKAI) No. 2009-96798 for the details of this processing. As set forth above, the present invention can both inhibit shaving of the magnetic layer surface during running and achieve good calendering moldability.

The amount of change (amount of decrease) in the center plane average surface roughness Ra of the magnetic layer surface, ΔRa, as measured for an area of 250 µm×250 µm under a condition of a cutoff value of 0.25 mm with a model HD-2000 optical interferotype surface roughness meter made by WYKO can be employed as an index of good calendering moldability. The present invention can inhibit shaving of the surface of the magnetic layer during running, and can also achieve calendering moldability in the form of ΔRa of equal to or higher than 1.5 nm; for example, ΔRa of 1.5 to 3.0 nm. As set forth in Japanese Unexamined Patent Publication (KOKAI) No. 2009-96798, the calendering conditions are desirably as follows. The calender roll temperature, that is, the calendering temperature, desirably falls within a range of 60 to 100° C., further desirably falls within a range of 70 to 100°

C., and preferably, falls within a range of 80 to 100° C. The pressure desirably falls within a range of 100 to 500 kg/cm, further desirably falls within a range of 200 to 450 kg/cm, and preferably, falls within a range of 300 to 400 kg/cm. Further, the calendering temperature is desirably set at or above the glass transition temperature of the nonmagnetic layer to render the nonmagnetic layer more flexible during calendering and further enhance the cushioning effect, thereby greatly increasing calendering moldability. From the perspective of increasing calendering moldability, the calendering temperature preferably falls within a range of the glass transition temperature of the nonmagnetic layer Tg+5° C. to Tg+30° C.

Subsequently, the magnetic recording medium stock material that has been prepared is cut to desired size with a cutting apparatus or the like to obtain a magnetic recording medium.

The magnetic recording medium of the present invention can achieve a high degree of surface smoothness by enhancing calendering moldability, as set forth above. The magnetic recording medium of the present invention can achieve a high degree of surface smoothness in the form of a center plane average surface roughness Ra, as measured by an atomic force microscope (AFM) under the measurement conditions given in Examples further below, of equal to or lower than 4 nm; for example, 2 to 4 nm.

The present invention further relates to a method of manufacturing the magnetic recording medium of the present invention. In the method of manufacturing the magnetic recording medium of the present invention, after coating and radiation curing the radiation-curable composition set forth above, a magnetic layer is formed over the radiation-cured layer that has been formed, after which calendering is conducted at a temperature of equal to or greater than the glass transition temperature of the radiation-cured layer. The particulars are as set forth above. The manufacturing method of the present invention can markedly increase the surface smoothness achieved by calendering in a magnetic recording medium having a magnetic layer in which surface shaving is inhibited.

EXAMPLES

The present invention will be described in detail below based on Examples. However, the present invention is not limited to the examples. The "parts" and "percent" given in Examples are weight parts and weight percent unless specifically stated otherwise. The $^1$H-NMR measurement described below was conducted with a 400 MHz NMR (AvanceII-400 made by Broker).

<Method of Measuring the Storage Elastic Modulus at 80° C. and the Glass Transition Temperature of the Binder Resin>

The storage elastic modulus E' at 80° C. and the glass transition temperature Tg of the binder resin in Examples and Comparative Examples set forth below are values obtained by dynamic viscoelasticity measurement as described below.

A binder resin solution is prepared by dilution with a 50:50 (weight ratio) solution of methyl ethyl ketone: cyclohexanone to achieve a solid component concentration of 22 weight percent. This solution is then coated on an aramid base in a quantity calculated to yield a dry thickness of 20 μm and dried to obtain a clear film. The clear film containing the radiation-curable resin is cured by irradiation with 40 kGy of radiation in an atmosphere with an oxygen concentration of equal to or lower than 200 ppm. Subsequently, the clear film obtained is cut into pieces 3.35 mm in width and 5 cm in length. The peak temperature of the loss elastic modulus (E") from 30 to 140° C. as measured by a dynamic viscoelastometer (the Rheovibron, made by Toyo Baldwin, temperature increase rate 2° C./minute, measurement frequency 110 Hz) is adopted as the glass transition temperature (denoted as "Tg1" hereinafter) of the binder resin. The storage elastic modulus E' at 80° C. is also obtained in the same measurement.

<Method of Measuring the Glass Transition Temperature of the Nonmagnetic Layer>

In Examples and Comparative Examples below, the glass transition temperature of the nonmagnetic layer is a value that is obtained by dynamic viscoelastometry as set forth below.

A nonmagnetic layer coating liquid prepared by the same method as in the corresponding Example or Comparative Example is applied to an aramid base to the same thickness as the corresponding Example or Comparative Example, dried, and cured (heated or irradiation cured) under identical conditions to obtain a sheet. The sheet is then cut into samples 12.65 mm in width and about 10 mm in length. A viscoelastometer (a DMS6100 made by SII Nanotechnology) is then used to measure the loss tangent (tan δ1) of the samples over a measurement temperature range of 20 to 200° C. at a measurement frequency of 10 Hz and at a rate of temperature increase of 2° C./min. Separately, the loss tangent (tan δ2) of the base film employed is measured over a temperature range of 20 to 200° C. by the same method. The difference in tan δ of the sample and base film at each temperature (tan δ1(T)−tan δ2(T), where T denotes the measurement temperature) is plotted for temperatures over the range of 20 to 200° C. The temperature at the maximum value obtained in the plot is adopted as the glass transition temperature (denoted as "Tg2" hereinafter) of the nonmagnetic layer.

1. Preparation Examples and Evaluation of Radiation-Curable Vinyl Chloride Copolymer Preparation Example 1-1

(1) Polymerization of Vinyl Chloride Copolymer

Vinyl chloride: 100 parts,
Allyl glycidyl ether: 11.9 parts,
2-Hydroxypropyl methacrylate: 4.1 parts,
Allyl-2-hydroxyethyl ether: 3.6 parts
Sodium lauryl sulfate: 0.8 part, and
Water: 117 parts
were charged and stirred at 50° C.
Subsequently,
Potassium persulfate: 0.6 part
was charged and emulsification polymerization was begun. Following reaction for 10 hours, cooling was conducted when the pressure in the polymerization apparatus had reached 2 kg/cm$^2$. The unreacted vinyl chloride was recovered, after which the product was drained, washed, and dried, yielding a vinyl chloride copolymer (1) with a copolymer ratio (mol percent) of:
Vinyl chloride: 93.0 mol percent,
Allyl glycidyl ether: 4.0 mol percent,
2-Hydroxypropyl methacrylate: 1.0 mol percent,
Allyl-2-hydroethyl ether: 1.0 mol percent,
Units in which the ring of the epoxy group in the allyl glycidyl ether had been opened with sulfuric acid: 1.0 mol percent.

(2) Reaction Introducing a Radiation-Curable Functional Group

To a two-liter flask was added 416 g of a 30 percent cyclohexanone solution of vinyl chloride copolymer (1) (solid component 124.8 g) and the solution was stirred at 210 rpm.

Next, 0.28 g of 1,4-benzoquinone (2.60 mol, 20,000 ppm) was added, stirred, and dissolved.

Next, 0.125 g of dibutyltin dilaurate was added as a reaction catalyst and the mixture was stirred while raising the temperature to 40 to 50° C. Next, 13.75 g (0.09 mol) of 2-methacryloyloxyethyl isocyanate (MOI made by Showa Denko K.K.) was added dropwise over 30 minutes as a radiation-curable functional group-incorporating component. When the dropwise addition had been completed, the mixture was stirred for 2 hours at 40° C. and cooled to room temperature, yielding a resin solution (radiation-curable composition) comprising a radiation-curable functional group (methacryloyloxy group)-containing vinyl chloride copolymer (Specific Example Compound (1); referred to as "radiation-curable vinyl chloride copolymer d", hereinafter).

$^1$H-NMR data and assignments are given below for the radiation-curable function group (methacryloyloxy group)-containing vinyl chloride copolymer.

Radiation-curable function group (methacryloyloxy group)-containing vinyl chloride copolymer (Specific Example Compound (1)): $^1$H-NMR (DMSO-$d_6$) δ(ppm) =6.2-6.0 (C═C double bond peak), 5.8-5.6 (C═C double bond peak), 4.6-4.2 (br., m), 4.2-4.0 (m), 3.9-3.1 (m), 3.1-3.0 (br., s), 2.7-2.65 (br., s), 2.60-2.0 (m), 2.0-0.7 (br., m).

The solid component of the resin solution obtained by the above steps constituted 31.0 percent. Within one day of preparing the resin solution, the weight average molecular weight (Mw) and number average molecular weight (Mn) of the radiation-curable group-containing vinyl chloride copolymer contained in the solution were obtained by the methods set forth further below as Mw=51,000 and Mn=29,000. The glass transition temperature (Tg1), sulfate group concentration, and methacryloyloxy group concentration of the radiation-curable functional group-containing vinyl chloride copolymer (Specific Example Compound (1)) were measured by the methods set forth further below as Tg1=75° C., sulfate group concentration=70 mmol/kg, and methacryloyloxy group concentration=340 mmol/kg, Preparation Example 1-2

With the exception that 12.51 g of 2-acryloyloxyethyl isocyanate (Karenz_AOI made by Showa Denko K.K.) was employed instead of 13.75 g 2-methacryloyloxyethyl isocyanate in the radiation-curable group-introducing reaction of Preparation Example 1-1, a resin solution containing a radiation-curable functional group-containing vinyl chloride copolymer (Specific Example Compound (3)) was obtained by the same method as in Preparation Example 1-1. $^1$H-NMR data and assignments are given below for the radiation-curable function group-containing vinyl chloride copolymer obtained.

$^1$H-NMR (DMSO-$d_6$) δ(ppm)=6.2-6.0 (C═C double bond peak), 5.8-5.6 (C═C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg1, sulfate group concentration, and radiation-curable functional group concentration conducted in the same manner as in Preparation Example 1-1 yielded the results indicated in Table 1.

Preparation Example 1-3

With the exception that 21.20 g of 1,1-bis(acryloyloxymethyl)ethyl isocyanate (Karenz_BEI made by Showa Denko K.K.) was employed instead of 13.75 g of 2-methacryloyloxyethyl isocyanate in the radiation-curable group-introducing reaction of Preparation Example 1-1, a resin solution containing a radiation-curable functional group-containing vinyl chloride copolymer (Specific Example Compound (4)) was obtained by the same method as in Preparation Example 1-1. $^1$H-NMR data and assignments are given below for the radiation-curable function group-containing vinyl chloride copolymer obtained.

$^1$H-NMR (DMSO-$d_6$) δ(ppm)=6.2-6.0 (C═C double bond peak), 5.8-5.6 (C═C double bond peak), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

Measurement of the average molecular weight, Tg1, sulfate group concentration, and radiation-curable functional group concentration conducted in the same manner as in Preparation Example 1-1 yielded the results indicated in Table 1.

<Methods of Evaluating the Radiation-Curable Vinyl Chloride Copolymers>

(1) Measurement of the Average Molecular Weight

The average molecular weight (Mw) of the radiation-curable functional group-containing vinyl chloride copolymers contained in the various resin solutions of the Preparation Examples was obtained by standard polystyrene conversion by gel permeation chromatography (GPC) with DMF solvent containing 0.3 percent lithium bromide.

(2) Sulfuric Acid (Salt) Group Concentration

The quantity of elemental sulfur was quantified from the area of the elemental sulfur (S) peak by fluorescence X-ray analysis and converted to the quantity of elemental sulfur per kilogram of radiation-curable functional group-containing vinyl chloride copolymer. The sulfuric acid (salt) group concentration of the radiation-curable functional group-containing vinyl chloride copolymer was then calculated.

(3) Content of Radiation-Curable Functional Groups in the Copolymer

This was calculated based on the NMR integration ratio.

(4) Measurement of the Glass Transition Temperature

The glass transition temperature Tg1 was measured by the above method.

TABLE 1

| | Weight average molecular weight Mw | Tg1 (° C.) | Concentration of sulfate group (mmol/kg) | Concentration of radiation-curable functional group (mmol/kg) |
|---|---|---|---|---|
| Preparation Example 1-1 | 51500 | 75 | 70 | 340 |
| Preparation Example 1-2 | 51300 | 71 | 70 | 340 |
| Preparation Example 1-3 | 52000 | 82 | 70 | 680 |

Preparation Example 1-4

Synthesis of the radiation-curable vinyl chloride copolymer (referred to as "radiation-curable vinyl chloride copolymer b", hereinafter) described in Japanese Unexamined Patent Publication (KOKAI) No. 2004-352804

In accordance with the method described in paragraphs [0040] and [0041] in Japanese Unexamined Patent Publication (KOKAI) No. 2004-352804, the resin of Preparation Example 1 (a radiation-curable vinyl chloride copolymer) in Japanese Unexamined Patent Publication (KOKAI) No. 2004-352804 was obtained. Measurement of Tg1 and the radiation-curable functional group concentration conducted in the same manner as in Preparation Example 1-1 yielded 70° C. of Tg1 and 1283 mmol/kg of the radiation-curable functional group concentration.

Preparation Example 1-5

With the exception that no 1,4-benzoquinone was added in the polymerization of the vinyl chloride copolymer of Preparation Example 1-1, a resin solution containing a radiation-curable functional group-containing vinyl chloride copolymer (Specific Example Compound (1)) was obtained by the same method as in Preparation Example 1-1. The average molecular weight, Tg1, sulfate group concentration, and radiation-curable functional group concentration were measured in the same manner as in Preparation Example 1-1, and measurement values identical to those in Preparation Example 1-1 were obtained.

<Method of Evaluating the Resin Solution (Radiation-Curable Composition)>
(1) Evaluation of Radiation Curability The resin solutions obtained in Preparation Examples 1-1 to 1-5 were diluted to a solid component concentration of about 20 percent to obtain sample solutions. Each sample solution was coated with a blade (300 μm) on an aramid base and dried for two weeks at room temperature to obtain a coating film 30 to 50 μm in thickness.

Next, an electron beam irradiating apparatus was used to irradiate the coating film three times at an intensity of 10 kG each time, totaling 30 kG.

The film that had been irradiated with the electron beam was then immersed in 100 mL of tetrahydrofuran (THF) and extracted for two hours at 60° C. Following extraction, the film was washed with 100 mL of THF and dried for three hours at 140° C. under a vacuum. Next, the weight of the gel was adopted as the weight of the portion remaining following extraction (and drying) (weight of gel portion/weight of coating film prior to extraction); the value of this portion multiplied by 100 is given as the gelling rate in Table 2. The higher the gelling rate, the stronger the coating, indicating greater progression of radiation curing.

(2) Evaluation of Long-Term Storage Stability

Each of the resin solutions obtained in Preparation Examples 1-1 to 1-5 was stored under sealed conditions at 23° C. and the number of days elapsing until a change in molecular weight as measured by GPC appeared was counted. The results are given in Table 3.

TABLE 2

|  | Curability (Gelling rate) |
| --- | --- |
| Preparation Example 1-1 | 85% |
| Preparation Example 1-2 | 90% |
| Preparation Example 1-3 | 95% |
| Preparation Example 1-4 | 65% |
| Preparation Example 1-5 | 90% |

TABLE 3

|  | Storage stability |
| --- | --- |
| Preparation Example 1-1 | 250 days or more |
| Preparation Example 1-2 | 250 days or more |
| Preparation Example 1-3 | 250 days or more |
| Preparation Example 1-5 | 14 days |

<Evaluation Results>

As indicated in Table 2, the resin solutions of Preparation Examples 1-1 to 1-3 and 1-5 exhibited greater curability than the resin solution of Preparation Example 1-4. Based on these results, it was possible to determine that the radiation-curable vinyl chloride copolymer comprising the structural unit denoted by general formula (1) was highly curable.

Based on the results in Table 3, it was possible to determine that resin solutions (Preparation Examples 1-1 to 1-3) containing both a radiation-curable vinyl chloride copolymer and a benzoquinone compound exhibited good stability over time and had good long-term storage stability. Normally, the addition of a component capable of enhancing long-term storage stability reduces curability, but as shown in Table 2, in Preparation Examples 1-1 to 1-3, the curability of the cured film obtained by irradiation with radiation was good with high gelling rate, indicating that the use of a benzoquinone compound with a radiation-curable vinyl chloride copolymer increased the storage stability without compromising curability.

Reference Tests

Polyfunctional (meth)acrylate monomer is known to be a by-product of the synthesis of radiation-curable resins. In Preparation Example 1-1, during the synthesis of radiation-curable vinyl chloride copolymer d, the production of a by-product in the form of bifunctional methacrylate monomer (referred to as "methacrylate monomer A", hereinafter) was anticipated.

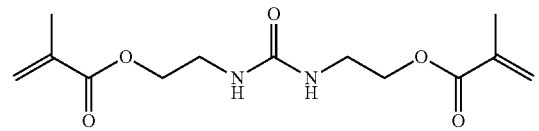 [SMILES: C=C(C)C(=O)OCCNC(=O)NCCOC(=O)C(=C)C]

Accordingly, the production of methacrylate monomer A as a by-product was confirmed by the following method.

(1) Synthesis of Methacrylate Monomer A

A 10 g quantity of 2-methacryloyloxyethyl isocyanate (MOI, made by Showa Denko K.K.) was dissolved in 100 mL of acetone. Over an internal temperature range of 30 to 50° C., 100 g of water was added dropwise, and the mixture was stirred for two hours. A 200 g quantity of ethyl acetate was added and the mixture was stirred for 10 minutes. The mixture was left standing and the aqueous phase was discarded. A 100 g quantity of water was added and the mixture was stirred for 10 minutes. The mixture was left standing and the aqueous phase was discarded. The organic phase obtained was concentrated, dried, and solidified in an evaporator at an external temperature of 40° C. Product NMR data and assignments are given below.

$^1$H-NMR (400 MHz, DMSO, 25° C.): 6.12 (2H, t), 6.05 (2H, s), 5.68 (2H, t), 4.05 (4H, t), 3.82 (4H, q), 1.88 (6H, s) ppm

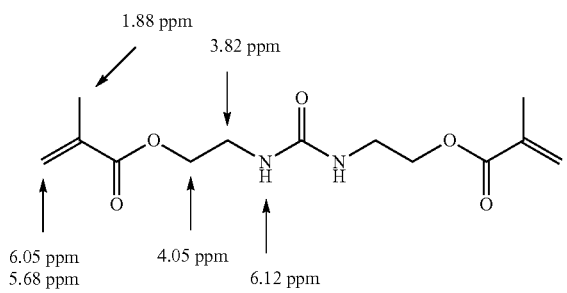 [SMILES: C=C(C)C(=O)OCCNC(=O)NCCOC(=O)C(=C)C]

(2) Confirming the Production of Methacrylate Monomer A as a By-Product

In the NMR data of 2-methacryloyloxyethyl isocyanate, representative proton assignment is as follows. As is clear in the NMR data of radiation-curable vinyl chloride copolymer d, methacrylate monomer A, and 2-methacryloyloxyethyl isocyanate, 6.12 ppm of protons only produced a peak in methacrylate monomer A. Thus, the fact that methacrylate monomer A was produced as a by-product was confirmed by the presence of this peak. Accordingly, when the resin solution obtained in Preparation Example 1-1 was subjected to $^1$H-NMR measurement, a proton peak was confirmed at 6.12 ppm. Based on these results, it was confirmed that methacrylate monomer A was produced as a by-product in Preparation Example 1-1. Comparing with the methacrylate monomer A synthesized in (1) above by the integral value, the content of methacrylate monomer A in the resin solution obtained in Preparation Example 1-1 was determined to be 7.18 g. When the ratio of the quantity of 2-methacryloyloxyethyl isocyanate introduced into radiation-curable vinyl chloride copolymer d to the quantity introduced into methacrylate monomer A was calculated by comparing the integral values of methacrylate monomer A and radiation-curable vinyl chloride copolymer d in the NMR data, the ratio of the former:latter was 47.8:52.2. No unreacted 2-methacryloyloxyethyl isocyanate was detected.

Based on the above results and the charge quantities, the quantity of radiation-curable vinyl chloride copolymer d produced in the resin solution obtained in Preparation Example 1-1 was calculated to be 131.4 g.

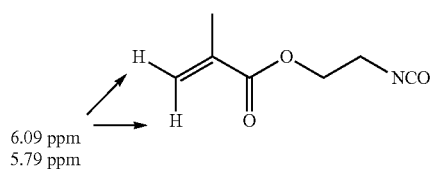

The methacrylate monomer produced as a by-product in Preparation Examples 1-2 and 1-3 were identified and the contents thereof were calculated by the same methods as above. The results are given below.

By-Product Monomer in Preparation Example 1-2 (Referred to as "Methacrylate Monomer B", Hereinafter)

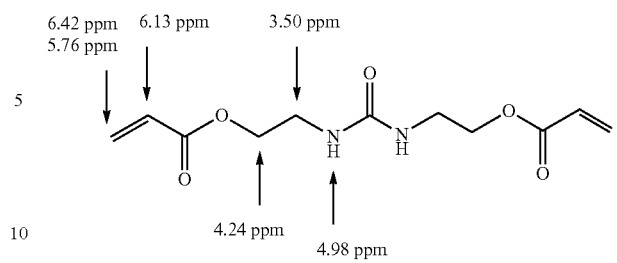

$^1$H-NMR (400 MHz, DMSO, 25° C.): 6.42 (2H, d), 6.13 (2H, dd), 5.76 (2H, d), 4.98 (2H, br), 4.24 (4H, t), 3.50 (4H, q)

By-Product Monomer in Preparation Example 1-3 (Referred to as "Methacrylate Monomer C", Hereinafter)

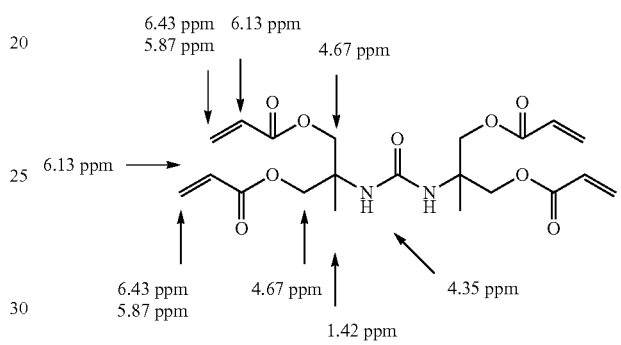

$^1$H-NMR (400 MHz, DMSO, 25° C.): 6.43 (4H, d), 6.13 (4H, dd), 5.87 (4H, d), 4.67 (8H, s), 4.35 (2H, br), 1.42 (6H, s)

Quantity of radiation-curable vinyl chloride copolymer (Specific Example Compound (3)) in the resin solution obtained in Preparation Example 1-2: 130.7 g, quantity of methacrylate monomer B produced as a by-product: 5.9 g.

Quantity of radiation-curable vinyl chloride copolymer (Specific Example Compound (4)) in the resin solution obtained in Preparation Example 1-3: 134.9 g, quantity of methacrylate monomer C produced as a by-product: 10.1 g.

As set forth above, the production of by-product methacrylate monomer A in Preparation Example 1-1 was confirmed. However, the presence of by-product methacrylate monomer did not greatly affect the glass transition temperature or radiation curability of the radiation-curable composition. Accordingly, the glass transition temperatures Tg1 indicated in Table 1 can be viewed as being the glass transition temperatures of the radiation-curable functional group-containing vinyl chloride copolymers synthesized in Preparation Examples 1-1 to 1-3. To demonstrate this point, a resin solution not containing methacrylate monomer A was prepared by the following method as Preparation Example 1-1-1.

Preparation Example 1-1-1

A resin solution was obtained by the same method as in Preparation Example 1-1. To 200 g of the resin solution obtained was added 200 g of acetone at an internal temperature of 50° C. When 500 g of methanol was subsequently added dropwise over an internal temperature range of 45 to 55° C., a solid product precipitated. The solid product that precipitated was filtered, 300 g of acetone was added, and the mixture was stirred at 50° C. to completely dissolve it. When 500 g of methanol was subsequently added dropwise over an internal temperature range of 45 to 55° C., a solid product precipitated. The solid product that precipitated was filtered out and dried for 24 hours at 30° C. under a vacuum.

$^1$H-NMR measurement of the product obtained by the above operation revealed no proton peak at 6.12 ppm. Based on this result, it was possible to determine that the methacrylate monomer A that was produced as a by-product had been eliminated by the above operation from the product.

Next, the glass transition temperature and radiation curability of the product obtained by the above operation were measured by the above-described methods. The gelling rate was 84 percent and the glass transition temperature Tg1 was 75° C., which were equivalent to the results obtained for Preparation Example 1-1.

Based on these results, the polyfunctional (meth)acrylate monomer produced as a by-product during synthesis did not greatly affect the glass transition temperature or radiation curability of the radiation-curable composition. Accordingly, the various physical properties such as the glass transition temperature that were measured in the resin solution were determined to be the physical properties of the radiation-curable resin contained in the resin solution.

Examples of the synthesis of radiation-curable vinyl chloride copolymers d' and d" with different methacryloyloxy group concentrations from radiation-curable vinyl chloride copolymer d obtained in Preparation Example 1-1 will be described next.

Preparation Example 1-1-2

Synthesis of Radiation-Curable Vinyl Chloride Copolymer d'

With the exception that the quantity of 2-methacryloyloxyethyl isocyanate added dropwise was changed to 6.88 g (0.04 mol), a resin solution containing radiation-curable vinyl chloride copolymer d' was obtained by the same method as in Preparation Example 1-1.

The production of methacrylate monomer A as a by-product was confirmed for the resin solution obtained by the above method. The content of radiation-curable functional group-containing vinyl chloride copolymer d' and that of the methacrylate monomer A produced as a by-product in the resin solution were measured by the above method as 129.2 g and 2.51 g, respectively. The absence of unreacted 2-methacryloyloxyethyl isocyanate was confirmed from the NMR data by the same method as above. The ratio of the quantity of 2-methacryloyloxyethyl isocyanate incorporated into radiation-curable vinyl chloride copolymer d' to the quantity incorporated into methacrylate monomer A was determined to be former:latter=63.5:36.5. The glass transition temperature and methacryloyloxy group concentration in radiation-curable vinyl chloride polymer d' were determined by the above-described methods to be a glass transition temperature of 73° C. and a methacryloyloxy group concentration of 230 mmol/kg.

Preparation Example 1-1-3

Synthesis of Radiation-Curable Vinyl Chloride Copolymer d"

With the exception that the quantity of 2-methacryloyloxyethyl isocyanate added dropwise was changed to 3.43 g (0.02 mol), a resin solution containing radiation-curable vinyl chloride copolymer d" was obtained by the same method as in Preparation Example 1-1. The production of methacrylate monomer A as a by-product was confirmed for the resin solution obtained by the above method. The content of radiation-curable functional group-containing vinyl chloride copolymer d" and that of the methacrylate monomer A produced as a by-product in the resin solution were measured by the above method as 127.5 g and 0.78 g, respectively. The absence of unreacted 2-methacryloyloxyethyl isocyanate was confirmed from the NMR data by the same method as above. The ratio of the quantity of 2-methacryloyloxyethyl isocyanate incorporated into radiation-curable vinyl chloride copolymer d" to the quantity incorporated into methacrylate monomer A was determined to be former:latter=77.4:22.6. The glass transition temperature and methacryloyloxy group concentration in radiation-curable vinyl chloride polymer d" were determined by the above-described methods to be a glass transition temperature of 75° C. and a methacryloyloxy group concentration of 140 mmol/kg.

Measurement of the various physical properties such as the glass transition temperature of resin solutions obtained using commercial vinyl chloride copolymer (MR-104 made by Zeon Corporation and MR-104 made by Kaneka) as the vinyl chloride copolymer into which the radiation-curable functional group was introduced revealed physical properties similar to those in Preparation Examples 1-1 to 1-3.

2. Examples of the Preparation of Polyurethane Resin Solutions

Preparation Example 2-1

Synthesis of Polyurethane Resin

To a reaction vessel equipped with temperature gauge, stirrer, Vigreux column, and Liebig condenser were charged 190 parts of dimethyl terephthalate, 5.9 parts of dimethyl 5-sulfoisophthalate, 152 parts of propylene glycol, and 0.2 part of tetrabutoxytitanium and a transesterification reaction was conducted for four hours at 200 to 230° C. Next, the temperature was raised to 240° C. over ten minutes while simultaneously reducing the pressure, the mixture was reacted for 30 minutes, and the reaction was ended, yielding polyester polyol 1.

One hundred parts of the polyester polyol 1 obtained were dissolved in 37 parts of methyl ethyl ketone (MEK) and 37 parts of toluene. Twelve parts of 4,4'-diphenylmethane diisocyanate (MDI) and 1 part of neopentyl glycol were added, 0.05 part of dibutyltin dilaurate was added as a catalyst, and the mixture was reacted for five hours at 80° C. Next, the solution was diluted with 94 parts of MEK and 94 parts of toluene, yielding polyurethane resin (referred to as "polyester polyurethane resin a", hereinafter) (Mn=25,000, $SO_3Na$ group concentration=87 mmol/kg, urethane group concentration=about 1.2 mmol/g).

Preparation Example 2-2

Synthesis of Radiation-Curable Polyurethane Resin (1) Synthesis of Polyester Resin A mixture of 159.7 parts of sodium dimethyl 5-sulfoisophthalate (made by Tokyo Chemical), 275.2 parts of ester glycol (made by Mitsubishi Chemical), and 2.4 parts of zinc acetate dihydrate (made by Wako Pure Chemical Industries) was heated at 245° C. The distillate thus obtained was stirred for six hours while being distilled off with a Dean Stark tube. The solid obtained was removed, yielding a polyester polyol (referred to as "polyester polyol 2", hereinafter) having the following structure. The weight average molecular weight and the weight average molecular weight/number average molecular weight ratio (Mw/Mn) of the polyester polyol obtained were determined with THF solvent by standard polystyrene conversion. The weight average molecular weight was 1,000, and the Mw/Mn=1.85.

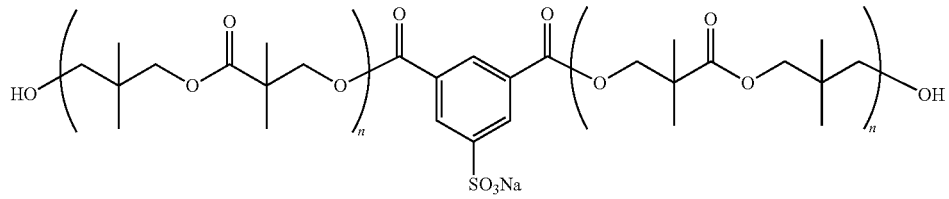

(2) Synthesis of Radiation-Curable Polyurethane Resin

To a flask were added chain-extending agents in the form of 60.0 parts of a methyl oxysilane adduct of 4,4'-(propane-2,2-diyl)diphenol (BPX-1000, made by Adeka, weight average molecular weight 1,000), 6.2 parts of glycerol methacrylate (Bremmer GLM, made by NOF Corporation) (concentration 355.4 mmol/kg), and 10.00 parts of dimethylol tricyclodecane (TCDM, made by Oxea); a polar group-introducing component in the form of 3.50 parts of polyester polyol 2; and polymerization solvents in the form of 159.4 parts of cyclohexanone and 0.24 part of p-methoxyphenol. Next, 35.7 parts of methylene bis(4,1-phenylene)=diisocyanate (MDI) (Millionate MT, made by Nippon Polyurethane Industry Co., Ltd.) were added. Next, 0.33 part of di-n-butyltin laurate was added as a polymerization catalyst, the temperature was raised to 80° C., and the mixture was stirred for five hours. When the reaction had ended, 120.2 parts of cyclohexanone were added, yielding a polyurethane resin solution. After urethane synthesis, 50 ppm of 4-hydroxy-2,2,6,6-tetramethylpiperidine-N-oxyl (4-OH-TEMPO) relative to the polyurethane solid component was added to the polyurethane resin solution obtained.

The solid component of the polyurethane resin solution obtained by the above process was 30 percent. The weight average molecular weight (Mw), number average molecular weight (Mn), and sulfonic acid (salt) group content of the polyurethane resin contained in the solution (referred to as "radiation-curable polyurethane resin c", hereinafter) were measured by the above-described methods: Mw=48,000, Mn=25,000, and sulfonic acid (salt) group content=60.7 mmol/kg. No residual monomer was found by GPC. Thus, the radiation-curable functional group content was calculated to be 336.0 mmol/kg based on the charge ratio.

Preparation Example 2-3

Synthesis of Radiation-Curable Polyurethane Resin (1) Synthesis of Sulfonate Group-Containing Diol Compound To a flask were added 100 mL of distilled water, 50 g of taurine (0.400 mol), and 22.46 g of KOH made by Wako Pure Chemical Industries. The internal temperature was raised to 50° C. and the contents were completely dissolved.

Next, the internal temperature was cooled to 40° C. and 140.4 g (1.080 mols) of butylglycidylether was added dropwise over 30 minutes, after which the temperature was raised to 50° C. and the mixture was reacted with stirring for two hours. The solution was cooled to room temperature, 100 mL of toluene was added, the solution was fractionated, and the toluene layer was discarded. Next, 400 mL of cyclohexanone was added, the temperature was raised to 110° C., and the water was removed with a Dean Stark apparatus, yielding a 50 percent cyclohexanone solution of a sulfonate group-containing diol compound. $^1$H-NMR data for the product are given below. Based on the NMR analysis results, the product was determined to be a mixture of Example Compound (S-31) described in Japanese Unexamined Patent Publication (KOKAI) No. 2009-96798, Example Compound (S-64) described in the same publication, and other compounds.

$^1$H-NMR (CDCl$_3$): δ(ppm)=4.5 (br.), 3.95-3.80 (m), 3.50-3.30 (m), 3.25-2.85 (m), 2.65-2.5 (m), 2.45-2.35 (m), 1.6-1.50 (quintet), 1.40-1.30 (sextet), 1.00-0.90 (triplet).

(2) Preparation of Radiation-Curable Polyurethane Resin

To a flask were added chain-extending agents in the form of 57.50 g of a methyl oxysilane adduct of 4,4'-(propane-2,2-diyl)diphenol (BPX-1000, made by Adeka, weight average molecular weight 1,000), 6.50 g of glycerol methacrylate (Bremmer GLM, made by NOF Corporation) (concentration 355.44 mmol/kg), and 10.50 g of dimethylol tricyclodecane (TCDM, made by Oxea); 6.80 g of a 50 percent cyclohexanone solution of Example Compound (S-31); and polymerization solvents in the form of 104.26 g of cyclohexanone and 0.240 g of p-methoxyphenol. Next, a solution of 42.21 g of methylene bis(4,1-phenylene)=diisocyanate (MDI) (Millionate MT, made by Nippon Polyurethane Industry Co., Ltd.) in 51.47 g of cyclohexanone was added dropwise over 15 minutes. Next, a polymerization catalyst in the form of 0.361 g of di-n-butyltin laurate was added, the temperature was raised to 80° C., and the mixture was stirred for three hours. When the reaction had ended, 121.28 g of cyclohexanone was added, yielding a polyurethane resin solution. After urethane synthesis, 50 ppm of 4-hydroxy-2,2,6,6-tetramethylpiperidine-N-oxyl (4-OH-TEMPO) relative to the polyurethane solid component was added to the polyurethane resin solution obtained.

The solid component of the polyurethane resin solution obtained by the above process was 30 percent. The weight average molecular weight (Mw), number average molecular weight (Mn), and sulfonic acid (salt) group content of the polyurethane resin contained in the solution (referred to as "radiation-curable polyurethane resin e", hereinafter) were measured by the above-described methods: Mw=36,000, Mn=24,000, and sulfonic acid (salt) group content=69.66 mmol/kg. No residual monomer was found by GPC. Thus, the radiation-curable functional group content was calculated to be 355.44 mmol/kg based on the charge ratio.

Preparation Example 2-4

Synthesis of Polyurethane Resin

To a flask were added 14.0 parts of above polyester 1, 61.0 parts of hydrogenated bisphenol A, 60.0 parts of Adeka polyether BPX-1000, 296.4 parts of cyclohexanone, and 79.6 parts of methylene bis(4,1-phenylene)=diisocyanate (MDI) (Millionate MT, made by Nippon Polyurethane Industry Co., Ltd.). Next, 0.21 part of di-n-butyltin laurate was added, the temperature was raised to 80° C., and the mixture was stirred for five hours. When the reaction had ended, 197.5 parts of cyclohexanone were added, yielding a polyurethane resin solution.

The solid component of the polyurethane resin solution obtained by the above process was 30 percent. The weight average molecular weight (Mw), number average molecular weight (Mn), and sulfonic acid (salt) group content of the polyurethane resin contained in the solution (referred to as "radiation-curable polyurethane resin f", hereinafter) were measured by the above-described methods: Mw=70,000, Mn=41,000, and sulfonic acid (salt) group content=65.2 mmol/kg.

Preparation Example 2-5

Synthesis of Radiation-Curable Polyurethane Resin

To a flask were added chain-extending agents in the form of 70.50 g of a methyl oxysilane adduct of 4,4'-(propane-2,2-diyl)diphenol (BPX-1000, made by Adeka, weight average molecular weight 1,000), 6.50 g of glycerol methacrylate (Bremmer GLM, made by NOF Corporation) (concentration 355.44 mmol/kg), and 3.90 g of dimethylol tricyclodecane (TCDM, made by Oxea); 6.80 g of a 50 percent cyclohexanone solution of Example Compound (S-31); and polymerization solvents in the form of 116.41 g of cyclohexanone and 0.240 g of p-methoxyphenol. Next, a solution of 32.32 g of methylene bis(4,1-phenylene)=diisocyanate (MDI) (Millionate MT, made by Nippon Polyurethane Industry Co., Ltd.) in 44.64 g of cyclohexanone were added dropwise over 15 minutes. Next, a polymerization catalyst in the form of 0.361 g of di-n-butyltin laurate was added, the temperature was raised to 80° C., and the mixture was stirred for three hours. When the reaction had ended, 121.29 g of cyclohexanone was added, yielding a polyurethane resin solution. After urethane synthesis, 50 ppm of 4-hydroxy-2,2,6,6-tetramethylpiperidine-N-oxyl (4-OH-TEMPO) relative to the polyurethane solid component was added to the polyurethane resin solution obtained.

The solid component of the polyurethane resin solution obtained by the above process was 30 percent. The weight average molecular weight (Mw), number average molecular weight (Mn), and sulfonic acid (salt) group content of the polyurethane resin contained in the solution (referred to as "radiation-curable polyurethane resin h", hereinafter) were measured by the above-described methods: Mw=36,000, Mn=24,000, and sulfonic acid (salt) group content=68.8 mmol/kg. No residual monomer was found by GPC. Thus, the radiation-curable functional group content was calculated to be 348 mol/kg based on the charge ratio.

Preparation Example 2-6

Synthesis of Polyurethane Resin (1) Synthesis of Polyester Resin

A mixture of 11.1 parts of sodium dimethyl 5-sulfoisophthalate (made by Tokyo Chemical), 100.0 parts of adipic acid (made by Tokyo Chemical), 79.4 parts of 2,2-dimethyl-1,3-propanediol, 29.4 parts of 1,6-hexanediol, and 0.4 part of dibutyltin oxide (made by Tokyo Chemical) was heated at 245° C. The distillate thus obtained was stirred for six hours while being distilled off with a Dean Stark tube, yielding a polyester polyol (referred to as "polyester polyol 3", hereinafter) having the following structure. The weight average molecular weight and the weight average molecular weight/number average molecular weight ratio (Mw/Mn) of polyester polyol 3 that was obtained were determined with THF solvent by standard polystyrene conversion. The weight average molecular weight was 2,150, and the Mw/Mn=1.85.

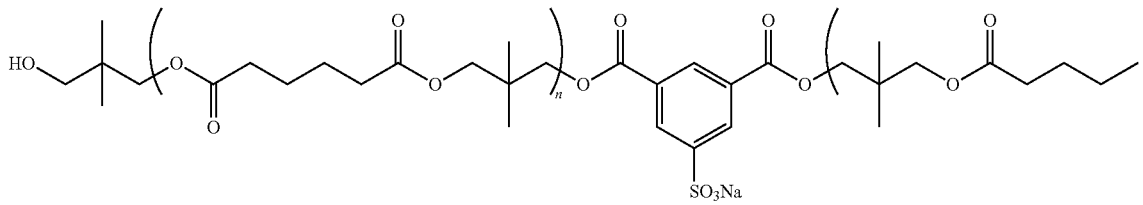

(2) Synthesis of Polyester Resin
A mixture of 100.0 parts of adipic acid (made by Tokyo Chemical), 74.8 parts of 2,2-dimethyl-1,3-propanediol, 27.7 parts of 1,6-hexanediol, and 0.4 part of dibutyltin oxide (made by Tokyo Chemical) was heated at 245° C. The distillate thus obtained was stirred for six hours while being distilled off with a Dean Stark tube, yielding a polyester polyol 4 (referred to as "polyester polyol 4", hereinafter) having the following structure. The weight average molecular weight and the weight average molecular weight/number average molecular weight ratio (Mw/Mn) of the polyester polyol 4 that was obtained were determined with THF solvent by standard polystyrene conversion. The weight average molecular weight was 2,100, and the Mw/Mn=1.85.

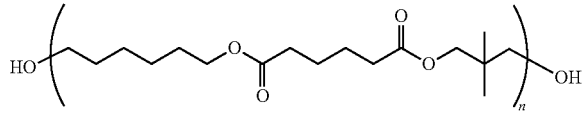

(3) Synthesis of Polyester Polyurethane
To a flask were added 50.0 parts of polyester polyol 3, 50.0 parts of polyester polyol 4, 100.0 parts of 2-ethylbutyl-1,3-propanediol, 501.4 parts of cyclohexanone, and 163.0 parts of methylene bis(4,1-phenylene)=diisocyanate (MDI) (Millionate MT, made by Nippon Polyurethane Industry Co., Ltd.). Next, 0.72 part of di-n-butyltin laurate was added, the temperature was raised to 80° C., and the mixture was stirred for five hours. When the reaction had ended, 331.5 parts of cyclohexanone were added, yielding a solution of polyester urethane resin A.

The solid component of the polyurethane resin solution obtained by the above process was 30 percent. The weight average molecular weight (Mw), number average molecular weight (Mn), and sulfonic acid (salt) group content of the polyurethane resin contained in the solution (referred to as "radiation-curable polyurethane resin g", hereinafter) were measured by the above-described methods: Mw=70,000, Mn=41,000, and sulfonic acid (salt) group content=64.1 mmol/kg. The urethane group concentration was 3.8 mmol/g.

Preparation Example 2-7

Synthesis of Radiation-Curable Polyurethane Resin

To a flask were added chain-extending agents in the form of 41.10 g of a methyl oxysilane adduct of 4,4'-(propane-2,2-diyl)diphenol (BPX-1000, made by Adeka, weight average molecular weight 1,000), 6.50 g of glycerol methacrylate (Bremmer GLM, made by NOF Corporation) (concentration 355.44 mmol/kg), and 19.80 g of dimethylol tricyclodecane (TCDM, made by Oxea); 6.80 g of a 50 percent cyclohexanone solution of polyester 1; and polymerization solvents in the form of 97.36 g of cyclohexanone and 0.240 g of p-methoxyphenol. Next, a solution of 44.30 g of methylene bis(4,1-phenylene)=diisocyanate (MDI) (Millionate MT, made by Nippon Polyurethane Industry Co., Ltd.) in 61.68 g of cyclohexanone were added dropwise over 15 minutes. Next, a polymerization catalyst in the form of 0.361 g of di-n-butyltin laurate was added, the temperature was raised to 80° C., and the mixture was stirred for three hours. When the reaction had ended, 120.41 g of cyclohexanone was added, yielding a polyurethane resin solution. After urethane synthesis, 50 ppm of 4-hydroxy-2,2,6,6-tetramethylpiperidine-N-oxyl (4-OH-TEMPO) relative to the polyurethane solid component was added to the polyurethane resin solution obtained.

The solid component of the polyurethane resin solution obtained by the above process was 30 percent. The weight average molecular weight (Mw), number average molecular weight (Mn), and sulfonic acid (salt) group content of the polyurethane resin contained in the solution (referred to as "radiation-curable polyurethane resin i", hereinafter) were measured by the above-described methods: Mw=36,000, Mn=24,000, and sulfonic acid (salt) group content=69.6 mmol/kg. No residual monomer was found by GPC. Thus, the radiation-curable functional group content was calculated to be 352 mmol/kg based on the charge ratio.

Preparation Example 2-8

Synthesis of Radiation-Curable Polyurethane Resin

To a flask were added chain-extending agents in the form of 31.00 g of a methyl oxysilane adduct of 4,4'-(propane-2,2-diyl)diphenol (BPX-1000, made by Adeka, weight average molecular weight 1,000), 6.50 g of glycerol methacrylate (Bremmer GLM, made by NOF Corporation) (concentration 355.44 mmol/kg), and 26.00 g of dimethylol tricyclodecane (TCDM, made by Oxea); 6.80 g of a 50 percent cyclohexanone solution of polyester 1; and polymerization solvents in the form of 92.39 g of cyclohexanone and 0.240 g of p-methoxyphenol. Next, a solution of 49.52 g of methylene bis(4,1-phenylene)=diisocyanate (MDI) (Millionate MT, made by Nippon Polyurethane Industry Co., Ltd.) in 61.18 g of cyclohexanone were added dropwise over 15 minutes. Next, a polymerization catalyst in the form of 0.361 g of di-n-butyltin laurate was added, the temperature was raised to 80° C., and the mixture was stirred for three hours. When the reaction had ended, 121.81 g of cyclohexanone was added, yielding a polyurethane resin solution. After urethane synthesis, 50 ppm of 4-hydroxy-2,2,6,6-tetramethylpiperidine-N-oxyl (4-OH-TEMPO) relative to the polyurethane solid component was added to the polyurethane resin solution obtained as component D.

The solid component of the polyurethane resin solution obtained by the above process was 30 percent. The weight average molecular weight (Mw), number average molecular weight (Mn), and sulfonic acid (salt) group content of the polyurethane resin contained in the solution (referred to as "radiation-curable polyurethane resin j", hereinafter) were measured by the above-described methods: Mw=36,000, Mn=24,000, and sulfonic acid (salt) group content=68.9 mmol/kg. No residual monomer was found by GPC. Thus, the radiation-curable functional group content was calculated to be 349 mmol/kg based on the charge ratio.

3. Examples and Comparative Examples of the Fabrication and Evaluation of Magnetic Tapes Example 1

(1) Preparation Of Magnetic Layer Coating Liquid

Ferromagnetic metal powder: 100 parts
Composition Fe/Co=100/25
Hc: 195 kA/m (approx. 2,450 Oe)
Specific surface area by BET method: 65 $m^2/g$
Surface treated with $Al_2O_3$, $SiO_2$, $Y_2O_3$
Particle size (average major axis length): 35 nm
Aciculari ratio: 5
σs: 110 $A·m^2/kg$ (approx. 110 emu/g)
Dispersing agent trans-cinnamic acid (made by Tokyo Chemical): 5 parts
Polyvinyl chloride copolymer MR104 (made by Zeon Corporation): 10 parts
Polyester polyurethane resin a: 10 parts
Methyl ethyl ketone: 150 parts
Cyclohexanone: 150 parts
α-$Al_2O_3$ Mohs' hardness 9 (average particle diameter 0.1 μm): 15 parts
Carbon black (average particle diameter 0.08 μm): 0.5 part
The various components of the above coating material were kneaded in an open kneader and dispersed in a sand mill. To the dispersion obtained were admixed:
Butyl stearate: 1.5 parts
Stearic acid: 0.5 part
Methyl ethyl ketone: 50 parts
Cyclohexanone: 50 parts
Toluene: 3 parts and
Polyisocyanate compound (Coronate 3041, made by Nippon Polyurethane Industry Co., Ltd.): 5 parts.
The mixture was stirred for 20 minutes, ultrasonically processed, and passed through a filter having an average pore diameter of 1 μm to prepare a magnetic layer coating liquid.

(2) Preparation of Nonmagnetic Layer Coating Liquid

Nonmagnetic powder (α-$Fe_2O_3$ hematite): 75 parts
Major axis length: 0.15 μm
Specific surface area by BET method: 52 $m^2/g$
pH: 6
Tap density: 0.8
DBP oil absorption capacity: 27 to 38 g/100 g
Surface treatment agents: $Al_2O_3$, $SiO_2$ Carbon black: 25 parts
Average primary particle diameter: 0.020 µm
DBP oil absorption capacity: 80 mL/100 g
pH: 8.0
Specific surface area by BET method: 250 m$^2$/g
Volatile content: 1.5 percent
Radiation-curable vinyl chloride copolymer b: 12 parts
Radiation-curable polyurethane resin c: 7.5 parts
Methyl ethyl ketone: 150 parts
Cyclohexanone: 150 parts The various components of the above coating material were kneaded in an open kneader and dispersed in a sand mill.

To the dispersion obtained were admixed:
Butyl stearate: 1.5 parts
Stearic acid: 1 part
Methyl ethyl ketone: 50 parts
Cyclohexanone: 50 parts The mixture was then passed through a filter having an average pore diameter of 1 µm to prepare a nonmagnetic coating liquid.

(3) Preparation of Backcoat Layer Coating Liquid

Carbon black (average particle diameter 40 nm): 85 parts
Carbon black (average particle diameter 100 nm): 3 parts
Nitrocellulose: 28 parts
Polyester resin (Vylon 500, made by Toyobo): 58 parts
Copper phthalocyanine dispersing agent: 2.5 parts
Nipporan 2301 (Nippon Polyurethane Industry Co., Ltd.): 0.5 part
Methyl isobutyl ketone: 0.3 part
Methyl ethyl ketone: 860 parts and
Toluene: 240 parts
were prekneaded in a roll mill and dispersed in a sand mill. To this were added:
Polyester resin (Vylon 500, made by Toyobo Co., Ltd.): 4 parts
Polyisocyanate compound (Coronate 3041, made by Nippon Polyurethane Industry Co., Ltd.): 14 parts and
α-Al$_2$O$_3$ (Sumitomo Chemical): 5 parts.

The mixture was stirred and filtered to prepare a backcoat layer coating liquid.

(4) Preparation of Magnetic Recording Medium

A coil bar was used to coat an adhesive layer in the form of a sulfonic acid-containing polyester resin to a thickness upon drying of 0.05 µm on a polyethylene naphthalate resin support 5 µm in thickness having a centerline surface roughness of 0.003 µm on the surface on which a magnetic layer was to be coated.

Next, the nonmagnetic layer coating liquid was coated to so as to yield a thickness of 1.0 µm upon drying and completely dried with a dryer. Subsequently, the coating layer of the nonmagnetic layer coating liquid was irradiated with 40 kGy of radiation in an atmosphere with an oxygen concentration of equal to or less than 200 ppm to form a nonmagnetic layer (radiation-cured layer).

Immediately thereafter, the magnetic layer coating liquid was coated thereover so as to yield a magnetic layer 0.06 µm in thickness, oriented with a solenoid having a magnetic force of 0.4 T (4,000 G), and dried. On the reverse side of the support, the backcoat layer coating liquid was coated so as to yield a thickness upon drying of 0.5 µm. Following the coating, a portion of the sheet was used to evaluate surface properties. Next, processing was conducted at a rate of 80 m/min. at a temperature of 100° C. with a seven-stage calender comprised of metal rolls and the product was slit to ½ inch width to obtain a magnetic recording tape.

Example 2

With the exceptions that radiation-curable vinyl chloride copolymer b was replaced with radiation-curable vinyl chloride copolymer d and radiation-curable polyurethane resin c was replaced with radiation-curable polyurethane resin e in the preparation of the nonmagnetic layer coating liquid in Example 1, a magnetic tape was prepared by the same method as in Example 1.

Example 3

With the exception that radiation-curable polyurethane resin e was replaced with radiation-curable polyurethane resin h in the preparation of the nonmagnetic layer coating liquid in Example 2, a magnetic tape was prepared by the same method as in Example 2.

Example 4

With the exception that radiation-curable polyurethane resin e was replaced with radiation-curable polyurethane resin i in the preparation of the nonmagnetic layer coating liquid in Example 2, a magnetic tape was prepared by the same method as in Example 2.

Example 5

With the exception that radiation-curable polyurethane resin e was replaced with radiation-curable polyurethane resin j in the preparation of the nonmagnetic layer coating liquid in Example 2, a magnetic tape was prepared by the same method as in Example 2.

Comparative Example 1

(1) Preparation of Magnetic Layer Coating Liquid

Ferromagnetic metal powder: 100 parts
Composition Fe/Co=100/25
Hc: 195 kA/m (approx. 2,450 Oe)
Specific surface area by BET method: 65 m$^2$/g
Surface treated with Al$_2$O$_3$, SiO$_2$, Y$_2$O$_3$
Particle size (average major axis length) 45 nm
Acicular ratio: 5
σs: 110 A·m$^2$/kg (approx. 110 emu/g)
Dispersing agent Phenylphosphonic acid (made by Tokyo Chemical): 5 parts Polyvinyl chloride copolymer k (MR104 made by Zeon Corporation): 10 parts
Polyester polyurethane resin a: 10 parts
Methyl ethyl ketone: 150 parts
Cyclohexanone: 150 parts
α-Al$_2$O$_3$ Mohs' hardness 9 (average particle diameter 0.1 µm): 15 parts
Carbon black (average particle diameter 0.08 µm): 0.5 part The various components of the above coating material were kneaded in an open kneader and dispersed in a sand mill. To the dispersion obtained were admixed:
Butyl stearate: 1.5 parts
Stearic acid: 0.5 part
Methyl ethyl ketone: 50 parts
Cyclohexanone: 50 parts
Toluene: 3 parts and Polyisocyanate compound (Coronate 3041, made by Nippon Polyurethane Industry Co., Ltd.): 5 parts.

The mixture was stirred for 20 minutes, ultrasonically processed, and passed through a filter having an average pore diameter of 1 μm to prepare a magnetic layer coating liquid.

(2) Preparation of Nonmagnetic Layer Coating Liquid

Nonmagnetic powder (α-$Fe_2O_3$ hematite): 80 parts
Major axis length: 0.15 μm
Specific surface area by BET method: 52 $m^2$/g
pH: 6
Tap density: 0.8
DBP oil absorption capacity: 27 to 38 g/100 g
Surface treatment agents $Al_2O_3$, $SiO_2$
Carbon black: 20 parts
Average primary particle diameter: 0.020 μm
DBP oil absorption capacity: 80 mL/100 g
pH: 8.0
Specific surface area by BET method: 250 $m^2$/g
Volatile content: 1.5 percent
Vinyl chloride copolymer k (MR-104 made by Zeon Corp.): 15 parts
Polyether polyurethane resin f: 10 parts
Methyl ethyl ketone: 150 parts
Cyclohexanone: 150 parts The various components of the above coating material were kneaded in an open kneader and dispersed in a sand mill. To the dispersion obtained were admixed:

Butyl stearate: 1.5 parts
Stearic acid: 1 part
Polyisocyanate compound (Coronate 3041, made by Nippon Polyurethane Industry Co., Ltd.): 5 parts
Methyl ethyl ketone: 50 parts and
Cyclohexanone: 50 parts.

The mixture was then passed through a filter having an average pore diameter of 1 μm to prepare a nonmagnetic coating liquid.

(3) Preparation of Magnetic Recording Medium

A coil bar was used to coat an adhesive layer in the form of sulfonic acid-containing polyester resin to a thickness upon drying of 0.05 μm on a polyethylene naphthalate resin support 5 μm in thickness having a centerline surface roughness of 0.003 μm on the surface on which a magnetic layer was to be coated.

Next, simultaneous multilayer coating was conducted by applying the nonmagnetic layer coating liquid so as to yield a thickness of 1.0 μm upon drying and applying the magnetic layer coating liquid so as to yield a thickness of 0.06 μm upon drying. Orientation was conducted with a solenoid having a magnetic force of 0.4 T (4,000 G) and the coatings were dried. On the reverse side of the support, a backcoat layer coating liquid that had been prepared by the same method as in Example 1 was applied so as to yield a thickness of 0.5 μm upon drying. Following the coating, a portion of the sheet was used to evaluate surface properties. Next, processing was conducted at a rate of 80 m/min. at a temperature of 100° C. with a seven-stage calender comprised of metal rolls. Thermoprocessing was then conducted for 36 hours at 70° C. and the product was slit to ½ inch width to obtain a magnetic recording tape.

Comparative Example 2

With the exception that the phenylphosphonic acid was replaced with 5.0 parts of 4-tert-butylphenol (made by Tokyo Chemical) as the dispersing agent in the magnetic layer coating liquid, a magnetic recording tape was obtained by the same method as in Comparative Example 1.

Example 6

With the exception that the trans-cinnamic acid was replaced with 5.0 parts of phenylphosphonic acid as the dispersing agent in the magnetic layer coating liquid, a magnetic recording tape was obtained by the same method as in Example 1.

Comparative Example 3

With the exception that a magnetic layer coating liquid prepared by the same method as in Example 1 with the exception that the trans-cinnamic acid was replaced with 5.0 parts of the 4-tert-butylphenol employed in Comparative Example 2 as the dispersing agent in the magnetic layer coating liquid, a magnetic recording tape was obtained by the same method as in Comparative Example 1.

Comparative Example 4

With the exception that the 4-tert-butylphenol was replaced with the trans-cinnamic acid employed in Example 1 as the dispersion agent in the magnetic layer coating liquid, a magnetic recording tape was prepared by the same method as in Comparative Example 3.

Example 7

With the exception that the trans-cinnamic acid was replaced with 5.0 parts of benzoic acid (made by Tokyo Chemical) as the dispersion agent in the magnetic layer coating liquid, a magnetic recording tape was prepared by the same method as in Example 1.

Example 8

With the exception that the ferromagnetic metal powder was replaced with the hexagonal barium ferrite powder indicated below in the preparation of the magnetic layer coating liquid, a magnetic recording tape was prepared by the same method as in Example 1.

<Hexagonal Barium Ferrite Powder>
Components excluding oxygen (molar ratio): Ba/Fe/Co/Zn=1/9/0.2/1
Hc: 176 kA/m (2,200 Oe)
Average plate diameter: 20 nm
Average plate ratio: 3
BET specific surface area: 65 $m^2$/g
σs: 49 A·$m^2$/kg (49 emu/g)
pH: 7

Example 9

With the exception that the polyisocyanate compound (Coronate 3041, made by Nippon Polyurethane Industrial Co., Ltd.) was changed to 2.5 parts (the same ratio as in Test 6 described further below) in the preparation of the magnetic layer coating liquid, a magnetic recording tape was prepared by the same method as in Example 1.

Example 10

With the exception that polyester polyurethane resin a was changed to 6 parts, polyvinyl chloride copolymer k (MR104, made by Zeon Corp.) was changed to 14 parts, and the polyisocyanate compound (Coronate 3041, made by Nippon Polyurethane Industrial Co., Ltd.) was changed to 7 parts (the same ratio as in Test 3 described further below) in the preparation of the magnetic layer coating liquid, a magnetic recording tape was obtained by the same method as in Example 1.

Comparative Example 5

With the exception that polyester polyurethane resin a was replaced with polyester polyurethane resin g in the preparation of the magnetic layer recording liquid, a magnetic recording tape was obtained by the same method as in Example 1.

Comparative Example 6

With the exceptions that polyester polyurethane resin a was changed to 0 part, polyvinyl chloride copolymer k (MR104, made by Zeon Corp.) was changed to 20 parts, and the polyisocyanate compound (Coronate 3041, made by Nippon Urethane Industrial Co., Ltd.) was changed to 0 part (the same ratio as in Test 10 set forth further below) in the preparation of the magnetic layer coating liquid, a magnetic recording tape was obtained by the same method as in Example 1.

Comparative Example 7

Polyester urethane resin a was changed to 20 parts, polyvinyl chloride copolymer k (MR104, made by Zeon Corp.) was changed to 0 part, and the polyisocyanate compound (Coronate 3041, made by Nippon Urethane Industrial Co., Ltd.) was changed to 0 part (the same ratio as in Test 9 set forth further below) in the preparation of the magnetic layer coating liquid. However, dispersion of the ferromagnetic powder did not proceed and it proved impossible to prepare a magnetic recording tape.

Example 11

With the exception that the polyisocyanate compound (Coronate 3041, made by Nippon Urethane Industrial Co., Ltd.) was changed to 3.5 parts (the same ratio as in Test 2 set forth further below) in the preparation of the magnetic layer coating liquid, a magnetic recording tape was prepared by the same method as in Example 5.

Example 12

With the exception that the polyisocyanate compound (Coronate 3041, made by Nippon Urethane Industrial Co., Ltd.) was changed to 10.5 parts (the same ratio as in Test 4 set forth further below) in the preparation of the magnetic layer coating liquid, a magnetic recording tape was prepared by the same method as in Example 5.

Comparative Example 8

With the exception that the polyisocyanate compound (Coronate 3041, made by Nippon Urethane Industrial Co., Ltd.) was changed to 0 part (the same ratio as in Test 5 set forth further below) in the preparation of the magnetic layer coating liquid, a magnetic recording tape was prepared by the same method as in Example 1.

Example 13

With the exception that the quantity of trans-cinnamic acid was decreased from 5 parts to 1.5 parts in the preparation of the magnetic layer coating liquid, a magnetic recording tape was obtained by the same method as in Example 1.

Example 14

With the exception that the quantity of trans-cinnamic acid was increased from 5 parts to 10 parts in the preparation of the magnetic layer coating liquid, a magnetic recording tape was obtained by the same method as in Example 1.

Glass Transition Temperature Tg2 of the Nonmagnetic Layer

The glass transition temperature $Tg2$ of the nonmagnetic layer was measured in Examples and Comparative Examples. Table 4 below gives the blending formulas, summaries of the preparation methods, and the values measured for $Tg2$ in the above Examples and comparative examples.

TABLE 4

| | Ferromagnetic powder | | Dispersing agent in the magnetic layer | Binder in the magnetic layer | Nonmagnetic layer | |
|---|---|---|---|---|---|---|
| | Type | Average particle size | | | Biner | Curing method |
| Ex. 1 | MP | 35 nm | TCA 5 parts | Vinyl chloride copolymer k: 10 parts Polyester polyurethane resin a: 10 parts Polyisocyanate: 5 parts | Radiation-curable vinyl chloride copolymer b: 12 parts Radiation-curable polyurethane resin c: 7.5 parts | Radiation curing $Tg2 = 64°$ C. |
| Ex. 2 | MP | 35 nm | TCA 5 parts | Vinyl chloride copolymer k: 10 parts Polyester polyurethane resin a: 10 parts Polyisocyanate: 5 parts | Radiation-curable vinyl chloride copolymer d: 12 parts Radiation-curable polyurethane resin e: 7.5 parts | Radiation curing $Tg2 = 68°$ C. |
| Ex. 3 | MP | 35 nm | TCA 5 parts | Vinyl chloride copolymer k: 10 parts Polyester polyurethane resin a: 10 parts Polyisocyanate: 5 parts | Radiation-curable vinyl chloride copolymer d: 12 parts Radiation-curable polyurethane resin h: 7.5 parts | Radiation curing $Tg2 = 77°$ C. |

TABLE 4-continued

| | Ferromagnetic powder | | Dispersing agent in the magnetic layer | Binder in the magnetic layer | Nonmagnetic layer | |
|---|---|---|---|---|---|---|
| | Type | Average particle size | | | Biner | Curing method |
| Ex. 4 | MP | 35 nm | TCA 5 parts | Vinyl chloride copolymer k: 10 parts Polyester polyurethane resin a: 10 parts Polyisocyanate: 5 parts | Radiation-curable vinyl chloride copolymer d: 12 parts Radiation-curable polyurethane resini: 7.5 parts | Radiation curing Tg2 = 72° C. |
| Ex. 5 | MP | 35 nm | TCA 5 parts | Vinyl chloride copolymer k: 10 parts Polyester polyurethane resin a: 10 parts Polyisocyanate: 5 parts | Radiation-curable vinyl chloride copolymer d: 12 parts Radiation-curable polyurethane resin j: 7.5 parts | Radiation curing Tg2 = 82° C. |
| Ex. 9 | MP | 35 nm | TCA 5 parts | Vinyl chloride copolymer k: 10 parts Polyester polyurethane resina: 10 parts Polyisocyanate: 2.5 parts | Radiation-curable vinyl chloride copolymer b: 12 parts Radiation-curable polyurethane resin c: 7.5 parts | Radiation curing Tg2 = 64° C. |
| Ex. 10 | MP | 35 nm | TCA 5 parts | Vinyl chloride copolymer k: 14 parts Polyester polyurethane resina: 6 parts Polyisocyanate: 7 parts | Radiation-curable vinyl chloride copolymer b: 12 parts Radiation-curable polyurethane resin c: 7.5 parts | Radiation curing Tg2 = 64° C. |
| Ex. 11 | MP | 35 nm | TCA 5 parts | Vinyl chloride copolymer k: 10 parts Polyester polyurethane resina: 10 parts Polyisocyanate: 3.5 parts | Radiation-curable vinyl chloride copolymer d: 12 parts Radiation-curable polyurethane resin j: 7.5parts | Radiation curing Tg2 = 82° C. |
| Ex. 12 | MP | 35 nm | TCA 5 parts | Vinyl chloride copolymer k: 10 parts Polyester polyurethane resin a: 10 parts Polyisocyanate: 10.5 parts | Radiation-curable vinyl chloride copolymer d: 12 parts Radiation-curable polyurethane resin j: 7.5 parts | Radiation curing Tg2 = 82° C. |
| Ex. 13 | MP | 35 nm | TCA 1.5 parts | Vinyl chloride copolymer k: 10 parts Polyester polyurethane resin a: 10 parts Polyisocyanate: 5 parts | Radiation-curable vinyl chloride copolymer b: 12 parts Radiation-curable polyurethane resin c: 7.5 parts | Radiation curing Tg2 = 64° C. |
| Ex. 14 | MP | 35 nm | TCA 10 parts | Vinyl chloride copolymer k: 10 parts Polyester polyurethane resin a: 10 parts Polyisocyanate: 5 parts | Radiation-curable vinyl chloride copolymer b: 12 parts Radiation-curable polyurethane resin c: 7.5 parts | Radiation curing Tg2 = 64° C. |
| Comp. Ex. 1 | MP | 45 nm | PPA 5 parts | Vinyl chloride copolymer k: 10 parts Polyester polyurethane resin a: 10 parts Polyisocyanate: 5 parts | Vinyl chloride copolymer k: 15 parts Polyether polyurethane resin f: 10parts | Thermal curing Tg2 = 87° C. |
| Comp. Ex. 2 | MP | 35 nm | 4-t-BP 5 parts | Vinyl chloride copolymer k: 10 parts Polyester polyurethane resin a: 10 parts Polyisocyanate: 5 parts | Vinyl chloride copolymer k: 15 parts Polyether polyurethane resin f: 10 parts | Thermal curing Tg2 = 87° C. |
| Ex. 6 | MP | 35 nm | PPA 5 parts | Vinyl chloride copolymer k: 10 parts Polyester | Radiation-curable vinyl chloride copolymer b: 12 parts | Radiation curing Tg2 = 64° C. |

TABLE 4-continued

| | Ferromagnetic powder | | Dispersing agent in the magnetic layer | Binder in the magnetic layer | Nonmagnetic layer | |
|---|---|---|---|---|---|---|
| | Type | Average particle size | | | Binder | Curing method |
| Comp. Ex. 3 | MP | 35 nm | 4-t-BP 5 parts | Vinyl chloride copolymer k: 10 parts Polyester polyurethane resin a: 10 parts Polyisocyanate: 5 parts | Radiation-curable polyurethane resin c: 7.5 parts Vinyl chloride copolymer k: 15 parts Polyether polyurethane resin f: 10 parts | Thermal curing Tg2 = 87° C. |
| Comp. Ex. 4 | MP | 35 nm | TCA 5 parts | Vinyl chloride copolymer k: 10 parts Polyester polyurethane resin a: 10 parts Polyisocyanate: 5 parts | Vinyl chloride copolymer k: 15 parts Polyether polyurethane resin f: 10 parts | Thermal curing Tg2 = 87° C. |
| Ex. 7 | MP | 35 nm | Benzoic acid 5 parts | Vinyl chloride copolymer k: 10 parts Polyester polyurethane resin a: 10 parts Polyisocyanate: 5 parts | Radiation-curable vinyl chloride copolymer b: 12 parts Radiation-curable polyurethane resin c: 7.5 parts | Radiation curing Tg2 = 64° C. |
| Comp. Ex. 5 | MP | 35 nm | TCA 5 parts | Vinyl chloride copolymer k: 10 parts Polyester polyurethane resin g: 10 parts Polyisocyanate: 5 parts | Radiation-curable vinyl chloride copolymer b: 12 parts Radiation-curable polyurethane resin c: 7.5 parts | Radiation curing Tg2 = 64° C. |
| Comp. Ex. 6 | MP | 35 nm | TCA 5 parts | Vinyl chloride copolymer k: 20 parts Polyester polyurethane resin a: 0 parts Polyisocyanate: 0 parts | Radiation-curable vinyl chloride copolymer b: 12 parts Radiation-curable polyurethane resin c: 7.5 parts | Radiation curing Tg2 = 64° C. |
| Comp. Ex. 7 | MP | 35 nm | TCA 5 parts | Vinyl chloride copolymer k: 0 parts Polyester polyurethane resin a: 10 parts Polyisocyanate: 0 parts | Radiation-curable vinyl chloride copolymer b: 12 parts Radiation-curable polyurethane resin c: 7.5 parts | (Preparation of medium was impossible.) |
| Comp. Ex. 8 | MP | 35 nm | TCA 5 parts | Vinyl chloride copolymer k: 10 parts Polyester polyurethane resin a: 10 parts Polyisocyanate: 0 parts | Radiation-curable vinyl chloride copolymer b: 12 parts Radiation-curable polyurethane resin c: 7.5 parts | Radiation curing Tg2 = 64° C. |
| Ex. 8 | BaFe | 20 nm | TCA 5 parts | Vinyl chloride copolymer k: 10 parts Polyester polyurethane resin a: 10 parts Polyisocyanate: 5 parts | Radiation-curable vinyl chloride copolymer b: 12 parts Radiation-curable polyurethane resin c: 7.5 parts | Radiation curing Tg2 = 64° C. |

In Table 4, MP: ferromagnetic metal powder, BaFe: hexagonal burium ferrite powder, TCA: trans-cinnamic acid, PPA: phenylphosponic acid, 4-t-BP: 4-t-butylphenol.

Measurement of the Glass Transition Temperature Tg1 and Storage Elastic Modulus at 80° C. Of the Binder Resin The glass transition temperature Tg1 and the storage elastic modulus E' at 80° C. of the binder resins employed in the magnetic layer and nonmagnetic layer in Examples and Comparative Examples are given in Table 5 below. The storage elastic modulus E' at 80° C. of polyester polyurethane resin a was 2.57 GPa.

TABLE 5

| | Application | Tg1 |
|---|---|---|
| Polyester polyurethane resin a | For magnetic layer | 113° C. |
| Radiation-curable vinyl chloride copolymer b | For nonmagnetic layer | 70° C. |

TABLE 5-continued

| | Application | Tg1 |
|---|---|---|
| Radiation-curable polyurethane resin c | For nonmagnetic layer | 59° C. |
| Radiation-curable vinyl chloride copolymer d | For nonmagnetic layer | 64° C. |
| Radiation-curable polyurethane resin e | For nonmagnetic layer | 56° C. |
| Polyether polyurethane resin f | For magnetic layer | 90° C. |
| Polyester polyurethane resin g | For magnetic layer | 80° C. |
| Radiation-curable polyurethane resin h | For nonmagnetic layer | 34° C. |
| Radiation-curable polyurethane resin i | For nonmagnetic layer | 84° C. |
| Radiation-curable polyurethane resin j | For nonmagnetic layer | 97° C. |

Evaluation Methods (i) Dispersion Stability of Magnetic Layer Coating Liquid

The state of the coating liquid was observed at the stage when the magnetic layer coating liquid had been completed to determine the effect on enhancing dispersion of the dispersing agent that was added in Examples and Comparative Examples shown in Table 6. Specifically, the coating liquid was left standing for 10 minutes after which the amount of solidification of the coating liquid was visually observed based on the following evaluation standard:

Evaluation Standard:

◯: Remained in liquid state

Δ: A tendency toward increased viscosity was observed, but remained in a liquid state X: Solidified into pudding-like form (ii) Evaluation of Dispersion of the Ferromagnetic Powder in the Magnetic Layer Coating Liquid Magnetic sheets were prepared by the following method for evaluation of the dispersion of the ferromagnetic powder in the magnetic layer coating liquid for Examples and Comparative Examples shown in Table 6.

A coil bar was used to coat an adhesive layer in the form of a sulfonic acid-containing polyester resin to a thickness upon drying of 0.05 μm on a polyethylene naphthalate resin support 5 μm in thickness with a centerline surface roughness of 0.003 μm on the surface on which a magnetic layer was to be coated.

Next, the magnetic layer coating liquid was coated to a thickness upon drying of 1.0 μm, oriented with a solenoid having a magnetic force of 0.4 T (4,000 G), and dried. Processing was then conducted at a rate of 80 m/min. at a temperature of 100° C. with a seven-stage calender comprised of metal rolls, yielding a magnetic sheet.

Using a vibrating sample magnetometer (VSM-P7, made by Toei-Kogyo Co., Ltd.), the magnetic characteristics of the magnetic sheets obtained were measured while applying an external magnetic field parallel to the direction of orientation of the ferromagnetic powder. Specifically, the ratio of the value of the magnetization (residual magnetization) when the external magnetic field was zero to the value of the magnetization (saturation magnetization) while applying a 797.7 kA/m (10 kOe) external magnetic field, that is, the squareness (SQ), was measured.

The SQ can be used as an index of the dispersion of ferromagnetic powder. When dispersion is poor, the SQ drops, and when good, the SQ rises. The SQ value affects on noise, and is thus desirably as close to 1.0 as possible.

In magnetic recording tapes employing ferromagnetic metal powders, an SQ of equal to or higher than 0.83 indicated good dispersion, and in magnetic tapes employing hexagonal barium ferrite powder, an SQ of equal to or higher than 0.65 was evaluated as indicating good dispersion.

(iii) Evaluation of Calendering Moldability

The surface roughness of the magnetic layer surface was measured before and after seven-stage calendering in the magnetic recording tapes of Examples and Comparative Examples indicated in Table 6. The surface roughness was measured as the center plane average surface roughness Ra (Wyko-Ra) in an area of 250 μm×250 μm under the condition of a cutoff value of 0.25 mm using a model HD-2000 optical interferotype surface roughness meter (employing optical interference) made by WYKO. The difference in Ra before and after calendering, that is, ΔRa calculated from the following equation, was employed as an index of calendering moldability.

$$\text{Wyko-}\Delta Ra = (\text{Wyko-}Ra \text{ before calendering}) - (\text{Wyko-}Ra \text{ after calendering})$$

In cases with negative values of ΔRa, moldability was extremely poor and calendering roughened the surface. Since the Wyko-Ra indicates the surface roughness of relatively lower frequency than AFM-Ra, it can be employed as an index of the surface roughness of the entire surface.

Separately, the Wyko-Ra was measured before and after calendering and (Wyko-ΔRa) was calculated for the magnetic sheets prepared in (ii) above.

(iv) Evaluation of the Surface Roughness of Magnetic Recording Tapes

An atomic force microscope (AFM) (Nanoscope II, made by Digital Instruments) was employed to determine the surface roughness (AFM-Ra) of the magnetic recording tapes of Examples and Comparative Examples indicated in Table 6 by scanning an area 30 μm×30 μm at a tunneling current of 10 nA and a bias current of 400 mV. The AFM-Ra represented a surface roughness of relatively higher frequency than the Wyko-Ra, and the value affects on electromagnetic characteristic set forth below.

(v) Electromagnetic Characteristic (S/N Ratio)

The S/N ratio of the magnetic recording tapes of Examples and Comparative Examples indicated in Table 6 were measured in a ½ inch linear system with a fixed head. The relative velocity of the head/tape was set to 10 m/s. An MIG head (track width 18 μm) with a saturation magnetization of 1.4 T was employed for recording. The recording current was optimized for each tape. An anisotropic MR head (A-MR) with an element thickness of 25 nm and a shield spacing of 0.2 μm was employed as the reproduction head.

A signal with a recording wavelength of 0.2 μm was recorded. The reproduced signal was frequency analyzed with a spectrum analyzer made by Shibasoku. The ratio of the output of the carrier signal (wavelength 0.2 μm) to the integral noise of the entire spectral region was adopted as the S/N ratio. Comparative Example 1 was assigned a relative value of 0 dB.

Comparative Example 1 exhibited a standard S/N ratio for the computer backup magnetic tapes that are currently available on the market. To respond to the demands of the next generation of high recording density, it is desirable for the S/N ratio to be equal to or higher than 0.5 dB, further desirably equal to or higher than 0.5 dB 1.5 dB, preferably equal to or higher than 0.5 dB than in Comparative Example 1.

(vi) Repeat Sliding Durability

In a ½ inch linear system with a fixed head and with 800 m as one pass, the magnetic recording tapes of Examples and Comparative Examples indicated in Table 6 were repeatedly run for 10,000 passes while monitoring the output of the carrier signal (wavelength 0.2 μm). Assigning 0 dB to the output obtained on the initial pass, the drop in output after 10,000-pass running (degree of drop in output A) was evaluated under the following standard. Then, running is further conducted for additional 5,000 passes, and assigning 0 dB to the output obtained on the initial pass, the drop in output after 15,000-pass running (degree of drop in output B) was evaluated under the following standard. The more material adhered to the head, the greater the drop in output. Thus, the evaluation results could be used as an index of material adhering to the head.

(Degree of Drop in Output A)
⊚: The drop in output after 10,000 passes was less than −0.5 dB.
○: The drop in output after 10,000 passes was −0.5 dB or more but less than −1.0 dB.
Δ: The drop in output after 10,000 passes was −1.0 to −2.0 dB.
X: The drop in output after 10,000 passes was more than −2.0 dB.

(Degree of Drop in Output B)
⊚: The drop in output after 15,000 passes was less than −0.5 dB.
○: The drop in output after 15,000 passes was −0.5 dB or more but less than −1.0 dB.
Δ: The drop in output after 15,000 passes was −1.0 to −2.0 dB.
X: The drop in output after 15,000 passes was more than −2.0 dB.

After making 15,000 passes, the magnetic head was removed and subjected to fluorescence X-ray analysis with a built-in scanning electron microscope (FE-SEM-S800, made by Hitachi) to determine the presence or absence of a phosphorus-derived peak.

The results are given in Table 6.

Evaluation Results

Based on the results in Table 6, the magnetic recording medium of the present invention as set forth above was determined to satisfy (1) to (3) below, to improve the surface smoothness of the magnetic layer and the coating strength (reduction of head grime by prevention of generation of pieces of damaged coating), and thus, to afford good electromagnetic characteristics.

(1) The binder in the magnetic layer is a mixture of a vinyl chloride polymer, polyurethane resin, and polyisocyanate. The polyurethane resin has a glass transition temperature falling within a range of 90 to 130° C. and a storage elastic modulus at 80° C. falling within a range of 2.5 to 5.0 GPa.

(2) The nonmagnetic layer is a radiation-cured layer that is obtained by radiation curing a radiation-curable composition containing nonmagnetic powder and a binder component. The binder component comprises a radiation-curable vinyl chloride copolymer and a radiation-curable polyurethane resin.

(3) The radiation-curable vinyl chloride copolymer and radiation-curable polyurethane resin both have glass transition temperatures falling within a range of 30 to 100° C.

From the results shown in Table 6, it can be confirmed that ultrafine microparticulate magnetic powder with an average particle size of equal to or smaller than 40 nm can be highly dispersed by using cinnamic acid without generation of phosphorous-derived grime. By contrast, it was difficult to achieve good dispersibility when magnetic layer coating liquids were prepared by the same method in Example 8 with the exception that trans-cinnamic acid was replaced with 5.0 parts of methyl trans-cinnamate (made by Tokyo Chemical), trans-cinnamic acid was replaced with 5.0 parts of benzenesulfonic acid, or the quantity of trans-cinnamic acid added was changed from 5 parts to 0 part.

From the above results, it is reveled that cinnamic acid is a particularly preferable dispersing agent for ultrafine microparticulate magnetic powder with an average particle size of equal to or smaller than 40 nm.

TABLE 6

| | Magnetic layer characteristics | | | Magnetic recording medium characteristics | | | Repeat sliding durability | | |
|---|---|---|---|---|---|---|---|---|---|
| | Dispersion stability | Dispersibility SQ | Calendering moldability of single magnetic layer Wyko-Δ Ra | Calendering moldability Wyko-Δ Ra | Surface roughness AFM-Ra | Electromagnetic characteristic S/N | Degree of drop in output A | Degree of drop in output B | Presence or absence of a phosphorus-derived grime |
| Ex. 1 | ○ | 0.857 | −5.2 | 1.9 | 3.51 | 2.2 | ○ | ○ | None |
| Ex. 2 | ○ | 0.855 | −5.0 | 2.6 | 3.45 | 2.3 | ⊚ | ⊚ | None |
| Ex. 9 | ○ | 0.846 | 2.1 | 1.5 | 2.22 | 2.5 | ○ | ○ | None |
| Ex. 10 | ○ | 0.865 | 1.9 | 1.5 | 3.40 | 2.1 | ○ | ○ | None |
| Ex. 11 | ○ | 0.860 | 2.5 | 2.9 | 2.16 | 3.0 | ○ | ○ | None |
| Ex. 12 | ○ | 0.845 | −6.3 | 0.9 | 3.60 | 1.9 | ○ | ○ | None |
| Ex. 13 | Δ | 0.832 | −2.0 | 1.5 | 3.60 | 1.8 | ○ | ○ | None |
| Ex. 14 | ○ | 0.860 | −5.6 | 2.4 | 3.40 | 2.1 | ○ | ○ | None |
| Comp. Ex. 1 | ○ | 0.852 | 7.4 | 3.0 | 2.58 | 0.0 | ○ | X | Presence |
| Comp. Ex. 2 | ○ | 0.835 | 7.7 | 2.5 | 2.93 | 0.0 | ○ | ○ | None |
| Ex. 6 | ○ | 0.853 | 0.6 | 2.1 | 2.96 | 1.0 | ○ | X | Presence |
| Comp. Ex. 3 | Δ | 0.814 | −11.7 | 2.6 | 2.80 | 1.3 | Δ | Δ | None |
| Comp. Ex. 4 | ○ | 0.855 | −5.0 | −2.5 | 4.21 | 1.0 | ○ | ○ | None |
| Ex. 7 | Δ | 0.815 | 3.6 | 2.5 | 3.61 | 0.5 | Δ | Δ | None |
| Comp. Ex. 5 | ○ | 0.855 | −5.0 | 0.8 | 3.60 | 1.8 | Δ | Δ | None |
| Comp. Ex. 6 | ○ | 0.870 | 2.3 | 3.0 | 2.19 | 2.8 | X | X | None |
| Comp. Ex. 7 | X | — | — | — | — | — | — | — | — |
| Comp. Ex. 8 | ○ | 0.854 | 3.0 | 3.4 | 2.15 | 3.2 | X | X | None |
| Ex. 8 | ○ | 0.702 | −4.8 | 2.3 | 2.20 | 3.0 | ○ | ○ | None |

Separately, the calendering moldability of the magnetic tapes of Examples 3 to 5 was evaluated by the method set forth above. For comparison, results are also given for Example 2 and Comparative Example 4 in Table 7 below. As shown in Table 7, Examples 3 to 5 exhibited good calendering moldability in the same manner as the Examples indicated in Table 6.

TABLE 7

|  | Temperature of Tg2 | Moldability of lower layer Wyko-Δ Ra |
|---|---|---|
| Ex. 2 | 68° C. | 2.6 |
| Ex. 3 | 77° C. | 2.3 |
| Ex. 4 | 72° C. | 2.3 |
| Ex. 5 | 82° C. | 1.9 |
| Comp. Ex. 4 | 87° C. | -2.5 |

An Examination of the Blending Ratio of the Magnetic Layer Binder

The effect of the blending ratio of polyester polyurethane resin a, polyvinyl chloride copolymer k (MR104, made by Zeon Corp.), and the polyisocyanate compound (Coronate 3041, made by Nippon Polyurethane Industrial Co., Ltd.) on thermal characteristics was determined by the following tests. The results are given in Table 8.

Mixtures obtained by blending the three components in the ratios indicated in Table 8 were dissolved to 22 weight percent in 50:50 (by weight) mixed solutions of methyl ethyl ketone and cyclohexanone. Subsequently, each was coated on an aramid base to 20 μm upon drying. After drying, the coating was heat cured for 36 hours at 70° C., yielding a clear film. The clear film obtained was cut to 3.35 mm in width and 5 cm in length. This was then measured with a dynamic viscoelastometer (Rheovibron, made by Toyo Baldwin, temperature increase rate 2° C./minute, measurement frequency 110 Hz) over a temperature range of 30 to 140° C. to obtain the storage elastic modulus (F) at 80° C. In the same measurement, the glass transition temperature was obtained as the temperature at the peak top of the loss elastic modulus (E") in the same manner as in measurement of above-described Tg2.

The same method was employed to measure the glass transition temperature and the storage elastic modulus (F) at 80° C. of polyurethane resin A described in the Examples of above-cited Japanese Unexamined Patent Publication (KOKAI) No. 2004-319001. The results (test 11) are also given in Table 8.

TABLE 8

| | Blending ratio | | | | |
|---|---|---|---|---|---|
| | Polyurethane resin | Vinyl chloride copolymer k | Parts of polyisocyanate added (per 100 parts of vinyl chloride copolymer) | Tg (Temperature at peak top of E) | E' at 80° C. |
| Test 1 | 28.6 | 71.4 | 0 part | 87° C. | 1.78 |
| Test 2 | 28.6 | 71.4 | 25 parts | 108° C. | 2.78 |
| Test 3 | 28.6 | 71.4 | 50 parts | 110° C. | 3.17 |
| Test 4 | 28.6 | 71.4 | 75 parts | 113° C. | 2.91 |
| Test 5 | 50 | 50 | 0 part | 96° C. | 2.10 |
| Test 6 | 50 | 50 | 25 parts | 112° C. | 2.22 |
| Test 7 | 71.4 | 28.6 | 0 part | 106° C. | 2.21 |
| Test 8 | 71.4 | 28.6 | 25 parts | 117° C. | 2.63 |
| Test 9 | 100 | 0 | 0 part | 100° C. | 2.57 |
| Test 10 | 0 | 100 | 0 part | 74° C. | 0.18 |
| Test 11 | 100 | 0 | 0 part | 160° C. | 2.33 |

In Table 8, Tests 2 to 4, 6, and 8, in which vinyl chloride copolymers and polyisocyanate compounds were employed in combination, exhibit greater improvement in both Tg and E' than Test 9, in which only a polyurethane resin was employed. By contrast, in Tests 1, 5, and 7, in which no polyisocyanate was employed, the Tg and/or E' dropped relative to Test 9, in which just polyurethane resin was employed. Thus, the use of a vinyl chloride copolymer and a polyisocyanate was found to improve the thermal characteristics of the magnetic layer. Based on comparison with Tests 9 and 11, even some polyurethane resins with high Tg values did not exhibit the E' that should be satisfied in the present invention. Accordingly, it was found necessary to specify the Tg and E'.

As determined in Comparative Example 7, the use of polyurethane alone made it difficult to disperse ultrafine microparticulate magnetic powder.

4. Preparation Examples (Reference Examples) of Radiation-Curable Polyurethane Resin Solutions Preparation Example 3-1

To a flask were charged 52.87 g (concentration 355.32 mmole/kg) of 4,4'-(propane-2,2-diyl)diphenol methyloxylane adduct (BPX-1000 made by Adeka, weight average molecular weight 1,000), 6.35 g of glycerol methacrylate (Bremmer GLM made by NOF Corporation), 12.48 g of dimethylol tricyclodecane (TCDM made by OXEA) as a chain-extending agent, 1.70 g of sulfonic acid (salt) group-containing diol compound (Example Compound (S-72)) as a polar-group incorporating component, 101.36 g of cyclohexanone as a polymerization solvent, and 0.232 g of p-methoxyphenol as compound C. Next, a solution of 42.66 g of methylene bis(4,1-phenylene)=diisocyanate (MDI) (Millionate MT made by Nippon Polyurethane Industry Co., Ltd.) and 52.73 g of cyclohexanone was added dropwise over 15 minutes. A polymerization catalyst in the form of 0.348 g of di-n-butyltin laurate was added, the temperature was raised to 80° C., and the mixture was stirred for 3 hours. When the reaction had ended, 116.69 g of cyclohexanone was added, yielding a polyurethane resin solution. After synthesizing the urethane, to the polyurethane resin solution obtained was added 100 ppm of p-benzoquinone relative to the polyurethane solid component as component D.

The solid component of the polyurethane resin solution obtained by the above steps was 30 percent. Within one day of preparing the above polyurethane resin solution, the weight average molecular weight (Mw) and number average molecular weight (Mn) of the polyurethane resin contained in the solution were measured by the method described further below, revealing Mw=38,000 and Mn=24,000. Measurement by the method described further below of the sulfonic acid (salt) group content of the polyurethane resin revealed 69.55 mmole/kg. No residual monomer was detected by GPC, so the content of radiation-curable functional groups was calculated to be 355.32 mmole/kg from the charge ratio.

Preparation Example 3-2

To a flask were charged 57.50 g of 4,4'-(propane-2,2-diyl)diphenol methyloxylane adduct (BPX-1000 made by Adeka, weight average molecular weight 1,000) as a chain-extending agent, 6.50 g of glycerol methacrylate (Bremmer GLM made by NOF Corporation) (concentration 355.44 mmole/kg), 10.50 g of methylol tricyclodecane (TCDM made by OXEA), 3.40 g of sulfonic acid (salt) group-containing diol compound (Example Compound (S-31)) as a polar-group incorporating component, 107.66 g of cyclohexanone as a polymerization solvent, and 0.240 g of p-methoxyphenol as compound C. Next, a solution of 42.21 g of methylene bis(4,1-phenylene)=diisocyanate (MDI) (Millionate MT made by Nippon Polyurethane Industry Co., Ltd.) and 51.47 g of cyclohexanone was added dropwise over 15 minutes. A polymerization catalyst in the form of 0.361 g of di-n-butyltin laurate was added, the temperature was raised to 80° C., and the mixture was stirred for 3 hours. When the reaction had ended, 121.28 g of cyclohexanone was added, yielding a polyurethane resin solution. After synthesizing the urethane, to the polyurethane resin solution obtained was added 50 ppm of 4-hydroxy-2,2,6,6-tetramethylpiperidine-N-oxyl (4-OH-TEMPO) relative to the polyurethane solid component as component D.

The solid component of the polyurethane resin solution obtained by the above steps was 30 percent. Measurement of the weight average molecular weight (Mw), number average molecular weight (Mn), and sulfonic acid (salt) group content of the polyurethane resin contained in the solution by the methods described further below revealed Mw=36,000, Mn=24,000, and a sulfonic acid (salt) group content of 69.66 mmole/kg. No residual monomer was detected by GPC, so the content of radiation-curable functional groups was calculated to be 355.44 mmole/kg from the charge ratio.

Preparation Examples 3-3 to 3-6

With the exceptions that the sulfonic acid (salt) group-containing diol, component C, and component D employed were changed as indicated in Table 9, polyurethane resin solutions were obtained by the same method as in Preparation Example 3-2. In Preparation Examples 3-3 to 3-6, no residual monomer was detected by GPC, so the content of radiation-curable functional groups was calculated to be 355.32 mmole/kg from the charge ratio. The sulfonic acid (salt) group content of the polyurethane resins obtained in Preparation Examples 3-3 to 3-6 as measured by the method described further below above was 69.55 mmole/kg.

Preparation Example 3-7

With the exception that no 4-hydroxy-2,2,6,6-tetramethylpiperidine-N-oxyl (4-OH-TEMPO) (component D) was added to the polyurethane resin solution obtained following urethane synthesis, a polyurethane resin solution was obtained by the same method as in Preparation Example 3-2. The results of measurement by the method set forth further below of the weight average molecular weight (Mw) of the polyurethane resin in the polyurethane resin solution obtained are given in Table 9.

Preparation Example 3-8

With the exceptions that urethane synthesis was conducted in the presence of benzoquinone (component D) instead of p-methoxyphenol (component C) and no component C or D was added following urethane synthesis, a polyurethane resin solution was obtained by the same method as in Preparation Example 3-2. The results of measurement by the method set forth further below of the weight average molecular weight (Mw) of the polyurethane resin in the polyurethane resin solution obtained are given in Table 9.

Preparation Example 3-9

With the exception that the quantity of benzoquinone was increased to ten times the original quantity, a polyurethane resin solution was obtained by the same method as in Preparation Example 3-2. The result of measurement by the method set forth further below of the weight average molecular weight (Mw) of the polyurethane resin in the polyurethane resin solution obtained is given in Table 9.

Evaluation Methods
(1) Evaluation of Storage Stability

Each of the polyurethane resin solutions obtained in the Preparation Examples was stored under sealed conditions at 53° C. and the number of days elapsing until a change in molecular weight appeared as measured by GPC was counted.

(2) Measurement of Average Molecular Weight, Evaluation of Sulfonic Acid (Salt) Group Concentration and Radiation-Curability Measurement and evaluation were conducted by the same methods as in evaluation of the radiation-curable vinyl chloride copolymer set forth above.

TABLE 9

| | Polyol compound | | Isocyanate compound | Component added at polyurethane synthesis (Concentration in the parenthesis is the concentration added relative to polyurethane solid component.) |
|---|---|---|---|---|
| | Polar-group incorporating component | Chain-extending agent | | |
| Preparation Ex. 3-1 | Ex. Compound (S-72) | (1) 4,4'-(propane-2,2-diyl)diphenol methyloxylane adduct (2) Glycerol methacrylate (3) Dimethylol tricyclodecane | MDI | p-methoxyphenol (2000 ppm) |
| Preparation Ex. 3-2 | Ex. Compound (S-31) | (1) 4,4'-(propane-2,2-diyl)diphenol methyloxylane adduct (2) Glycerol methacrylate (3) Dimethylol tricyclodecane | MDI | p-methoxyphenol (2000 ppm) |

TABLE 9-continued

| | | | | |
|---|---|---|---|---|
| Preparation Ex. 3-3 | Ex. Compound (S-31) | (1) 4,4'-(propane-2,2-diyl)diphenol methyloxylane adduct (2) Glycerol methacrylate (3) Dimethylol tricyclodecane | MDI | p-methoxyphenol (2000 ppm) |
| Preparation Ex. 3-4 | Ex. Compound (S-31) | (1) 4,4'-(propane-2,2-diyl)diphenol methyloxylane adduct (2) Glycerol methacrylate (3) Dimethylol tricyclodecane | MDI | Polyphenol[note] (2000 ppm) |
| Preparation Ex. 3-5 | Ex. Compound (S-31) | (1) 4,4'-(propane-2,2-diyl)diphenol methyloxylane adduct (2) Glycerol methacrylate (3) Dimethylol tricyclodecane | MDI | Hydroquinone (500 ppm) |
| Preparation Ex. 3-6 | Ex. Compound (S-31) | (1) 4,4'-(propane-2,2-diyl)diphenol methyloxylane adduct (2) Glycerol methacrylate (3) Dimethylol tricyclodecane | MDI | 2,6-di-t-butyl-4-hydroxytoluene (5000 ppm) |
| Preparation Ex. 3-7 | Ex. Compound (S-31) | (1) 4,4'-(propane-2,2-diyl)diphenol methyloxylane adduct (2) Glycerol methacrylate (3) Dimethylol tricyclodecane | MDI | p-methoxyphenol (2000 ppm) |
| Preparation Ex. 3-8 | Ex. Compound (S-31) | (1) 4,4'-(propane-2,2-diyl)diphenol methyloxylane adduct (2) Glycerol methacrylate (3) Dimethylol tricyclodecane | MDI | Benzoquinone (200 ppm) |
| Preparation Ex. 3-9 | Ex. Compound (S-31) | (1) 4,4'-(propane-2,2-diyl)diphenol methyloxylane adduct (2) Glycerol methacrylate (3) Dimethylol tricyclodecane | MDI | Benzoquinone (2000 ppm) |

| | Component added following polyurethane synthesis (Concentration in the parenthesis is the concentration added relative to polyurethane solid component.) | Polyurethane evaluation results | | |
|---|---|---|---|---|
| | | Weight average molecular weight (Mw) | Stability over time | Curability (gelling rate) |
| Preparation Ex. 3-1 | Benzoquinone (100 ppm) | 38,000 | 250 days or more | 80% |
| Preparation Ex. 3-2 | 4-hydroxy-2,2,6,6-tetramethylpiperidine-N-oxyl (50 ppm) | 36,000 | 250 days or more | 85% |
| Preparation Ex. 3-3 | Nitrobenzene (30 ppm) | 36,000 | 250 days or more | 80% |
| Preparation Ex. 3-4 | 2,2,6,6-tetramethylpiperidine-N-oxyl (100 ppm) | 35,000 | 250 days or more | 85% |
| Preparation Ex. 3-5 | (1) Phenothiazine (1000 ppm) (2) Hydroquinone (1000 ppm) | 34,000 | 185 days | 90% |
| Preparation Ex. 3-6 | nitromethane (200 ppm) | 35,000 | 250 days or more | 80% |
| Preparation Ex. 3-7 | None | 36,000 | 7 days | 75% |
| Preparation Ex. 3-8 | None | 33,000 | 3 days | 75% |
| Preparation Ex. 3-9 | None | 36,000 | 250 days or more | 5% |

[note] Polyphenol: Irgacure 1010

Evaluation Results

As shown in Table 9, although the curability was good in Preparation Examples 3-7 and 3-8 in which either component C or D was employed alone, the stability over time dropped markedly relative to Preparation Examples 3-1 to 3-6. In Preparation Example 3-9, in which the quantity of component D was increased 10-fold relative to that in Preparation Example 3-8, the stability over time was enhanced, but the gelling rate of the cured film obtained by irradiation with radiation was low. Based on these results, the addition of a large quantity of component D to increase storage stability was found to compromise curability.

By contrast, in Preparation Examples 3-1 to 3-6, in which components C and D were employed in combination, the polyurethane resin solutions exhibited good stability over time. As exhibited by Preparation Example 3-9, curability normally decreases when a component is added to increase the long-term storage stability. However, in Preparation Examples 3-1 to 3-6, the gelling rates of the cured films obtained by irradiation with radiation were high and curability was good.

The above results indicate that the combined use of components C and D increased the storage stability without compromising the curability of the radiation-curable polyurethane resin.

The magnetic recording medium of the present invention is useful for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior

What is claimed is:

1. A magnetic recording medium comprising a nonmagnetic radiation-cured layer containing a nonmagnetic powder and a binder component and a magnetic layer containing a ferromagnetic powder and a binder in this order on a nonmagnetic support, wherein
    the binder of the magnetic layer is a mixture of a vinyl chloride copolymer, polyurethane resin, and polyisocyanate, the polyurethane resin having a glass transition temperature ranging from 90 to 130° C. and a storage elastic modulus at 80° C. ranging from 2.5 to 5.0 GPa,
    the nonmagnetic radiation-cured layer is a radiation-cured layer formed by curing with radiation a radiation-curable composition comprising the nonmagnetic powder and the binder component,
    the binder component comprising a radiation-curable vinyl chloride copolymer and a radiation-curable polyurethane resin,
    the radiation-curable vinyl chloride copolymer and radiation-curable polyurethane resin both have glass transition temperatures ranging from 30 to 100° C., and
    the radiation-curable vinyl chloride copolymer comprises a structural unit denoted by formula (1):

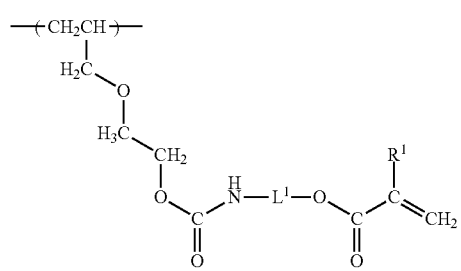

(1)

wherein, in formula (1), $R^1$ denotes a hydrogen atom or a methyl group, and $L^1$ denotes a divalent linking group denoted by formula (2), formula (3), or formula (4):

(2)

(3)

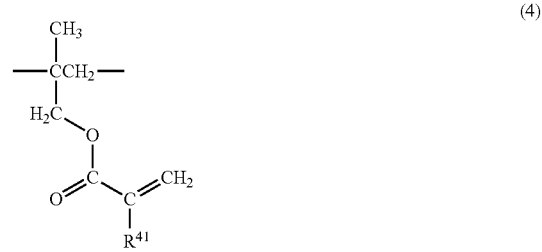

(4)

wherein, in formula (4), $R^{41}$ denotes a hydrogen atom or a methyl group.

2. The magnetic recording medium according to claim 1, wherein the radiation-curable polyurethane resin is a radiation-curable polyurethane resin obtained from starting materials containing a sulfonic acid group containing- or sulfonate group-containing polyol compound denoted by formula (2a):

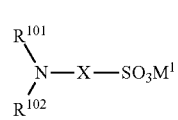

(2a)

wherein, in formula (2a), X denotes a divalent linking group; each of $R^{101}$ and $R^{102}$ independently denotes an alkyl group containing at least one hydroxyl group and equal to or more than two carbon atoms or an aralkyl group containing at least one hydroxyl group and equal to or more than eight carbon atoms; and $M^1$ denotes a hydrogen atom or a cation.

3. The magnetic recording medium according to claim 1, wherein the polyurethane resin comprised in the binder of the magnetic layer is a polyester polyurethane resin.

4. The magnetic recording medium according to claim 1, wherein the binder of the magnetic layer comprises 10 to 100 weight parts of the polyisocyanate per 100 weight parts of the vinyl chloride copolymer.

5. The magnetic recording medium according to claim 1, wherein the magnetic layer further comprises a dispersing agent selected from the group consisting of aromatic compounds and carboxyl group-containing compounds.

6. The magnetic recording medium according to claim 5, wherein the ferromagnetic powder has an average particle size of equal to or smaller than 40 nm, and the dispersing agent is a cinnamic acid.

7. The magnetic recording medium according to claim 5, wherein the magnetic layer comprises 1.5 to 10 weight parts of the dispersing agent per 100 weight parts of the ferromagnetic powder.

8. A method of manufacturing a magnetic recording medium, wherein
    the magnetic recording medium is the magnetic recording medium according to claim 1, and
    the method comprises:
    coating and radiation curing a radiation-curable composition to form a nonmagnetic layer in the form of a radiation-cured layer, wherein the radiation-curable composition comprises a nonmagnetic powder and a binder component, the binder component comprises a radiation-curable vinyl chloride copolymer and a radiation-curable polyurethane resin, and the radiation-curable vinyl chloride copolymer and radiation-curable polyurethane resin both have glass transition temperatures ranging from 30 to 100° C., forming a magnetic layer with a binder over the radiation-cured layer that has been formed, wherein the binder is a mixture of a vinyl chloride copolymer, polyurethane resin, and polyisocyanate, the polyurethane resin has a glass transition temperature ranging from 90 to 130° C. and a storage elastic modulus at 80° C. ranging from 2.5 to 5.0 GPa, after which conducting calendering at a temperature of equal to or greater than a glass transition temperature of the radiation-cured layer, and further wherein:

the radiation-curable vinyl chloride copolymer comprises a structural unit denoted by formula (1):

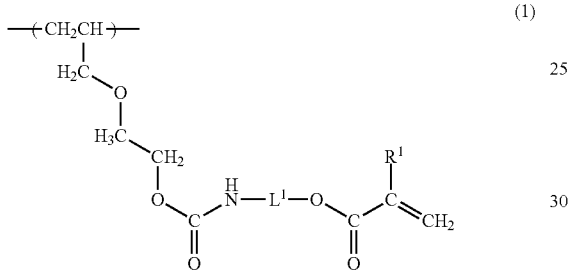

(1)

wherein, in formula (1), $R^1$ denotes a hydrogen atom or a methyl group, and $L^1$ denotes a divalent linking group denoted by formula (2), formula (3), or formula (4):

(2)

(3)

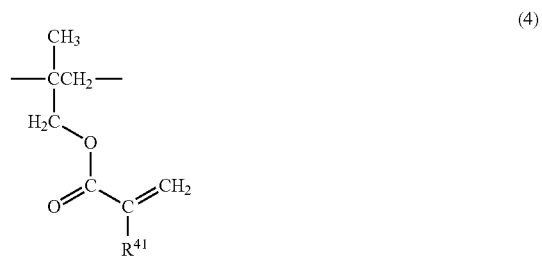

(4)

wherein, in formula (4), $R^{41}$ denotes a hydrogen atom or a methyl group.

* * * * *